United States Patent [19]
Tan et al.

[11] Patent Number: 5,434,976
[45] Date of Patent: Jul. 18, 1995

[54] COMMUNICATIONS CONTROLLER UTILIZING AN EXTERNAL BUFFER MEMORY WITH PLURAL CHANNELS BETWEEN A HOST AND NETWORK INTERFACE OPERATING INDEPENDENTLY FOR TRANSFERRING PACKETS BETWEEN PROTOCOL LAYERS

[75] Inventors: Min P. Tan, Torrance; Eric Fuh, Irvine; Philip Chan, deceased, late of Placentia, by Anna Chan, executrix; John Ta, Laguna Niguel, all of Calif.

[73] Assignee: Standard Microsystems Corporation, Hauppauge, N.Y.

[21] Appl. No.: 965,145

[22] Filed: Oct. 22, 1992

Related U.S. Application Data

[63] Continuation-in-part of Ser. No. 952,450, Sep. 28, 1992, abandoned.

[51] Int. Cl.$^6$ .............................................. G06F 13/00
[52] U.S. Cl. .................................... 395/200; 395/250; 264/228.5; 264/239; 264/239.7
[58] Field of Search .................... 395/200, 275, 250

[56] References Cited

U.S. PATENT DOCUMENTS

| | | | |
|---|---|---|---|
| 4,663,706 | 5/1987 | Allen et al. | 395/200 |
| 4,667,287 | 5/1987 | Allen et al. | 395/200 |
| 4,789,982 | 12/1988 | Coden | 370/85.5 |
| 4,887,075 | 12/1989 | Hirsawa | 340/825.03 |
| 4,905,230 | 2/1990 | Madge et al. | 370/85.5 |
| 4,914,652 | 4/1990 | Nguyen et al. | 370/85.5 |
| 4,951,280 | 4/1990 | McCool et al. | 370/85.12 |
| 5,077,655 | 12/1991 | Jinzaki | 395/200 |
| 5,175,732 | 12/1992 | Hendel et al. | 370/94.1 |
| 5,193,149 | 3/1993 | Awiszio et al. | 395/200 |
| 5,247,626 | 9/1993 | Firoozmanel | 395/250 |
| 5,289,469 | 2/1994 | Tanaka | 370/94.1 |

OTHER PUBLICATIONS

"VLSI Architecture For IEEE802.5 Token-Ring Lan Controller" by Tanaka Koichi, et al.; IEEE 1989 Custom Integrated Circuits Conference, published by IEEE, 1989.

"16-Mbit/s Adapter Chip for the IBM Token-Ring Local Area Network" by Jack Blair, et al., published by IEEE, vol. 24, No. 6., Dec. 1989.

"Token Ring", Local and Metropolitan Area Networks: Description of ISO/IEC 8802-5: 1992; IEEE Standard 802:5, pp. 25-40, p. 85.

*Primary Examiner*—Thomas C. Lee
*Assistant Examiner*—Sang Hui Kim
*Attorney, Agent, or Firm*—Hopgood, Calimafde, Kalil & Judlowe

[57] ABSTRACT

A high speed data communication controller comprising two independent central processing units, each having its own independent program instruction fetch data path, and instruction execution data path. The data communication controller includes a dual-port serial communication subsystem and a bus interface unit operably associated with a four channel DMA controller. One central processing unit is assigned the task of handling the medium access control (MAC) layer function of a multilayered local area network protocol, while the other central processing unit handles host commands and buffer memory management functions associated with the transmission and reception of packets relating to the higher layer protocol. As a result of the present invention, efficient data communication processing is achieved within a single VSLI chip, thereby improving node and network data throughout.

44 Claims, 33 Drawing Sheets

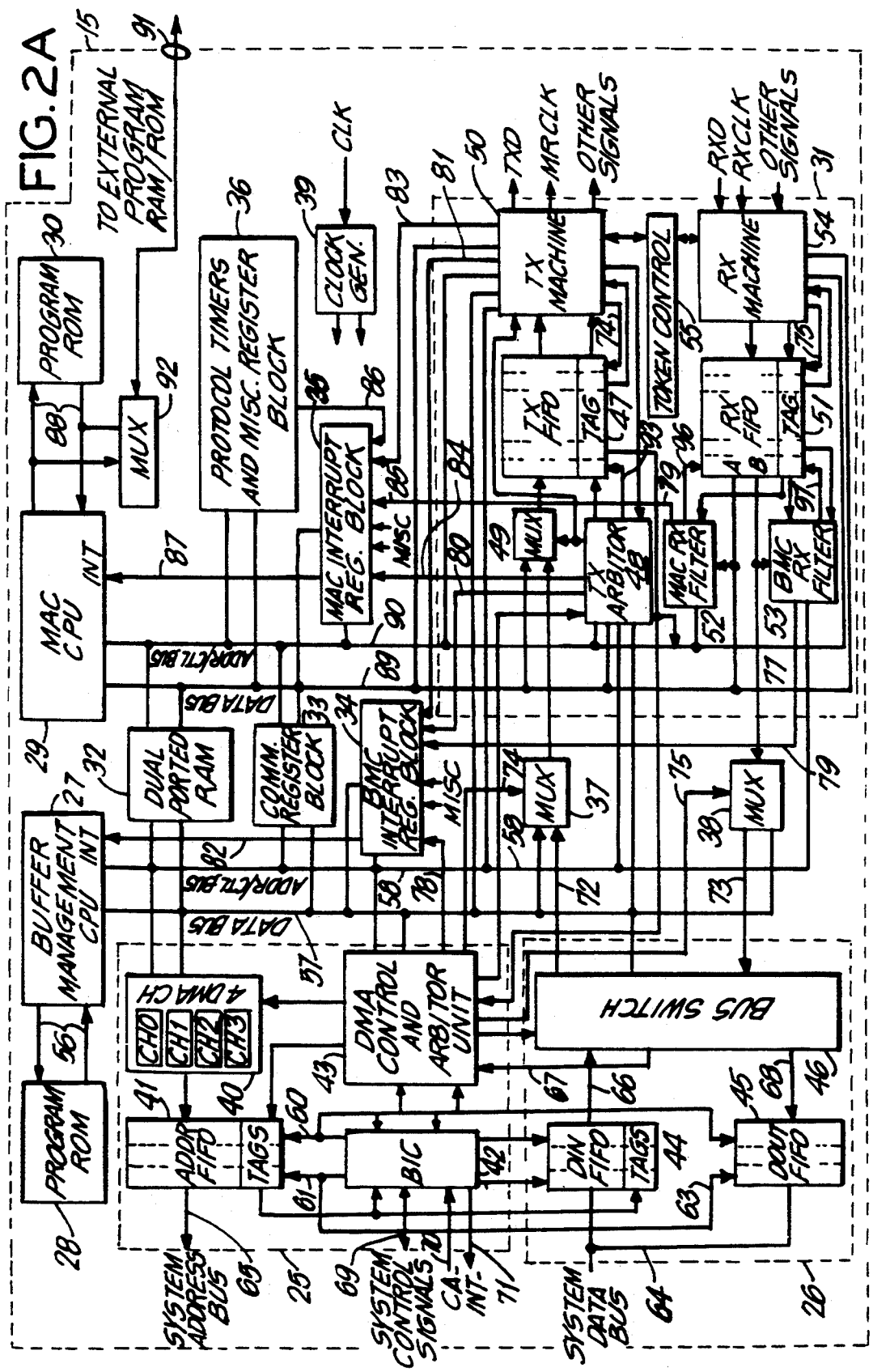

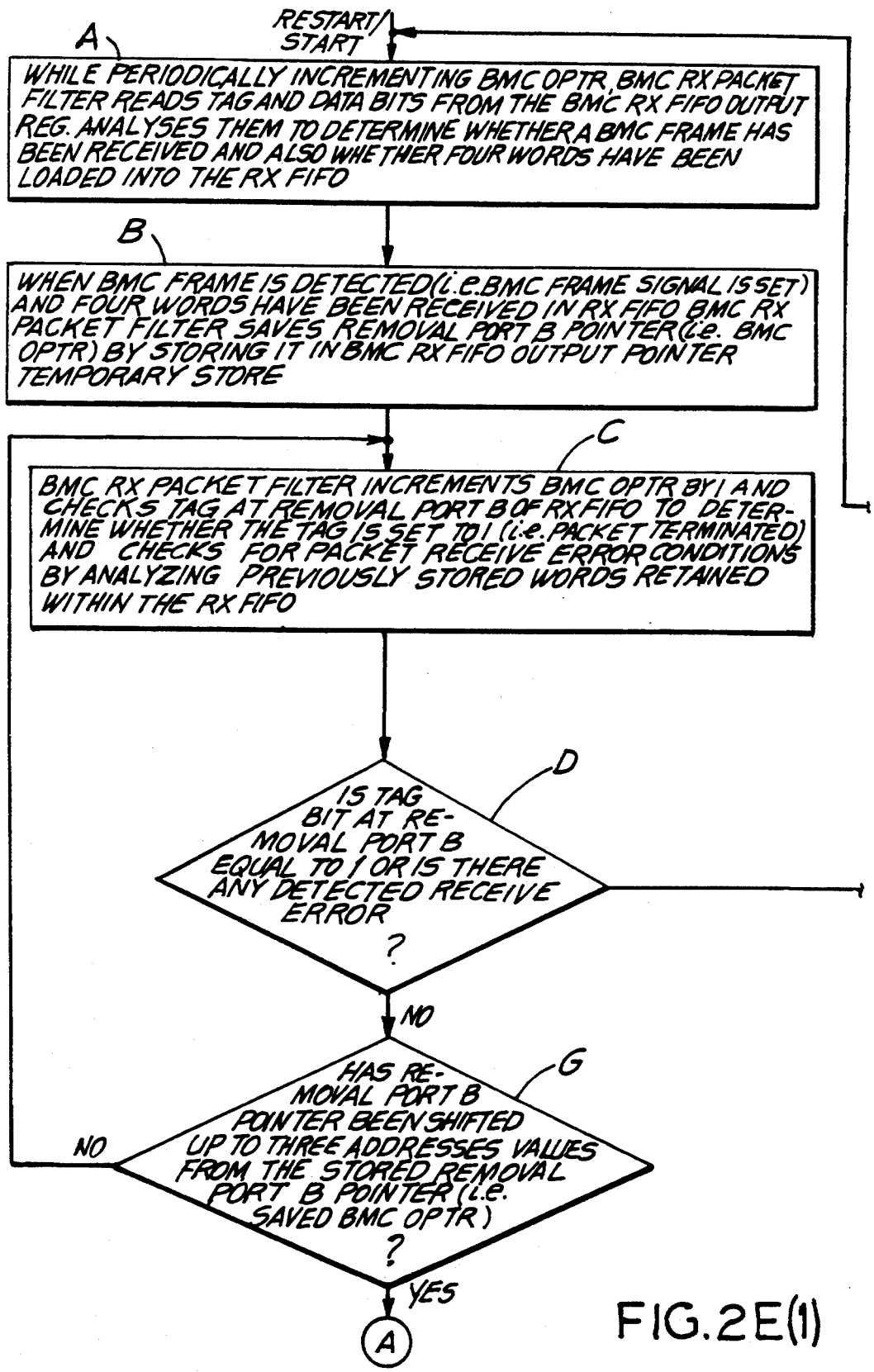
FIG. 2E(1)

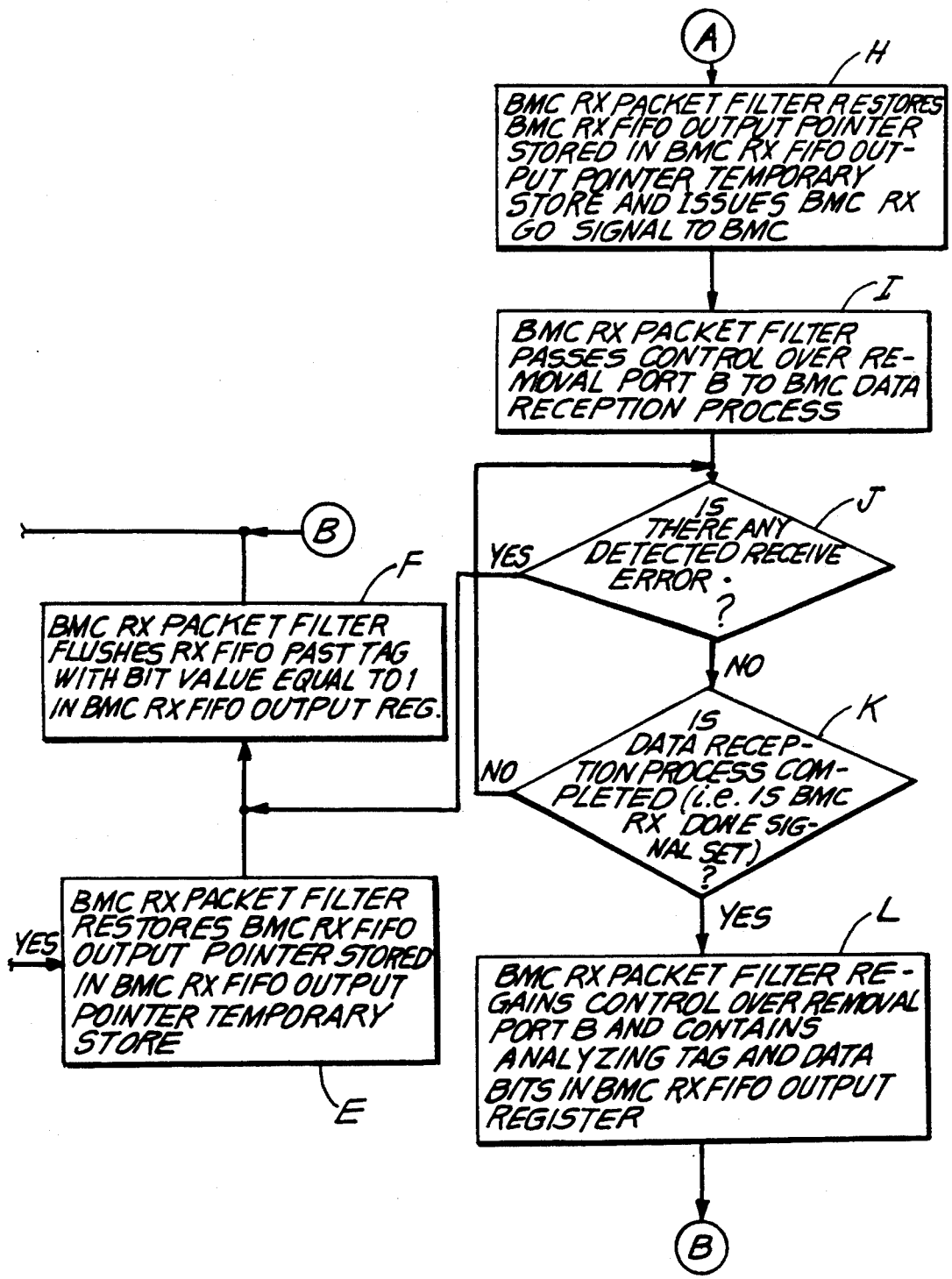
FIG.2E (2)

FIG. 2H

(IF BMC REQUEST_TX=1, MAC CPU IS INTERRUPTED) → MAC_CPU ISSUE INSTRUCTION THROUGH MAC ADDR/CTL_BUS TO ADDRESS DECODE TO GENERATE THE SIGNAL GIVE_TX_TO_BMC TO TX_ARBITOR WHICH IN TURN SET MAC_OWN_TX=0, i.e. PASSING CONTROL OF TX TO BMC → (RETURN FROM INTERRUPT)

FIG. 2I

(IF MAC REQUEST_TX=1, BMC IS INTERRUPTED) → BMC ISSUE INSTRUCTION THROUGH BMC_ADDR/CTL_BUS TO ADDRESS DECODE TO GENERATE THE SIGNAL GIVE_TX_TO_MAC TO TX_ARBITOR WHICH IN TURN SET MAC_OWN_TX=1, i.e. PASSING CONTROL OF TX TO MAC CPU → (RETURN FROM INTERRUPT)

FIG. 2G.

(1) FLAG_GET_TX := 0 if RESET + (FLAG_GET_TX · ACK_MAC_GET_TX)
    FLAG_GET_TX := 1 if RESET · GET_TX (2) MAC_OWN_TX := 1 if RESET · GET_TX · (MAC_OWN_TX · GIVE_TX_TO_MAC)
    MAC_OWN_TX := 0 if RESET · (MAC_OWN_TX · GIVE_TX_TO_BMC · FLAG_GET_TX)

(3) BMC_REQUEST_TX = MAC_OWN_TX · BMC_TX_FRAME_RDY · TX_MACHINE_BUSY · (MAC < BMC)
    MAC_REQUEST_TX = MAC_OWN_TX · MAC_TX_FRAME_RDY · TX_MACHINE_BUSY · (BMC < MAC)

(4) If MAC_OWN_TX = 1,
    TX_FIFO_TAG.1 = MAC_WR_TX_TAG.1
    TX_FIFO_TAG.0 = MAC_WR_TX_TAG.0
    TX_FIFO_IN_BUS_BIT.0 = MAC_WR_TX_ABORT
    WR_TX_FIFO = MAC_WR_TX_FIFO (5) If MAC_OWN_TX = 0
    TX_FIFO_TAG.1 = BMC_WR_TX_TAG.1 + DMA_WR_TX_TAG.1
    TX_FIFO_TAG.0 = BMC_WR_TX_TAG.0 + DMA_WR_TX_TAG.0
    WR_TX_ABORT = BMC_WR_TX_ABORT + DMA_WR_TX_ABORT
    WR_TX_FIFO = DMA_WR_TX_FIFO + BMC_WR_TX_FIFO

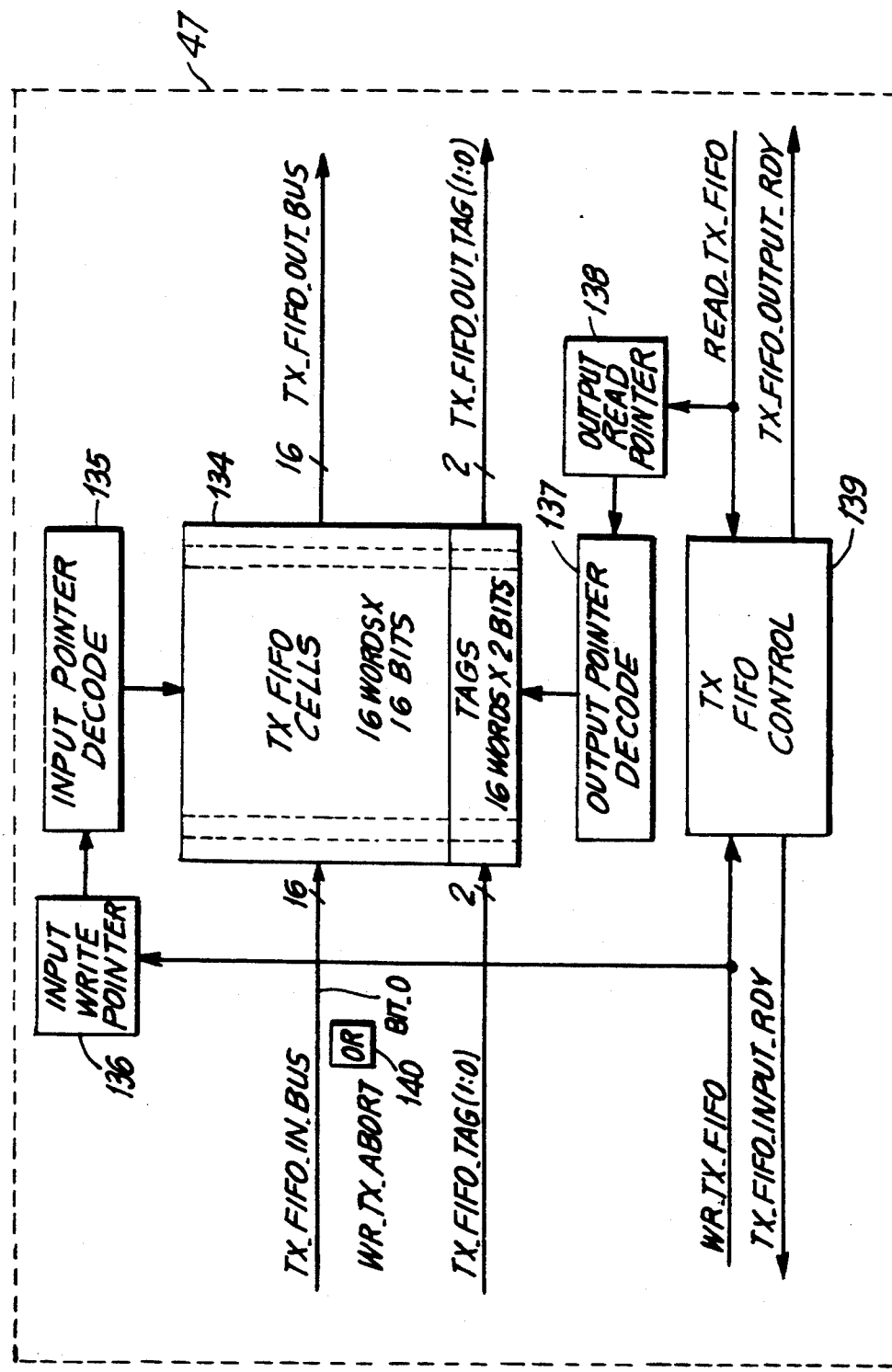

```
DATA BIT
 15 14 13 12 11 10  9  8  7  6  5  4  3  2  1  0
|IAF|IDF|MWC|    ZEROS           |    BSTLEN     |
|- - - - - - -   SCBP   - - - - - - - - - - - - |
|- - - - - - -   CBP    - - - - - - - - - - - - |
|- - - - - - -   HISBP  - - - - - - - - - - - - |
|          ZEROS                |   HISBSIZ     |
```

FIG. 3C

```
DATA
BIT
 15 14 13 12 11 10  9  8  7  6  5  4  3  2  1  0
|SV|RV|IV|         ZEROS           |    CMD     |
|        ZEROS                  |  IACK_CODE    |
|              RESUME_CONTROL                   |
|           INTERRUPT_MASK_CONTROL              |
|           INTERRUPT_MASK_STATE                |
```

FIG. 3D

```
BIT
 15 14 13 12 11 10  9  8  7  6  5  4  3  2  1  0
|CO|       ZEROS              |    CMDST        |
|CE| 0|CI|          ZEROS                       |
|- NEXT_CB_POINTER - - NCBP - - - - - - - - - - |
|                       P  0  0  0 |    CMD     |
|- - - - COMMAND SPECIFIC PARAMETER - - - - - - |
```

FIG. 3E

THE HISB INTERRUPT STATUS WORD FORMAT IS:

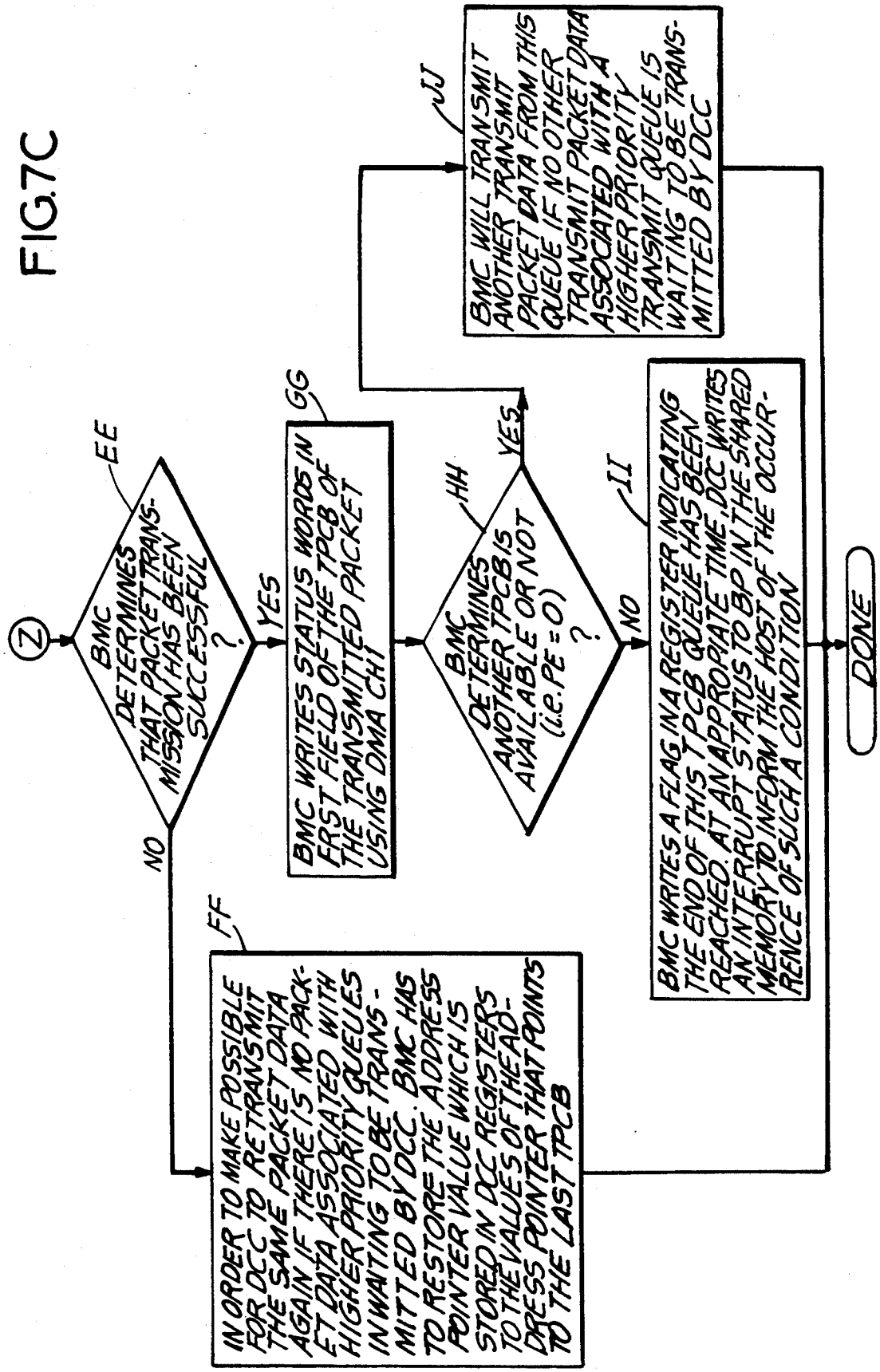

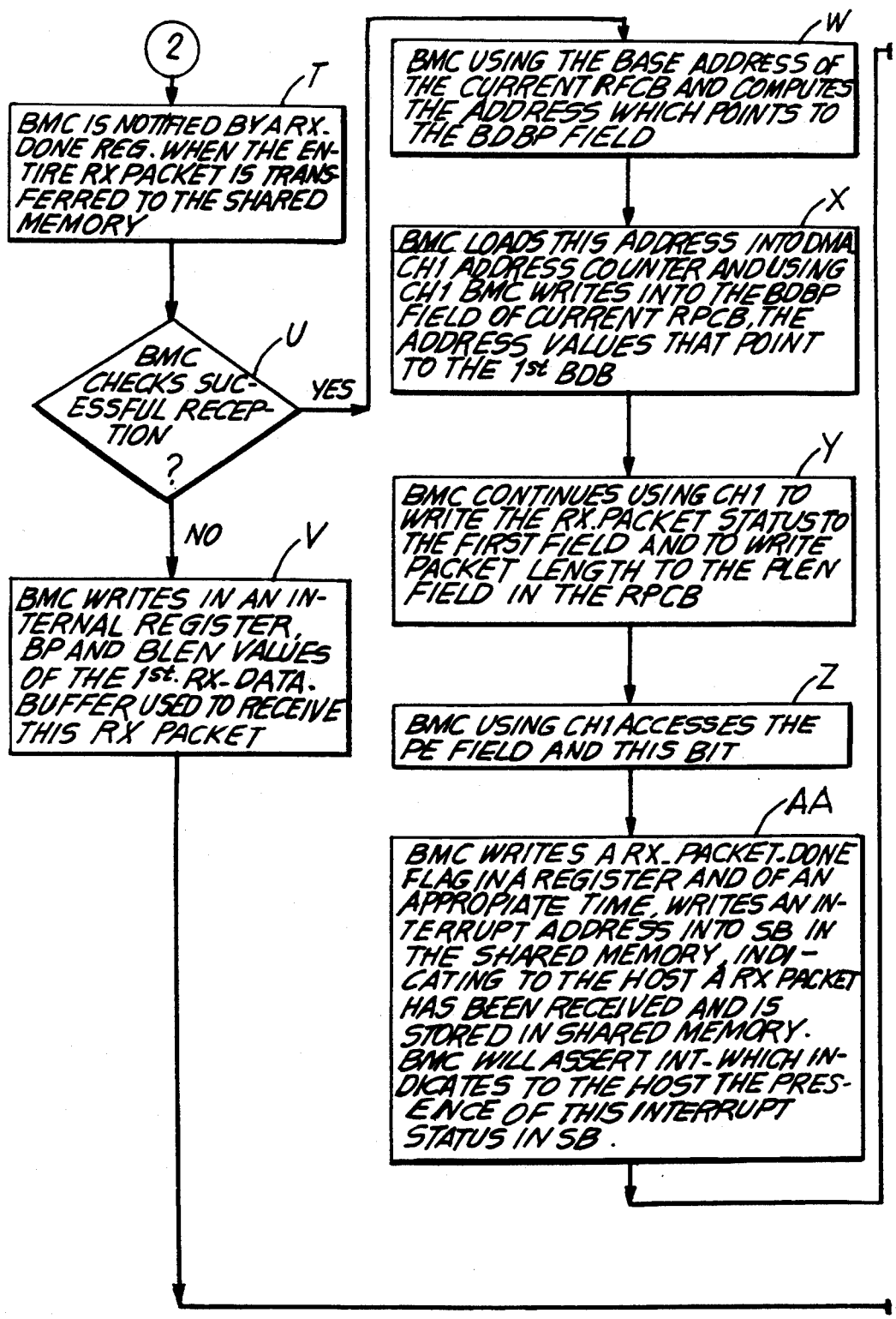
FIG. 8C(1)

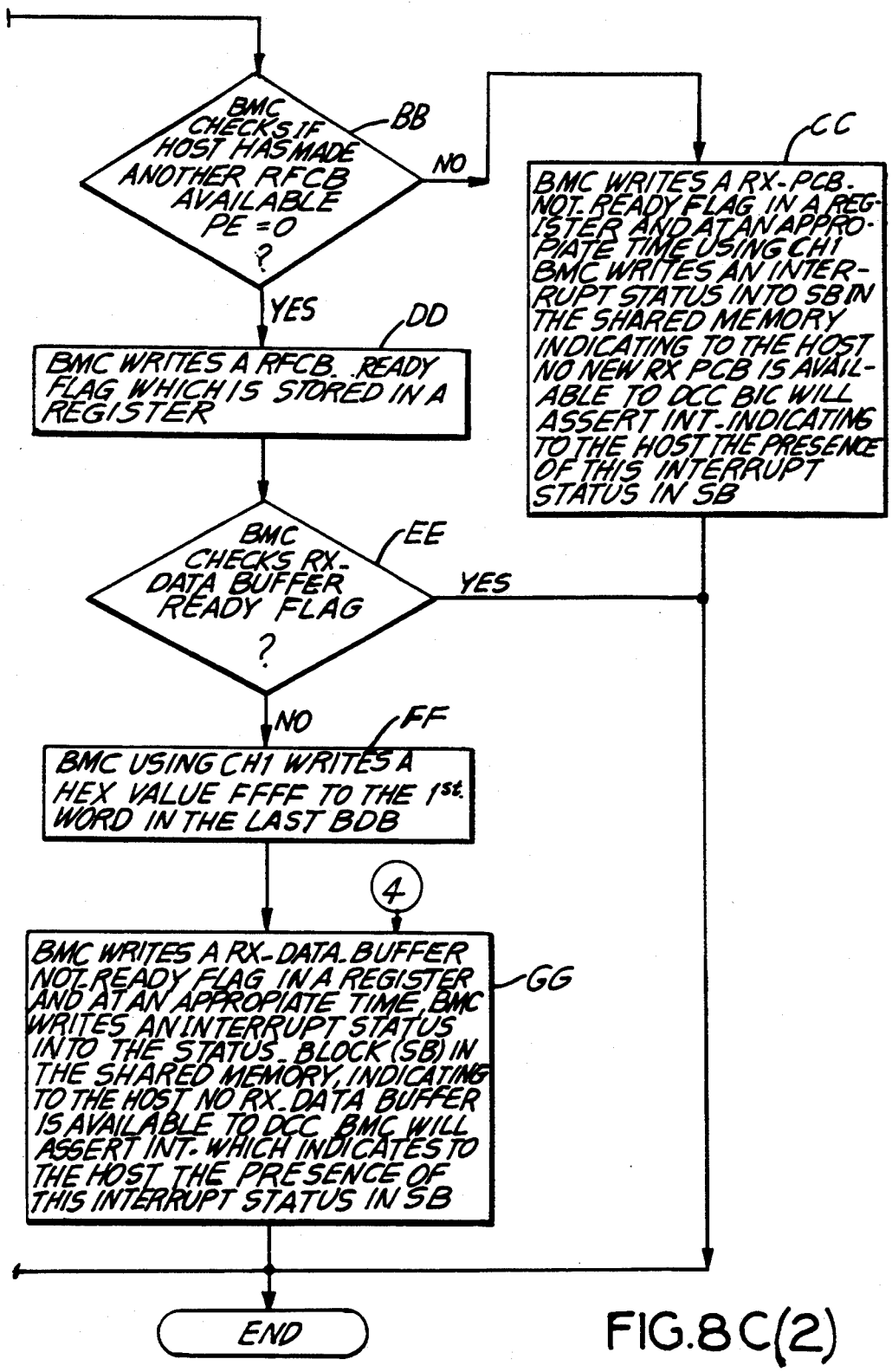
FIG.8C(2)

COMMUNICATIONS CONTROLLER UTILIZING AN EXTERNAL BUFFER MEMORY WITH PLURAL CHANNELS BETWEEN A HOST AND NETWORK INTERFACE OPERATING INDEPENDENTLY FOR TRANSFERRING PACKETS BETWEEN PROTOCOL LAYERS

RELATED CASES

The present application is a continuation-in-part of application Ser. No. 07/952,450, filed Sep. 28, 1992, entitled "Method and Apparatus for Buffering Data Within Stations of a Communication Network", now abandoned.

BACKGROUND OF THE INVENTION

1. Field of Invention

The present invention generally concerns a method and apparatus for buffering and processing data packets within stations of a communications network in order to perform the communication protocol(s) required by given communication network, and more particularly to a single high speed data communication processing chip having multiple central processing units (i.e. CPUs), multiple data paths and means for internally separating and processing data packets associated with one layer of the communication protocol, while transferring data packets associated with other layers of the communication protocol to the host system.

2. Brief Description of the Prior Art

Local-area networks (LAN) are communication systems for enabling data-processing devices, such as computer workstations, to communicate with each other through a communication (e.g. transmission) media. Data-processing devices in such networks are typically referred to as nodes or stations, many such stations are likely to be relatively autonomous, requiring communication with other stations only occasionally. Other stations may require more frequent communication, and the amount of communication required by a particular station can vary from time to time.

In many local area networks, stations can be easily added to, removed from, and moved from place to place within the network. While there are numerous local area networks presently known, they can be classified into two general types. The first type of network is referred to as a "centralized network" which is characterized by the requirement of a centralized network controller which implements the network protocol. The second type of local area network is referred to as a "distributed network" which does not require a centralized network controller, and instead provides each station within the network with a communication controller having a medium access control (MAC) unit that locally implements the network protocol within each communication controller.

In a distributed local area network, packet switching is a technique commonly employed to dynamically allocate the communication resources of the network among multiple communicating stations. According to this technique, messages to be communicated between stations are partitioned (by the transmitting station's processor) into packets, having a fixed maximum size. The packets are then ascribed a station (i.e. source) identifier. The packets are then placed on the communication medium by the station's communication controller. Such packets are then sensed and selectively processed by the communication controller of the destination station in the network.

Any packet from one station to another station contains various fields of information specified in accordance with a predetermined network protocol. The information typically includes the identity of the source station, the identity of the destination station, and various other information concerning the characteristics of the packet. In some network protocols, a number of different types of packets may appear on the communication medium in accordance with the network protocol. Typically, these packets relate to either communication control or data-transfer functions.

To more fully appreciate the problems associated with conventional communication controllers used in the stations of distributed local-area-networks, reference is made to FIGS. 1 through 3.

In FIG. 1, a distributed local area-network 1 is shown, comprising a plurality of stations (i.e. nodes A through H) which are operably associated to a communication medium 2, such as a cable while a number of network configurations are possible, a token-ring configuration is schematically illustrated for purposes of illustration. In FIG. 1A, each station is shown to generally comprise a host processor (e.g., CPU) 3, a program memory 4, a system memory 5, a communication controller 6, a system bus 7, and a communication medium interface unit 8. The processor, program memory and system memory are each associated with a system bus 7, and the system bus, in turn, is interfaced with communication controller 6, as shown. The communication controller is interfaced with the communication medium by way of the communication medium interface unit. Typically, the communication medium interface unit is suitably adapted for the particular characteristics of the communication medium being employed in the network.

In general, communications controllers, and LAN controllers in particular, are usually integrated into a system architecture and software environment by providing the means for supporting two independent data queues in software: a transmit queue and a receive queue. Each queue is associated with a process, namely, the transmit process and the receive process of the low-level software communications driver.

The transmit queue holds the elements that the software intends to transmit. In a packet-switched environment of a local area network, these elements are usually data packets that include a block of data to be transmitted and some associated information like the destination for the block of data. The receive queue hold the elements that the station has received, again usually packets with a block of data and associated information such as the sender of the data block.

Elements are added to the transmit queue by the software driver whenever it needs to transmit information. Elements are removed from the transmit queue after successful transmission is assumed. Removal of the elements can be done either by the low-level software driver or by the communications controller. Elements are added to the receive queue by the communications controller whenever a relevant packet is received, and are removed by the low-level software driver upon processing the packet.

The transmit and receive queues are managed by software in system memory, eventually meet the communication controller. The interface between the queues and the communications controller determines the behavior of the queues during the addition of receive elements and removal of transmit elements.

Management of the transmit and receive queue elements at the level of the communication controller has been attempted in a variety of ways.

For example, some prior art communication controllers are as simple as a single element queue, in which the controller can handle only one transmit and one receive element at a time and the host processor must be involved in feeding the queue. Representative of this type of prior art is the 90C65 Communication Controller from Standard Microsystems Corporation of Hauppauge, N.Y. A major shortcoming of this type of communication controller is that it is highly sensitive to interrupt latency of the host processor.

An alternative type of prior art communication controller employs queues for transmit and receive commands while storing corresponding data packets in a randomly accessible memory associated with the communication controller. Representative of this type of prior art is the 90C66 Communication Controller from Standard Microsystems. Advantageously, this communication controller design is substantially less sensitive to interrupt latency in comparison with the above-described communication controller.

Using an altogether different technique than the command queuing scheme described above, the prior art has sought to extend the transmit and receive data queues into the communication controller by simulating transmit and receive data queues in the data packet buffer memory of the communication controller. In general, there have been several different approaches to implementing this generalized memory management technique.

For example, according to one approach, many transmit and receive data elements can be managed as a "ring buffer," in which data packet buffer memory is configured as a number of memory elements which can be sequentially allocated and accessed. Prior art representative of this approach includes the 8390 NIC Communication Controller from National Semiconductor Corporation, and the Etherstar® Ethernet Communications Controller from Fujitsu Corporation. Significant shortcomings and drawbacks of the "ring buffer" communication controller are inefficient memory utilization, high CPU overhead and memory fragmentation.

According to an alternative approach for simulating transmit and receive data queues at the communication controller level, a disjointed array of memory storage locations are linked together with the use of address pointers compiled in accordance with a "linked list". The major subcomponents of such a conventional "linked-list" data communication controller 6 are shown in FIG. 1B. In general, communication controller 6 comprises a CPU interface unit 9, a linked-list processor 10, a medium access control (MAC) unit 11, and a MAC interface unit 12. Associated with the controller is a data packet buffer memory (RAM) 13. The CPU interface unit interfaces system bus 7 with linked-list processor 10 and data packet memory buffer 13 by way of an address and data bus, as shown. The MAC interface unit interfaces medium access control unit 11 with the link-list processor and the data packet buffer memory, also by way of an address and data bus, as shown. Prior art representative of the above type device includes the TMS380 Communication Controller from Texas Instrument Corporation.

In order for the linked-list communication controller to find the memory storage location where a packet begins, as well as the storage locations where each one of the buffers (comprising a packet) begins, the software driver must perform a number of computations. Such packet address computations and the necessity of managing numerous address pointers create high software overhead. Also with this prior art approach, memory utilization is inefficient owing to the fact that pointers and linked-list structures utilize memory and because linked-lists use fixed memory allocations between transmit and receive queues.

In communication networks utilizing multiple layer communication protocols, such as the IEEE 802.5 Standard, the processing requirements of the data communication controller becomes substantially greater than when using the Arcnet, Ethernet or other single packet-type communication protocols. Specifically, the IEEE 802.5 standard, the media access control (MAC) layer protocol requires that MAC layer data packets be internally captured and processed within the data communication controller, while higher layer protocol (i.e. Non-MAC) packets are efficiently transferred to and from the associated host system for processing according to the higher layer protocol.

In communication networks utilizing multi-layer communication protocols it is a common practice to use a communication processor chip which includes a single CPU, a serial communication subsystem and a bus interface unit with a DMA controller. Associated with the communication processor chip and the host system is shared memory, referred to as adaptor RAM. Single chip communication processors using this type of architecture have been produced in the market and are described in various technical journals, e.g. "A 16-Mbit/s Adapter Chip for the IBM Token-Ring Local Area Network" by J. D. Blair, et al. in IEEE Journal of Solid-State Circuits, Vol. 24, No. 6, December 1989. One major drawback of this architecture is that the CPU in the chip handles both the MAC layer protocol and the management of host commands and transmit and receive (15.queue) buffers, thereby overloading the single CPU with too many tasks and increasing the latency of the CPU's task switching. Another drawback of this prior art design is that the CPU uses the same datapath to fetch program instructions and to execute instructions involving other data transferring units inside the communication processor chip. Naturally, this creates a bottleneck for CPU processing throughput. In such prior art designs, data transfer over the single datapath typically includes CPU program instruction fetch; CPU instruction execution; transfer of transmit packet data from the attached host memory to the adapter RAM; transfer of transmit packet data from the adapter RAM to the serial communication subsystem unit; transfer of received packet data from the serial communication subsystem unit to the adapter RAM; and transfer of received packet data from the adapter RAM to attached host system memory.

Another single chip communication processor architecture has been described in "VLSI Architecture for IEEE 802.5 Token-Ring LAN Controller" by Koichi Tanaka, et al., in The Proceedings of IEEE 1989 Custom Integrated Circuits Conference. The chip comprises of a single CPU, a state-machine DMA controller with three DMA channels, and a serial communication subsystem. An major drawback of this architecture is that the CPU is responsible for (i) handling all the host commands; (ii) starting and ending transmit and receive packets (even for Non-MAC packets destined for the host); (iii) communicating with the DMA controller to transfer packet data to and from the attached host memory; and (iv) processing MAC protocol packets. While this architecture demands high throughput from the single CPU, the CPU's access to the working FIFO/RAM memory for packet processing is greatly hindered by the need of the serial communication subsystem to access the FIFO/RAM memory using the same data bus. Naturally, this reduces the execution speed of the CPU. In 16 Mbs Token-Ring environments, 2 Mhz bus bandwidth is used by the serial communication subsystem alone, thus leaving only 2 Mhz bandwidth for the CPU instruction execution.

Thus, there is a great need in the art for a data communicating processing device capable of internally separating protocol-layer dependent data packets, and having independent data paths and multiple central processing units for internally processing data packets associated with one layer of communication protocol, while efficiently transferring data packets associated with other communication protocol-layers, to the host system.

OBJECTS OF INVENTION

Accordingly, it is a primary object of the present invention to provide a method and apparatus for buffering and selectively processing data packets within stations of a communication network which may utilize a multi-layer communication protocol.

It is a further object of the present invention to provide such apparatus in the form of a high speed data communication controller implemented as a programmable VLSI data communication processing chip adapted for use with a random access memory device shared by both the data communication controller and the host system.

It is a further object of the present invention to provide such data communication controller and method which can simultaneously process MAC layer packets within the controller, execute host system commands, perform buffer memory management functions, and efficiently transfers data packets to and from the host system.

Another object of the present invention is to provide such data communication controller and method, which utilizes two independent multi-tasking central processing units, a bus interface unit, a direct memory access (DMA) controller, and a serial communication subsystem which can be simultaneously accessed by either of the central processing units in order to transmit, receive and selectively process packets in accordance within a multi-layer communication protocol.

Yet another object of the present invention is to provide such a data communication controller and method, in which tag bits are attached to each data word associated with each transmit packet, in order to facilitate data packet separation during the data packet transmission process.

Another object of the present invention is to provide such a data communication controller and method, in which tag bits are attached to each data word associated with each received data packet, in order to facilitate data packet separation during the data packet reception process.

Another object of the present invention is to provide such a data communication controller and method, in which the words associated with data packets to be transmitted to and received from stations within the communication network, are tagged with tag bits and enqueued at both the bus interface unit and the serial communication subsystem in order to facilitate buffering of multiple data packets within the data communication controller to increase packet throughput.

Another object of the present invention is to provide such a data communication controller and method, in which each of the central processing unit has independent asynchronous access to receive data packets enqueued at the serial communications subsystem.

Yet another object of the present invention is to provide such a data communication controller and method, which utilizes extendable linked-list memory structures to implement transmit, receive and action command queues within the shared memory device.

An even further object of the present invention is to provide such a data communication controller and method, which utilizes a ring buffer type memory structure to post interrupts to the host.

A further object of the present invention is to provide such a data communication controller and method, which provides a dedicated pair of DMA channels for dynamically accessing address and other parameters from the shared memory, independent of a separate pair of DMA channels dedicated for the transmission and reception of data packets.

These and further objects of the present will become apparent hereinafter.

BRIEF DESCRIPTION OF THE DRAWINGS

For a more complete understanding of the present invention, the attached description of the illustrative embodiment is to be taken in connection with the following drawings, in which:

FIG. 2A is a schematic representation of the data communication controller of the present invention, illustrating the Buffer Management CPU, Dynamic Memory Access Controller, the Bus Interfaces Unit, the MAC CPU, the Serial Communication System, internal buses and associated subcomponents integrated together as a VLSI circuit;

FIG. 2E is a flow chart illustrating the operation of the BMC Receive Packet Filter in the serial communication subsystem;

FIG. 2G is a flow chart showing sets of Boolean Equations which govern the operation of the Transmit FIFO Arbitor Unit;

FIG. 2H is a high-level flow chart illustrating the MAC CPU interrupt routine carried out by the MAC CPU in order to pass control over the transmit channel of the Serial Communication Subsystem, to the Buffer Management CPU;

FIG. 2I is a high-level flow chart illustrating the Buffer Management CPU Interrupt Routine carried out by the Buffer Management CPU in order to pass control over the transmit channel of the Serial Communication Subsystem, to the MAC CPU;

FIG. 2J is a block functional diagram of the Transmit FIFO;

FIG. 3C is a schematic representation illustrating the format of the System Configuration Pointer Block;

FIG. 3D is a schematic representation illustrating the format of the System Control Block;

FIG. 3E is a schematic representation illustrating the format of the Action Command Blocks comprising the Action Command Queue (i.e. chains) of the present invention;

FIGS. 7A through 7C, taken together, provide a flow chart illustrating the various tasks performed by the host system and the data communication controller during a packet transmission process in accordance with the present invention;

FIGS. 8A through 8D, taken together, provide a flow chart illustrating the various tasks performed by the data communication controller and the host system during a packet reception process in accordance with the present invention.

SUMMARY OF INVENTION

According to one aspect of the present invention, a data communication controller is provided. In the illustrative embodiment, the data communication controller is implemented as a single CMOS VLSI chip, comprising two central processing units (e.g. Reduced Instruction Set Computing (RISC) Processors), each having its own arithmetic logic unit (ALU) and independent data pathways through a serial communication subsystem. One central processing unit performs the MAC layer protocol functions, while the other central processing unit executes host transmit and receive commands, and manages the transmit and receive packet data buffers associated with higher layer communication protocol. Efficient processing is accomplished through the use of independent data buses, and independent instruction fetch buses for each central processing unit. The serial communication subsystem includes a transmit FIFO and a receive FIFO having independent output ports, each of which is connected to one of the central processing units.

In accordance with another aspect of the present invention, a method of buffering data packets within a computer station is provided. In general, the method utilizes one or more tag bits associated with words or data being received and transmitted.

As a result of the present invention, efficient multi-processing is achieved within a single communication processing chip, thereby improving node and network data throughput.

DETAILED DESCRIPTION OF ILLUSTRATIVE EMBODIMENT

Figure 1:
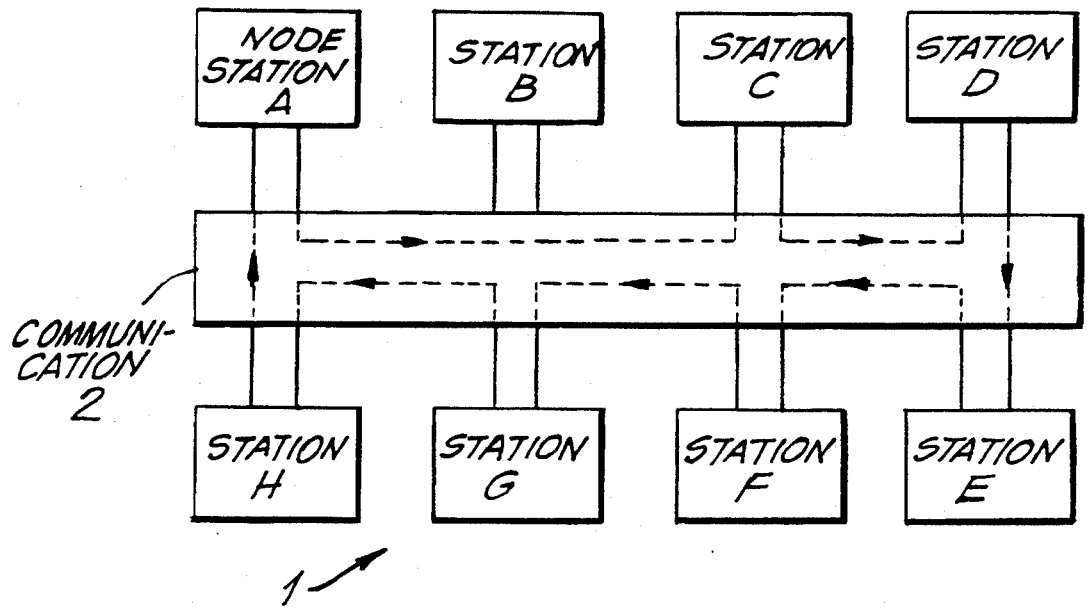
FIG. 1 is a schematic representation of a local area network system permitting a plurality of stations to access a communication medium utilized in accordance with a communication network protocol.
Figure 1A:
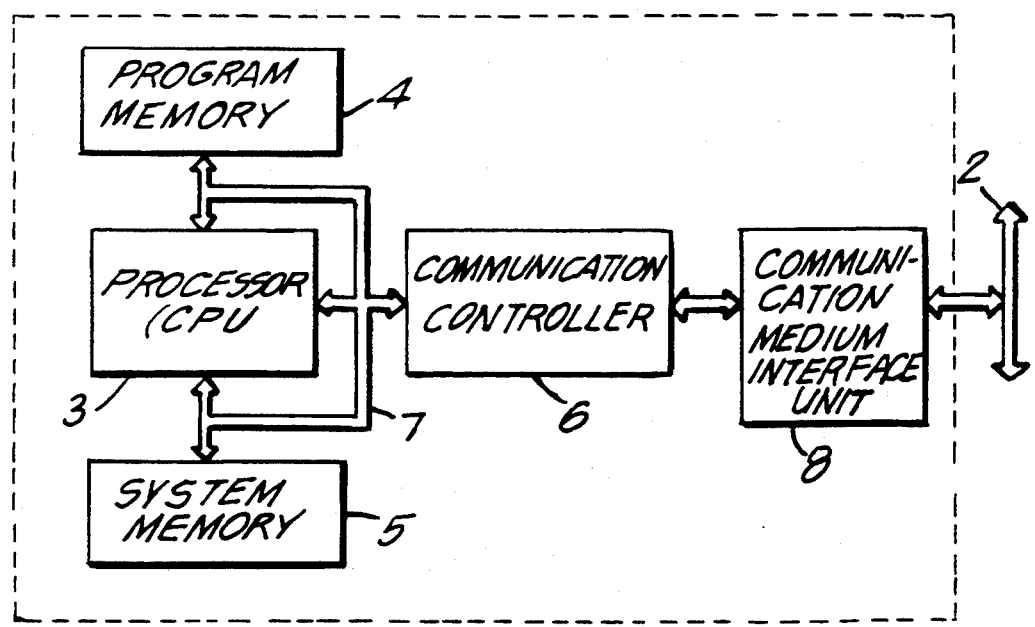
FIG. 1A is a block functional diagram of a prior art station within the local area network of FIG. 1, showing the major components of each station.
Figure 1B:
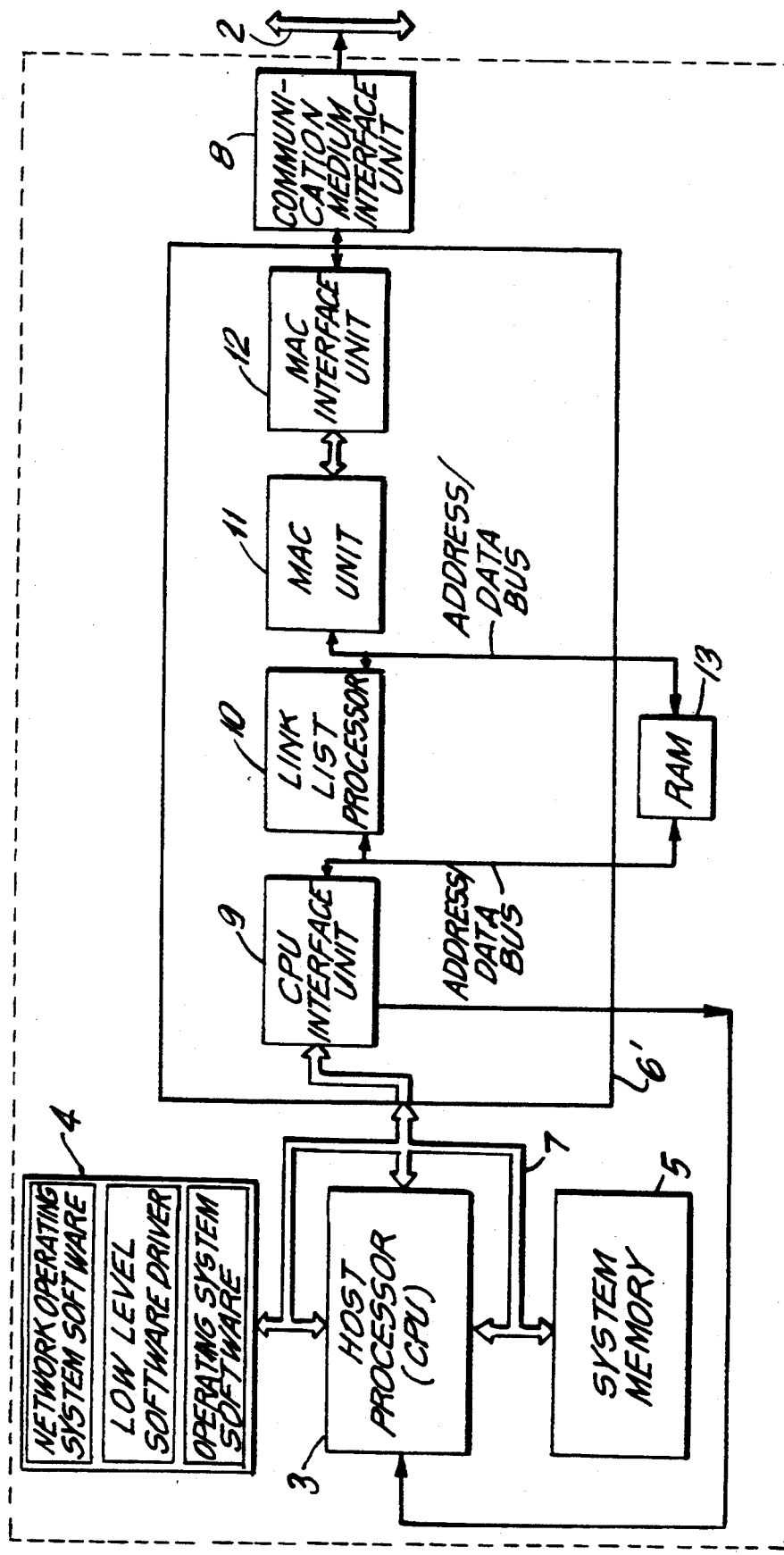
FIG. 1B is a block functional diagram of a prior art station illustrated in FIG. 1, showing the functional subcomponents of a conventional linked-list data communication controller incorporated therein.
Figure 2:
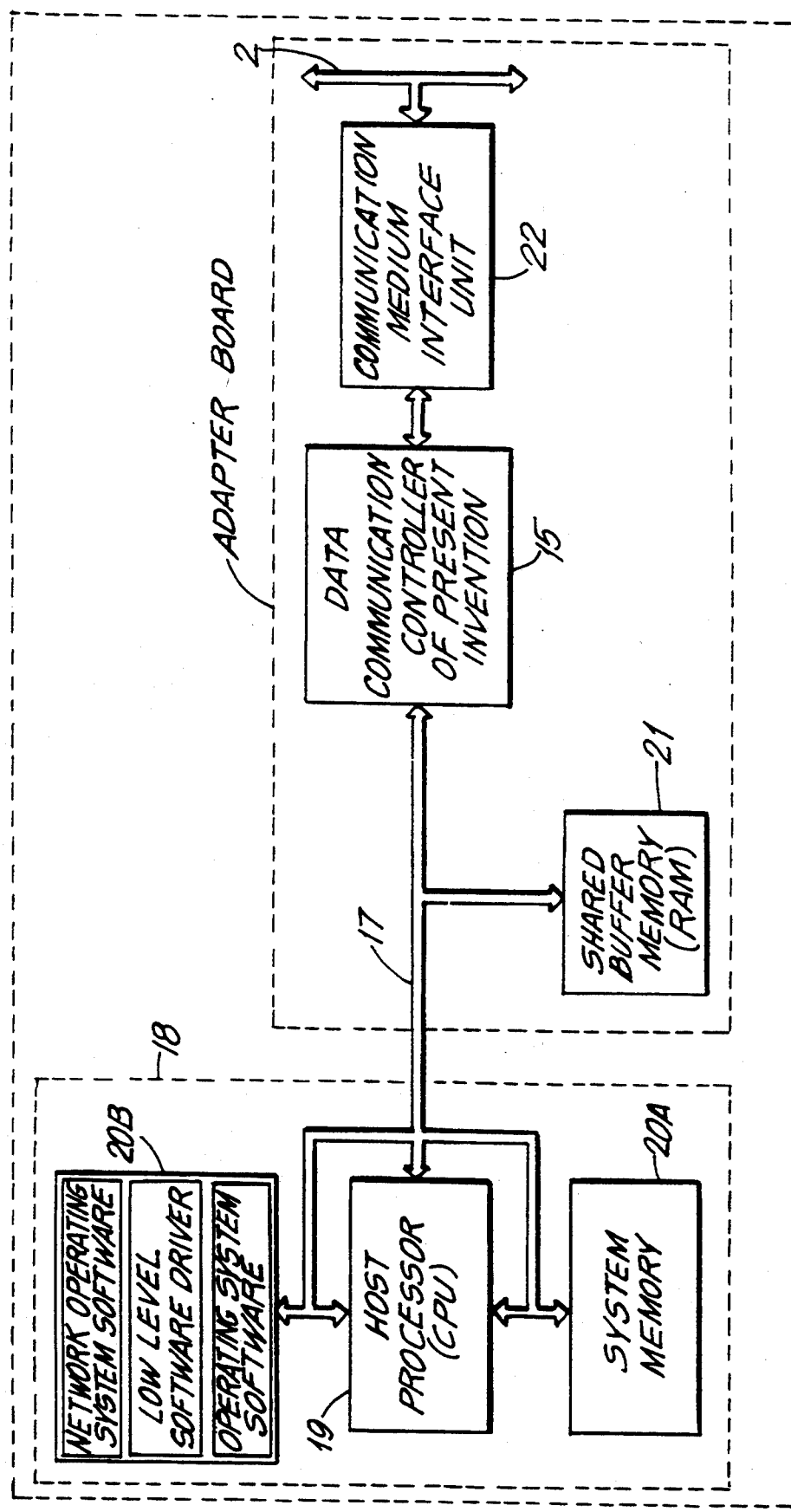
FIG. 2 is a high-level schematic representation of a data communication controller constructed in accordance with the present invention, interfaced with a host computer system, shared buffer memory and a communication medium interface unit.

Referring to FIG. 2, the programmable (VLSI) data communication controller chip 15 of the present invention, hereinafter "data communication controller" (DCC), is shown with its parallel I/O port 16 interfaced with the system bus 17 of host computer system 18. As shown, host system 18 has a host processor 19, program memory 20B and system memory 20A. In order to buffer transmit and receive packets and exchange between each other information such as protocol and configuration parameters, a randomly accessible shared buffer memory (e.g. RAM) is interfaced with system bus 17. Also, a conventional communication medium interface device 22 is provided to interface between serial I/O port 23 of the data communication controller and communication medium 24. For purposes of illustration, the communication network into which the data communication controller of the present invention is inserted, is a Token-Ring Network having a network communication protocol defined by the well known IEEE 802.5 Standard. For a detailed description of the Token-Ring configuration, formats and facilities used with this standard, see page 25–84 of "Information Technology Local and Metropolitan Area Networks—Part 5: Token Ring Access Method and Physical Layer Specifications", Technical Committee on Computer Communications of the IEEE Computer Society, March 1992, published by The Institute of Electrical and Electronics Engineers, Inc.

While not schematically illustrated in FIG. 2, Eight Access-Class Transmit Queues, one MAC-Packet Receive Queue, and one Non-MAC Packet Receive Queue are managed in each station's shared buffer memory 21, using a software based low-level driver under the control of the host processor. This particular queuing structure is necessitated by the IEEE 802.5 Standard, and understandably will vary in relation to the communication network protocol utilized in each particular application. As will be described in greater detail hereinafter, each station in the Token-Ring Network will have a data communication controller of the present invention, and each such controller incorporates a dedicated MAC CPU running the IEEE 802.5 MAC layer standard, and ultimately the data communication controller's access to the communication medium. To carry out the network protocol, each MAC CPU in each station's data communication controller must perform the same IEEE 802.5 MAC layer protocol. As will be described in greater detail hereinafter, host processor interrupts provided by the data communication controller are the basic scheduling events upon which the low-level driver manages the flow of data packets between transmit and receive queues and the data communication controller.

As illustrated in FIG. 2A, data communication controller 15 of the present invention comprises a number of major components, namely: a DMA Controller 25; Bus Interface Unit 26; a Buffer Management CPU (BMC) 27 and associated program ROM 28; a MAC CPU 29. and associated program ROM 30; a Serial Communication Subsystem 31; dual-ported RAM 32; communication register blocks 33; BMC interrupt register blocks 34; MAC interrupt register block 35; protocol timers and miscellaneous register blocks 36; transmit channel multiplexer (TX MUX) 37; receive channel multiplexer (RX MUX) 38; and clock generator 39.

The DMA controller comprises a four channel DMA Channel Address Unit 40, each DMA channel having an external address counter, an internal address counter, a byte counter and associated logic circuitry; an Address FIFO 41; a Bus Interface Controller (BIC) 42; and a DMA Control and Arbitor Unit 43. As shown, the Bus Interface Unit also comprises a number of subcomponents namely: a Data Input FIFO (DIN FIFO) 44; a Data Output FIFO (DOUT FIFO) 45; and a bus switch 46 controllable by the DMA Control and Arbitor Unit. Likewise, the Serial Communication Subsystem comprises a number of subcomponents, namely: a Transmit FIFO 47, a Transmit Arbitor 48, a Transmit FIFO Input Multiplexer 49, and a Packet Transmission Machine 50 along the transmit channel; and a dual-port Receive FIFO 51, a MAC Receive Packet Filter 52, a BMC Receive Packet Filter 53, and a Packet Reception Machine 54 along the receive channel of the subsystem; and a Token Control Unit 55.

As illustrated in FIG. 2A, the BMC has a program instruction fetch bus 56 operably connected between program ROM 28 and BMC in order to fetch program instructions, whereas a separate program instruction execution bus (comprising data lines 57 and address and control lines 58) is provided to operably associate the BMC with DMA Channel Address Unit 40, DMA Control and Arbitor Unit 43, Transmit Channel Multiplexer 37, Receive Channel Multiplexer 38, Packet Transmission Machine 50, BMC Interrupt Register Block 34; Communication Register Block 33, and Dual-ported RAM 32.

In the illustrative embodiment, Address FIFO 41 has a depth of three with each address location having a width of 24 bits and seven (7) tag bits associated with each address. As illustrated, both the insert and removal locations in the Address FIFO are specified by insert and removal pointers 60 and 61 generated by BIC 42. As shown, the addresses generated from DMA Channel Address Unit are provided to the insert location of the Address FIFO, whereas the tag bits provided to the insert location thereof are generated by the DMA Control and Arbitor Unit. The particular functions which these DMA channel tags serve will be described in greater detail hereinafter.

As illustrated in FIG. 2A, DIN FIFO 44 and DOUT FIFO 45 each have a depth of three with the word location of each FIFO being 16 bits. The DIN FIFO has five (5) tag bits associated with (i.e. attached to) each word read using the address originally associated with the tag bits in the Address FIFO. The insert and removal locations in DOUT FIFO are specified by insert and removal location pointers 60 and 61, which are simultaneously generated by the BIC when generating the removal and insert pointers for the Address FIFO. The insert and removal locations in DIN FIFO are specified by insert and removal location pointers 62 and 63 generated by the BIC.

The entry location in the DIN FIFO and the removal location in the DOUT FIFO are connected to the lines of system data bus 64, whereas the removal location in the Address FIFO is connected to the lines of system address bus 65. Data word bits in the removal location of the DIN FIFO are provided to data bus 66 which extends into Bus Switch 46. The tag bits of the removal location in the DIN FIFO are provided to the DMA Control and Arbitor Unit by way of lines 67. The data word bits from the Receive FIFO are eventually provided to the insert location in the DOUT FIFO by way of bus 68 extending from Bus Switch 46. System control signals and control attention (CA) signal are provided to BIC over control lines 69 and 70, whereas the Interrupt (INT) Signal is provided by the BIC to the host processor over line 71.

As will be described in greater detail hereinafter in connection with FIG. 2B, a number of signals are transmitted between the DMA Control and Arbitor unit and the BMC to generate INT and other system control signals. Also, control signals are generated by the DMA Control and Arbitor unit so as to arbitrate among the four DMA Channels according to a preselected arbitration scheme.

As illustrated in FIG. 2A, a first unidirectional data bus 72 extends between Bus Switch 46 and one input port of transmit channel multiplexer 37, whereas a second unidirectional data bus 73 extends between one output port of receive channel multiplexer 38. Control line 74 extends from the DMA Control and Arbitor Unit to multiplexer 37 to selectively switch between data bus 72 or BMC data bus 57. The output of multiplexer 37 is connected to one input port of input Transmit FIFO multiplexer 49 by way of a third data bus 76, whereas one output port of Receive FIFO 51 is connected to the input port of multiplexer 38 by way of a fourth data bus 77. Control line 75 permits multiplexer 38 to selectively switch between data buses 57 and 73.

In order to generate interrupts to the BMC upon the occurrence of particular events within the data communication controller, BMC interrupt Register Block 34 contains a plurality of interrupt signal sources, into which flags can be set by the DMA Control and Arbitor Unit. The BMC Receiver Packet Filter, the Transmit FIFO Arbitor and the Packet Transmission Machine using lines 78, 79, 80 and 81, respectively. Flags set in BMC Interrupt Register Block 35 can be read by the BMC and the DMA Control and Arbitor Unit over data bus 57, while BMC interrupts are provided to the BMC over interrupt line 82 as shown. Similarly, interrupt flags can be sent in CPU Interrupt Register Block 35 by the Packet Transmission Machine, the Transmit Arbitor, the MAC Receiver Packet Filter, and Protocol Time Register Block 36 over lines 83, 84, 85 and 86, respectively. BMC Interrupts are sent over line 87 to the MAC CPU.

As illustrated in FIG. 2A, the MAC CPU has a program instruction fetch bus 88 operably connected between program ROM 30 and MAC CPU in order to fetch programs instructions. Also, a separate program instruction execution bus (comprising data lines 89 and address and control lines 90) is provided to operably associate the MAC CPU with dual-ported RAM 32, Communication Register Block 33, Packet Reception Machine 31, MAC Receiver Packet Filer 52, Transmit Arbitor 48, multiplexer 49 Packet Transmission Machine 50, MAC Interrupt Register Block 35, and Protocol Timers and Miscellaneous Register Block 35, as shown.

As shown in FIG. 2A, a programming port 91 is provided in the data communication controller in order that external program memory (RAM or ROM) may be accessible to the MAC CPU by way of multiplexer 92. In this way the MAC layer protocol can be simply changed from application to application as desired.

As the MAC CPU is not capable of accessing shared memory 21, various parameters destined for the MAC CPU are first written by the host system into shared memory and then accessed by the BMC, which stores them into RAM 32 or Register 33. Thereafter, this data can be subsequently accessed to the MAC CPU. To achieve such tasks, a communication pathway is provided between the BMC and the MAC CPU using Dual-port RAM 32 and Communication Register Block 33, which are operably connected between the program instruction execution buses 57 and 89 of the BMC and MAC CPU, respectively. Thus, for example, using dual-ported RAM 32, the MAC CPU can communicate directly with the BMC, and using the Communication Register Block 33, the MAC CPU can communicate indirectly with the host system.

Parameters relating to MAC layer protocol timing and related functions are stored in the Protocol Timers and Miscellaneous Register Block, and are accessible to the MAC CPU by way of program instruction execution bus 89.

In the illustrative embodiment, Transmit FIFO 47 has a depth of 16 storage locations, with each storage location having a width of 18 bits, 16 bits for data words and 2 associated tag bits for indicating the location of data within words and the packet boundaries which is highly advantageous for packet assembly at the packet transmission machine. The specific types of tag bit sequences will be described in greater detail hereinafter. As illustrated, the insert location (i.e. port) in the transmit FIFO is specified by an insert located pointer 93 generated by the Transmit Arbitor. The output port of transmit FIFO input multiplexer 49 is connected to the data word insert location in the transmit FIFO to transfer data words thereto, whereas the tag bits are provided to the tag bit insert location in the transmit FIFO. As will be described in greater detail hereinafter, the specific values of the transmit FIFO tag bits are decided by the BMC using Write TX_FIFO-TAG flags sent over address/control bus 58 to the Transmit Arbitor stored therein, and eventually written as TX_FIFO-Tag bits in the transmit FIFO. As will be explained in greater detail hereinafter, the primary function of the Transmit Arbitor is to give either the MAC CPU or BMC control over the transmit channel.

The removal location in the Transmit FIFO is specific by removal location pointer 94 specified by the Packet Transmission Machine. The data word bits and the TX_FIFO_tag bits from the removal location of the transmit FIFO are provided to separate input ports in the Packet Transmission Machine and processed in a manner to be described in greater detail hereinafter. The primary function of the Packet Transmission Machine is to utilize the TX_FIFO_TAG bits to assist in the assembly of packets transmitted under the control of the BMC or MAC CPU. The output of the Packet Transmission Machine is a serial bit stream provided over the TXD line as output to communication medium interface unit 22, with clock signals over the MRCLK line in a manner well known in the art.

In the illustrative embodiment, Receive FIFO_ has a depth of 32 storage locations, each storage location having a width of 17 bits, 16 bits for a data word, and one (1) tag bit (i.e. RX_FIFO_TAG BIT) associated with each received data word. As will be described in greater detail hereinafter, to the function of the FX_FIFO_TAG bits is to indicate which words belong to a received packet, so that a number of received packets, each of variable length, can be buffered in the Receive FIFO, thereby increasing data throughput. The insert location of the Receive FIFO is specified by a input pointer 95 generated from Packet Reception Machine. Words of data received from the Packet Reception Machine are provided to the 16 bit locations in the input port (i.e. insert location) of the Receive FIFO, while the RX_FIFO_TAG bit is provided to the tag bit location by the Packet Reception Machine. The bit input line RXD, the clock line RXCLK and other signals from communication medium interface unit 22 are provided to the input port of the Packet Reception Machine in a manner well known in the art.

To provide both the MAC CPU and the BMC access to MAC-packets and Non-MAC packets, the Receive FIFO has two independent output ports, with the 16 data bit locations of output port A operably associated with data bus 89, while the 16 data bit locations of output port B are operably associated to data buses 57 and 73. As shown, the removal location of output port A is specified by an output pointer 96 generated from within the MAC Receiver Packet Filter, whereas the removal location of output port B is specified by an output pointer 97 generated from within the BMC Receive Packet Filter. Also, the tag bit location from output port A is provided as input to the MAC Receive Packet Filter, whereas the tag bit location from output Port B is provided as input to the BMC Receive Packet Filter. As will be described in greater detail hereinafter, packets can be independently processed within the MAC and BMC Receive Packet Filters and interrupts generated to the BMC and MAC Interrupt Register Blocks upon the detection of either a MAC-packet or NON-MAC packet in the Receive FIFO. To facilitate such processes, output port A of the Receive FIFO is operably connected to an input port of MAC receive packet filter, and output port B of the Receive FIFO is operably connected to an input port of BMC receive packet filter. In this way, words associated with received data packets can be "scanned" and analyzed while in the Receive FIFO using RX_FIFO_TAG bits to determine the beginning and ending of received packets. The primary function of the MAC Packet Filter is to determine whether a received packet is a particular type of MAC-packet, in which case an interrupt flag is written into the MAC interrupt Register. This will indicate to the MAC CPU that a particular MAC packet is on data bus 89 for processing in accordance with the MAC layer protocol. The primary function of the BMC Receive Packet Filter is to determine whether a received packet is for the BMC and free of error. If so, the BMC Receive Packet Filter passes control over the reception process to the BMC, which in turn routes the received packet(s) through bus switch 46, DOUT FIFO 45, until eventually the received packets are stored within either a MAC-PACKET Receive Queue or a NON-MAC PACKET Receive Queue maintained within the shared buffer memory. The exact operations which are performed within the data communication controller of the present invention will be described in greater detail hereinafter.

Figure 2B:
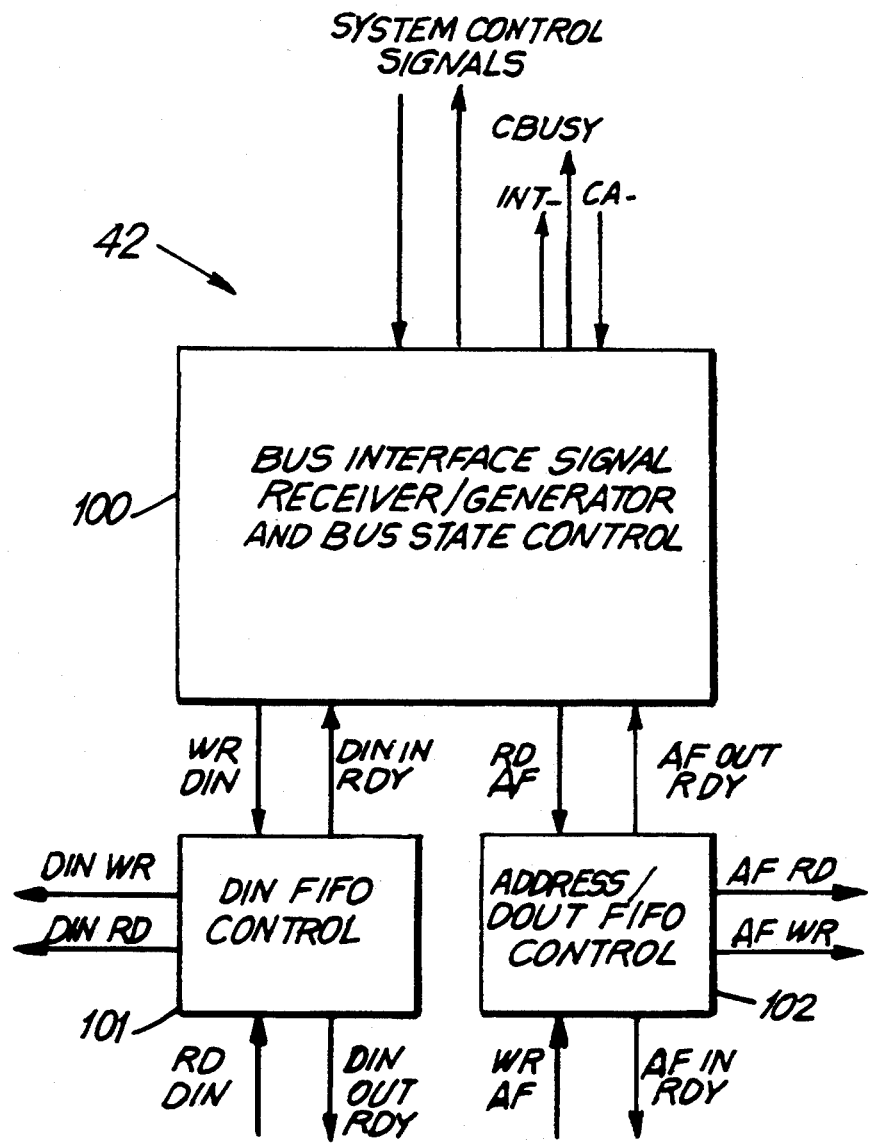
FIG. 2B is a schematic block diagram illustrating the subcomponents of the Bus Interface Controller shown in FIG. 2.

In FIG. 2B, the major subcomponents of the BIC are illustrated in greater detail. As illustrated, the BIC comprises a Bus Interface Signal Receiver/Generator and Bus State Control Unit 100, a DIN FIFO Control Unit 101 and an Address FIFO/DOUT FIFO Control Unit 102. The primary function of Unit 100 is (1) to detect Control Attention (CA) signals from the host system and other system control signals on the system bus; (2) to control the flow of data between the system bus and the internal buses within the data communication controller; and (3) to generate Control Command Busy (CBSY) and Interrupt (INT) signals to the host and other system control signals to the system bus.

As illustrated in FIGS. 2A and 2B, four primary control signals are passed between the BIC and the DMA Control and Arbitor Unit. The AF_IN-RDY signal passed from the Address FIFO/DOUT FIFO Control Unit to the DMA Control and Arbitor Unit indicates that the Address FIFO is ready for address input from DMA Address Block 40 and for Address-_FIFO_TAG bit input from the DMA Control and Arbitor Unit. The AF_OUT_RDY signal indicates that the Address FIFO contains an address in its removal location. The AF_WR signal provides the insert location pointer for the Address FIFO and DOUT FIFO, whereas the AF_RD signal provides the removal location pointer for the ADDRESS FIFO and the DOUT FIFO. The WR_AF signal controls the writing of address and tags bits into the insert location of the Address FIFO, as well as the writing of data from the Receive FIFO or BMC data bus 57 into the insert location of the DOUT FIFO. The RD_AF signal controls the reading of address bits from the removal location of the Address FIFO onto the system address bus, as well as the reading of data bits from the removal location of the DOUT FIFO onto the system data bus.

The DIN_OUT_RDY signal indicates that the DIN FIFO is ready to output data from the removal location of the DIN FIFO to the insert location of the Transmit FIFO or to the BMC instruction execution BMS through the Bus Switch 46. DIN_IN_READY indicates that the DIN FIFO is ready for data input from the shared buffer memory to the insert location in the DIN FIFO. The DIN_WR signal provides the insert location pointer for the DIN FIFO, whereas the DIN_RD signal provides the removal location pointer for the DIN FIFO. The WR_DIN signal controls the reading of address tag bits from the removal location of the Address FIFO to the tag bit insert location in the DIN FIFO and controls the writing of a data word from the shared buffer memory to the insert location in the DIN FIFO. Finally, the RD_DIN signal controls the reading of a data word from DIN FIFO to the insert location in the Transmit FIFO or BMC data bus 57.

Figure 2C:
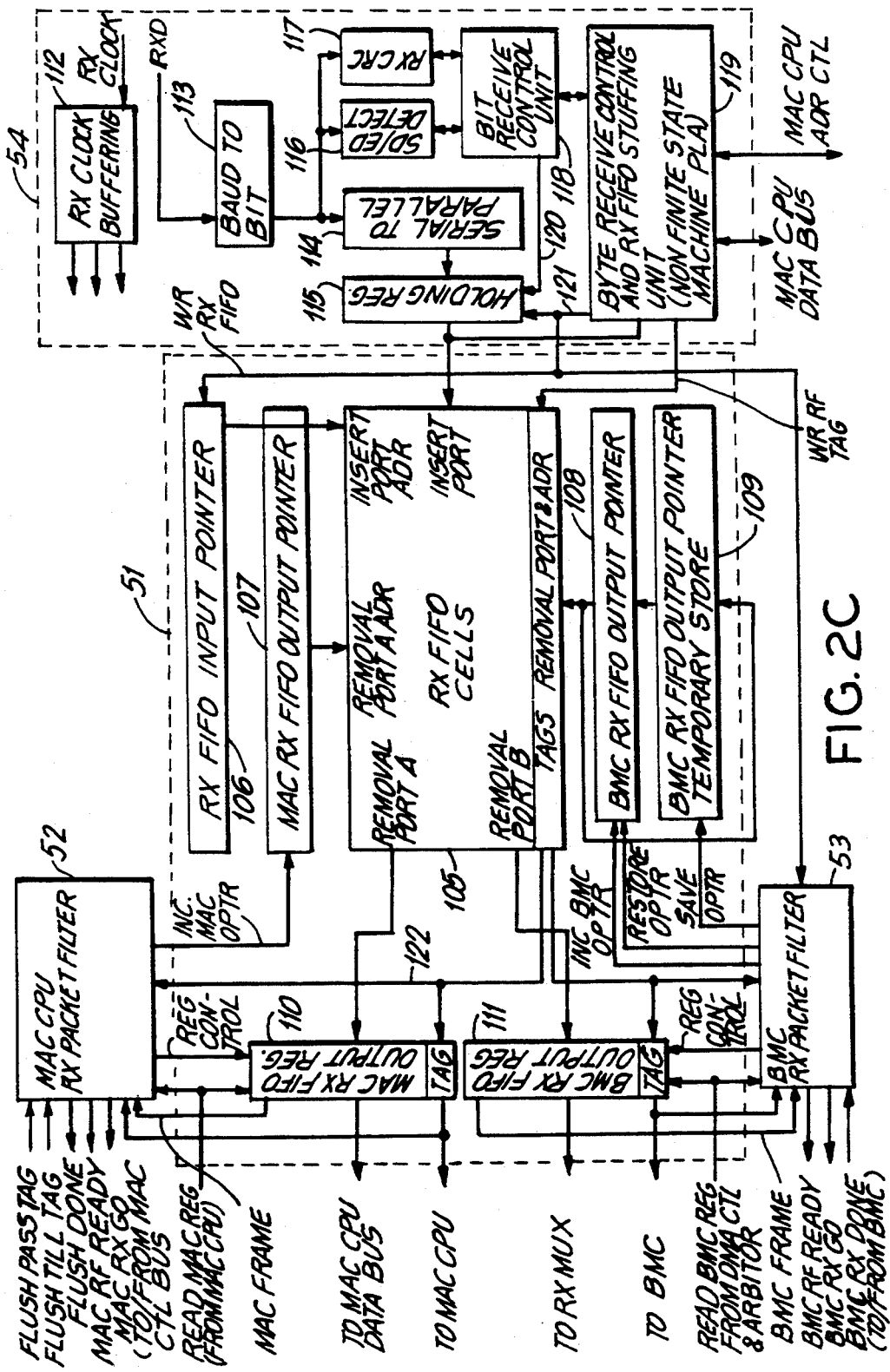
FIG. 2C is a schematic block diagram of the Packet Reception Machine, the dual-port receive First-In-First-Out Buffer (FIFO), the MAC CPU Receive Packet Filter and the Buffer Management CPU ("BMC") Receive Packet Filter.

In FIG. 2C, the subcomponents of the Receive FIFO and the Receive Packet Machine are illustrated in greater detail. As shown in FIG. 2C, the Receive FIFO comprises Receive FIFO cells 105, a Receive FIFO Input Pointer 106, MAC Receive Output Pointer 107, a BMC Receive FIFO Output Pointer 108, a BMC Receive Output Pointer Temporary Store 109, a MAC Receive FIFO Output Register 110, and a BMC Receive FIFO Output Register 111. Receive FIFO Cells 105 have insert and removal ports for data words, and insert and removal ports for RX_FIFO_TAG bits, as indicated. Address ports for insert and removal pointers are also provided as shown.

In FIG. 2C, the subcomponents of the Packet Reception Machine 54 are illustrated in greater detail. As shown, the Packet Reception Machine comprises a Receive Clock Buffering Circuit 112, a baud to bit converter 113, a serial to parallel converter 114, a 16 bit holding register 115, a SD/ED Detection Unit 116, a Receive CRC Unit 117, a Receive Bit Control Unit 118, and a Receive Byte Control/Receive FIFO Stuffing Unit 119 configured in a manner as shown. The encoded serial data input stream of the RXD line is converted into bits by baud to bit converter 113 in a conventional manner, and are loaded into serial to parallel converter 114, in groups of 16 bits. The SD/ED detection unit 116 senses the bits as they are received and sends SD and ED detection signals to Receive Bit Control Unit 118. Simultaneously, CRC error detection is performed at RX CRC Unit 117, which provides to the Receive Bit Control Unit 118, error information regarding each sequence of bits being loaded into the holding register. The Receive Bit Control Unit, in turn, provides the SD/ED detection data and CRC information to the Receive Byte Control/Receive FIFO stuffing unit, which determines and remembers which words loaded into the holding register are associated with which received data packets. Preferably, the Receive Byte Control/Receive FIFO stuffing unit is realized as a non-finite state machine constructed from a Programmable Logic Array (PLA) and associated logic circuitry, so that more than one state, in the multistate packet reception process can be held (i.e. tracked) during the packet reception on a real-time basis. A primary reason why a Non-Finite State machine is desirable in the packet reception process is due primarily to the fact that the length of any incoming packet may virtually any length, which means any number of words may comprise each received packet.

The primary task of the packet reception machine is to (1) determine which received words belong to which received packets; (2) what the length of each received packet is; (3) what the (error) status of each packet is; and (4) to write (i.e. stuff) status and packet length words along with RX_FIFO-TAG bit of value 1 in the Receive FIFO, behind the last word of a packet. In this way, the MAC and BMC Receive Packet Filters can separate one received packet from another, determine its type and then permit it to be transferred to its destination for processing.

As illustrated in FIG. 2C, the WR_WORD signal to the holding register is generated by the Receive Bit Control Unit over line 120 and controls the writing of 16 data bits into the Holding Register. The WR_RX_FIFO signal to the Holding Register is generated by the Receive Byte Control Unit over line 121 and controls the writing of the 16 bit data word from the Holding Register to the insert location (i.e. port) of the Receive FIFO cells. The WR_RX_FIFO signal is also provided to Receive FIFO Pointer 106 and the BMC receive Packet Filter to keep track of the FIFO status. The WR_RX_TAG signal provided to the TAG insertion port, is also generated by Unit 119 in order to write RX_FIFO_TAG for the packet status and packet length words loaded into the input port of the Receive FIFO under the control of Unit 119. After the last word of a received packet has been written into the Receive FIFO, Unit 119 writes, in parallel, into the insert port of the receive FIFO, a 16 bit status word (and a tag bit equal to 1) associated with the received packet, and after the words in the FIFO have been advanced forward, writes a 16 bit Packet Length Word (and a tag bit equal to 1) into the next FIFO insert location.

As illustrated in FIG. 2C, the word and tag bit locations of the removal port of the Receive FIFO are operably connected to corresponding locations in the Receive FIFO Output Register. The address of removal port A is specified by MAC Receive FIFO Pointer 107, which is incremented by the INC_MAC_OPTR signal generated by the MAC CPU Receive Packet Filter 52. The tag bits from the removal port of the Receive FIFO are also provided to the MAC CPU Receive Packet Filter over line 122. Words and tag bits at the removal port of the Receive FIFO are automatically provided to the word and tag Bit locations of the MAC Receive FIFO Output Register. In this way, the FC field of each packet in the Receive FIFO can be read by the MAC CPU Receive Packet Filter so as to determine whether the received packet is a MAC packet destined for the MAC CPU. The output of the MAC Receive FIFO Output Register is connected to bus 89, and the reading words from the output register and the MAC CPU bus is controlled by READ_MAC_Reg signal provided from the MAC CPU.

Similarly, the word and tag bits from removal port B of the Receive FIFO are automatically provided to the word and tag bit locations of the BMC Receive FIFO Output Register so that the FC field of packets and RX_FIFO_TAG bits in the Receive FIFO can be easily read to determine whether a received packet is destined for the BMC. The output of the BMC Receive FIFO Output Register is connected to the input of multiplexer 38, and the reading of words from the output register and onto the BMC bus is controlled by the READ_BMC_REG signal provided from the DMA Control and Arbitor Unit. The RX_FIFO_TAG bits from the BMC Receive Packet Filter are provided to the BMC by way of BMC address/control bus 58.

Figure 2D:
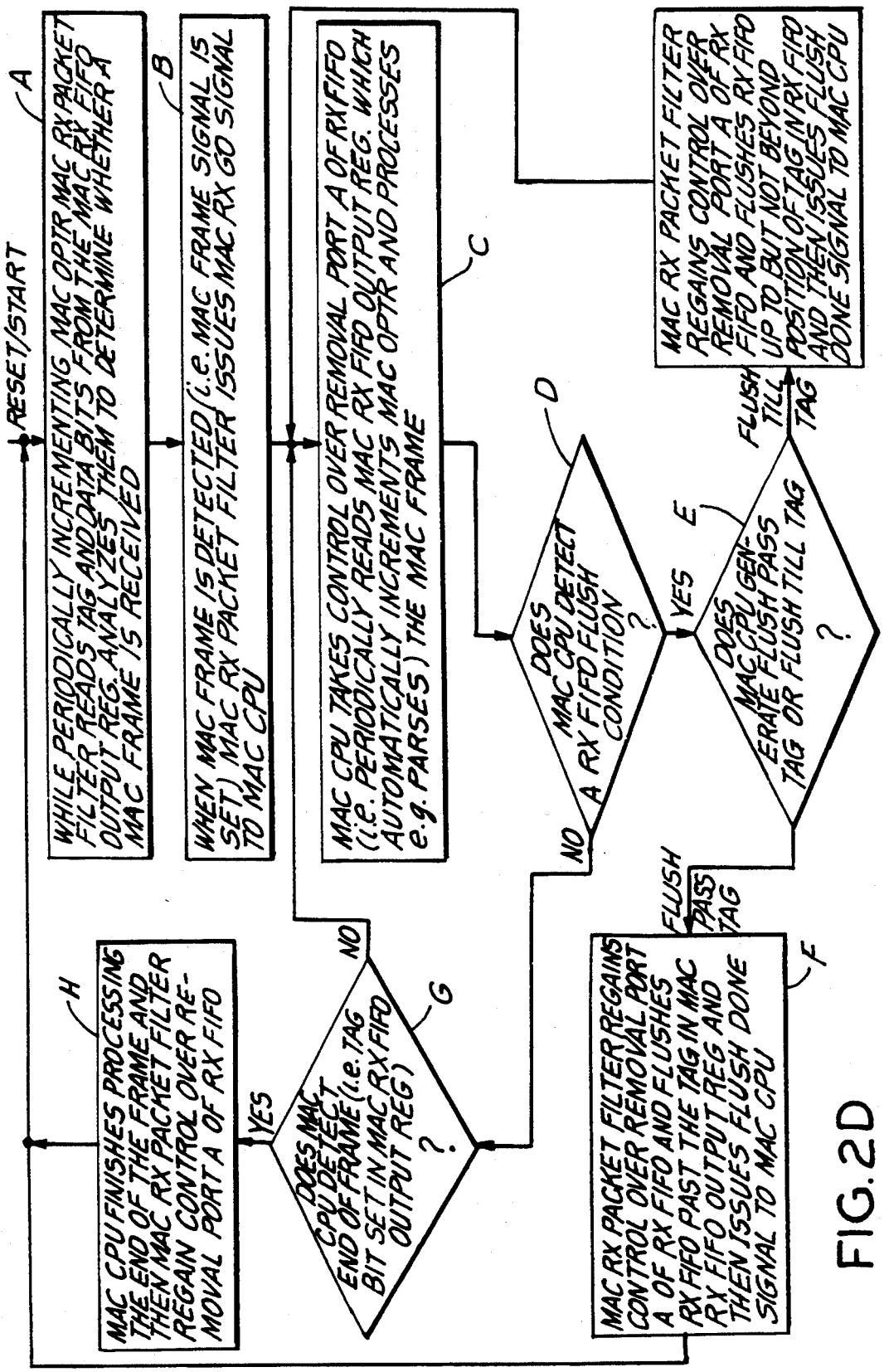
FIG. 2D is a flow chart illustrating the operation of the MAC receive packet filter in the serial communication subsystem.

The operation of the MAC Receive Packet Filter will be described with reference to the flow chart of FIG. 2D. Upon the resetting of the data communication controller (i.e. after power-up), the automatically enters Block A in FIG. 2D and periodically incrementing MAC_OUTPUT_OPTR. While doing so, the MAC Receive Packet Filter reads tag and data bits from the MAC Receive FIFO output register, and analyzes them to determine whether a MAC-Packet (i.e. frame) is received. As indicated at Block B, when a MAC-Packet is detected (i.e. MAC_FRAME_Signal is set), the MAC Receive Packet Filter issues a MAC_RX_GO sign to the MAC CPU. At Block C, the MAC CPU takes control over the removal Port A of the Receive FIFO (i.e. periodically reads MAC Receive FIFO register which automatically increments the MAC_OPTR), and processes, e.g. parses, the MAC packet. At Block D, the MAC Receive Packet Filter determines whether the MAC CPU detects a Receive FIFO "Flush," condition. If so, it then determines Block E whether the MAC CPU generated a FLUSH_PASS_TAG or a FLUSH_TILL_TAG. If a FLUSH_TILL_TAG is generated, then the MAC Receive Packet Filter regains control over removal port A of the Receive FIFO, flushes (i.e. erases data and tag bits from) the Receive FIFO up to but not beyond the position of the tag in the Receive FIFO, and thereafter issues a FLUSH_DONE Signal to the MAC CPU. At this stage, the MAC Receive Packet Filter returns to Block C and continues the process. If, however, at Block E, the MAC CPU generates a FLUSH_PASS_TAG, then at Block F, the MAC Receive Packet Filter regains control over the removal port of the Receive FIFO, flushes the Receive FIFO past the tag in the MAC Receive FIFO output Register, and then issues a FLUSH_DONE Signal to the MAC CPU.

If at Block D, the MAC CPU did not detect a Receive FIFO Flush Condition, then at Block G, it determines whether the MAC CPU detects the end of a packet (i.e. a tag bit set in the MAC Receive FIFO output Register). If not, the process returns to Block C. If, however, an End of Packet Tag bit is detected, the MAC CPU at Block H finishes processing the end of the packet and then the MAC Receive Packet Filter regains control over removal port A of the Receive FIFO.

The operation of the BMC Receive Packet Filter will be described with reference to the flow chart of FIG. 2E.

Upon resetting of the data communication controller, as described above, the BMC receive packet filter enters Block A. At this block, and while periodically incrementing BMC-OPTR, the BMC Receive Packet Filter reads tag and data bits from BMC receive output register, and analyzes them to determine whether a BMC packet has been received and also whether four words have been loaded into the receive FIFO. As indicated at Block B, when a BMC packet is detected (i.e. BMC Packet signal set) and four words have been received and loaded into the Receive FIFO, the BMC Receive Packet Filter saves the pointer at the removal port B (i.e. BMC_OPTR), and stores it in Temporary Store 109. At Block C, the BMC receive packet filter increments BMC_OPTR by 1, checks the tag at removal port B of the Receive FIFO to determine whether the tag is set to 1 (i.e. packet terminated condition), and uses the previously stored words in the Receive FIFO to check whether error conditions are present during the packet reception process. As indicated at Block D, the BMC Receive Packet Filter proceeds to Block E if either the tag bit at removal port B is equal to 1 or there is an error detected in the received packet. At Block E, the BMC Receive Packet Filter restores the BMC Receive FIFO output pointer stored in Temporary Store 109. At Block F, the BMC Receive Packet Filter flushes the Receive FIFO past the two words with a tag bit value equal to 1 in BMC Receive FIFO Output Register 111, and thereafter returns to Block A, to repeat the process.

If, however, at Block D, the tag bit at removal port B of the Receive FIFO is not equal to 1 and no error conditions have been detected in the receive packet, then at Block G, the BMC Receive Packet Filter determines whether the pointer at removal port B has been shifted up to three address value from the stored removal port B pointer (i.e. Saved_BMC_OPTR). If not, the BMC Receive Packet Filter returns to Block C. However, if it has been shifted up to three address values, then the BMC Receive Packet Filter proceeds to Block H. At Block H, the BMC Receive Packet Filter restores BMC receive FIFO output pointer stored in Temporary Store 109, and issues the BMC_RX_GO signal to the BMC. At Block I, the BMC Receive Packet Filter passes control over removal port B of the Receive FIFO to the BMC for the duration of the data packet reception process. At Block J, the BMC Receive Packet Filter determines whether any error conditions are detected in the received packet. If there are error conditions present, then the BMC Receive Packet Filter flushes the Receive FIFO past the two words with tag bits equal to 1 in the BMC Receive FIFO Output Register, and thereafter returns to Block A.

If, however, at Block J no error conditions are present in received packet and data packet reception process is not completed by the BMC (i.e. BMC_RX_DONE signal is not set), the BMC Receive Packet Filter returns to Block J. When the data packet reception process is completed, at Block L the BMC Receive Packet Filter regains control over removal port B of the Receive FIFO and continues analyzing tag and data bits in the BMC Receive FIFO Output Register, returning to Block A to close the loop of the filtering process.

Figure 2F:
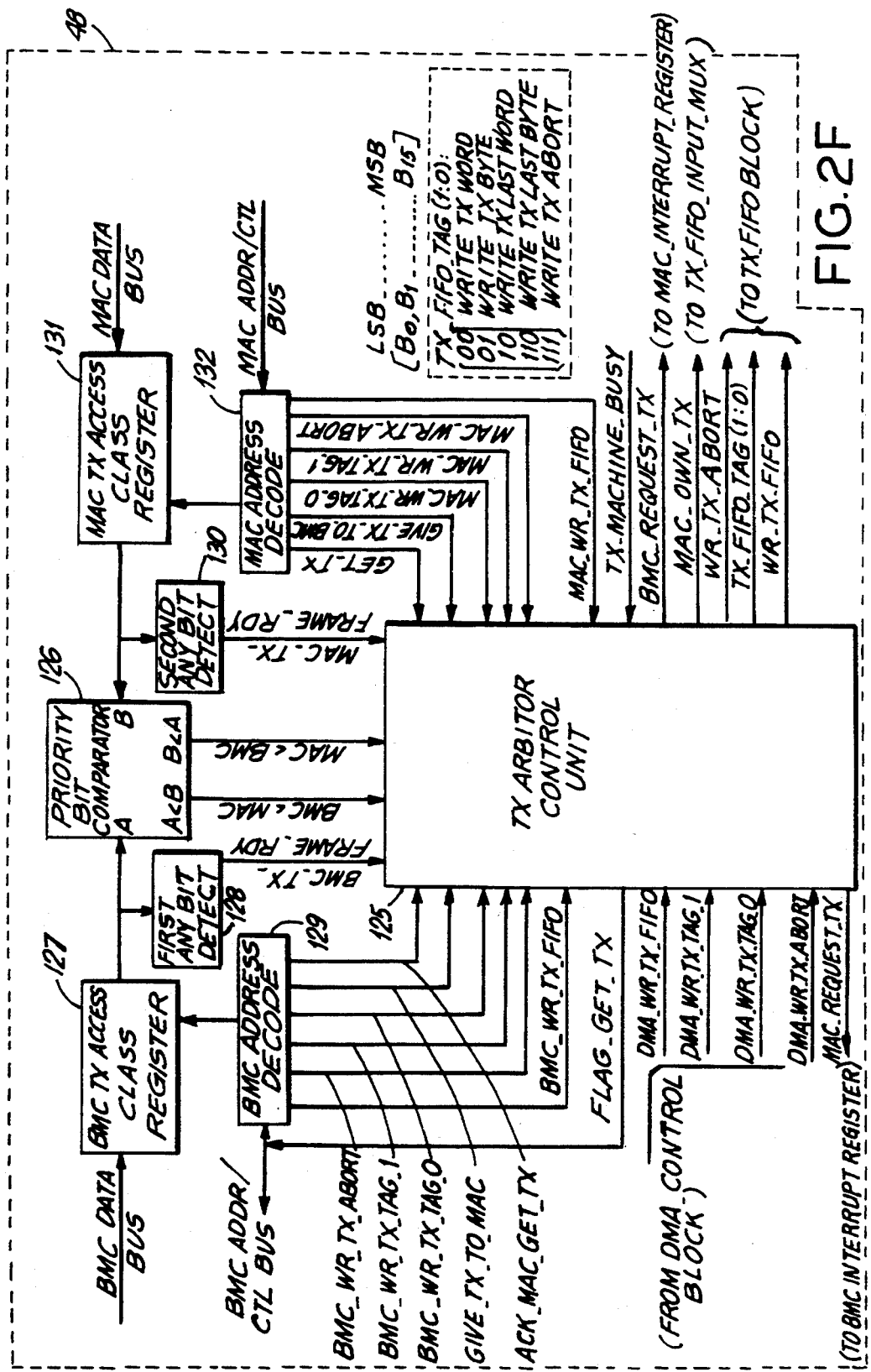
FIG. 2F is a block functional diagram of the transmit FIFO arbitor in the serial communication subsystem.

In FIG. 2F, the subcomponents comprising Transmit Arbitor 48 are shown. As illustrated, the Transit Arbitor comprises Transmit Arbitor Control Unit 125, Priority Bit Comparator 126, BMC Transmit Access-Class Register 127, any Bit Detector 128, BMC Address Decoder 129, Any Bit Detector 130, MAC Transmit Access-Class Register 131, and MAC Address Decoder 132. As illustrated, BMC data bus 57 is connected to the input of the BMC Transmit Access-Class Register and provides eight (8) BMC transmit access-class bits to this register. As will be described in greater detail, these eight bits are read by the BMC from the System Control Block (SCB). The Resume Control Word is written into the SCB by the host system to indicate to the data communication controller that it may resume packet transmission when it is ready and able to do so. Each of these eight BMC priority bits represents the priority of each Access-Class Transmit Queue stored in shared buffer memory, from which packets are sought to be transmitted through the transmission channel of the communication controller. The output of the BMC Transmit Access-Class Register is provided to port A of the Priority Bit Comparator, while Detector 128 is adapted to detect whether any bit is present in the BMC Transmit Access-Class Register. If so, Bit detector 128 issues a BMC_TX_Packet_RDY signal to the Transmit Arbitor Control Unit.

As indicated in FIG. 2F, MAC data bus 89 is connected to the input of the MAC Transmit Access-Class Register and provides MAC transmit access class bits to this register. These bits are provided by the MAC CPU and represent the priority of the MAC CPU in accessing the transmit channel at any particular instant within the MAC layer protocol. The output of the MAC Transmit Access-Class Register is provided to port B of the Priority Comparator, while Bit Detector 130 is adopted to detect whether any bit is present in the MAC Transmit Access-Class Register. If so, Bit Detector 130 issues a MAC_TX_PACKET_RDY signal to the Transmit Arbitor Control Unit. The function of the Priority Bit Comparator is to compare the BMC priority access bits (A) against the MAC priority access bits (B) when BMC_TX_PACKET_RDY and MAC_TX_PACKET_RDY signals are set to 1. If A is greater than B, then the Priority Bit Comparator issues BMC>MAC=1 signal to the Transmit Arbitor Control Unit. If, however, A<B, then the Priority Bit Comparitor issues a MAC>BMC=1 signal to the Transmit Arbitor Control Unit.

At any instant in time, the BMC and/or the MAC CPU may desire to access the transmission channel. In the case when the BMC desires to set DMA Channel 2, which controls the transmission channel during the packet transmission process, the BMC must first compete against the MAC CPU to gain control over the transmission channel and then delegate its acquired control to the DMA Arbitor and Control Unit. There will be, however, instances when the BMC, rather than the DMA Control Unit, needs to control the transmission channel, such as when aborting the transmission of data packets in the Transmit FIFO. There will also be times during the MAC layer protocol, when the MAC CPU needs either conditional or unconditional access to the transmission channel. In any of these instances of transmission channel access, the BMC, DMA Channel 2 and the MAC CPU need to (indirectly) write transmit tags into the Transmit FIFO as data words are being written thereinto. Consequently, the BMC can send control signals over the BMC address control bus, which when decoded in BMC Address Decoder 129, results in commands BMC_WR_TX_TAG_1 and BMC_WR_TX_TAG_0 being sent to the Transmit Arbitor Control Unit so that it will write a BMC-selected pair of tag bits into the Transmit FIFO. Similarly, the MAC can send control signals over the MAC address/control bus which when decoded by MAC Address Decoder 132 results in commands MAC_WR_TX_TAG_1 and MAC_WR_TX_TAG_0 being sent to the Transmit Arbitor Control Unit so that it will write a MAC-selected pair of tag bits into the Transmit FIFO. Also, when DMA Control Unit access over the Transmit FIFO, it too can send commands DMA_WR_TX_TAG_1 and DMA_WR_TX_TAG_0 to the Transmit Arbitor Control Unit so that it will write a DMA-selected pair of tag bits into the Transmit FIFO. In the illustrative embodiment, possible sequences of transmit tag bits (i.e. TX_FIFO_TAG_) are as follows:

00 Write_TX_word
01 Write_TX_BYTE
10 Write_TX_last word
110 Write_TX_last Byte
111 Write_TX_abort, where the first two bits are written in the tag bit locations and the third bit is written into the least significant bit (LSB) of the lower field of the 16 bit data word in the Transmit FIFO. In essence, these transmit FIFO tag bits are instructions to the Packet Transmission Machine specifying (i) the boundary of the transmit packets, (ii) the position of data bytes within the associated word, and (iii) what to do with such data during the packet assembling and transmission process. Specifically, transmit FIFO tag sequence 00 indicates that all 16 bits in the attached data word should be packeted and transmitted. Transmit FIFO tag sequence 01 indicates that only 1 data byte is contained in the upper field of the attached data word and that this byte is to be packeted transmitted. Transmit FIFO tag sequence 10 indicates that the 16 associated data bits are represented by the last word in the packet and should be packeted and transmitted. Transmit FIFO tag sequence 110 indicates that the last data byte is located at the upper field in the attached data word and that this byte should be packeted and transmitted. Lastly, transmit FIFO tag sequence 111 indicates that the entire packet should be discarded and an ABORT sequence should be transmitted by the TX_machine. When a particular bit sequence is requested to be written and granted, the actual process of writing (or aborting) these bits sequences occurs using signals these which are provided to the Transmit FIFO, as shown in FIG. 2G.

There are a number of other significant control signals which the transmit arbitor control unit considers before either the MAC CPU or BMC is granted control (i.e. "ownership") over the entire transmission channel. The signal which indicates which control processing unit has control over the transmission channel is indicated by MAC_OWN_TX, which if 1 indicates that the MAC CPU controls it, and if 0 indicates that the BMC owns it. The control signal which indicates the MAC CPU's unconditional demand for the transmission channel is GET_TX, whereas FLAG_GET_TX is a flag sent to the BMC to indicate that its control over the transmission channel has been taken away by the MAC CPU. If the BMC acknowledges FLAG_GET_TX by setting flag ACK_MAC_GET_TX, in response thereto, the MAC CPU will automatically return control over the transmission channel to the BMC when the MAC CPU has finished using it.

The arbitration process for the transmission channel is controlled by logic circuitry implemented with Transmit Arbitor Control Unit. This logic circuitry is described by the five (5) sets of Boolean equations set forth in the table of FIG. 26. Boolean equation set (1) describes under what conditions the FLAG_GET_TX flag is sent to the BMC, and under what condition the FlAG is cleared by the BMC. This flag is important to the channel arbitration process, as it permits the BMC to logically resume its operations after the transmission channel has been taken away by the MAC CPU. Boolean equation set (2) describes under what condition the MAC CPU controls (i.e. owns) transmission channels and under what conditions it does not. Boolean equations set (3) describes under what conditions a BMC_Request_TX is sent to MAC interrupt register block 34, and under what conditions a MAC_Request_TX is sent to BMC Interrupt Register Block 34. Boolean equation sets (4) and (5), respectively, describe under what condition the MAC CPU controls the transmission channel and under what conditions the BMC controls the transmission channel. These Boolean expressions can be utilized to implement the logic circuitry of the Transmit Arbitor Control Unit in a straightforward manner.

FIG. 2H illustrates the interrupt routine performed by the MAC CPU when passing transmission channel control to the BMC. As illustrated, when BMC_Request_TX=1, the MAC CPU is interrupted. In servicing this interrupt, the MAC CPU issues instructions through MAC address/control bus 90 to the MAC Address Decoder 132, which generates the signal GIVE_TX_TO_BMC=1 to the Transmit Arbitor Control Unit, which in turn sets flag MAC_OWN_TX=0, thus passing control over the transmission channel to the BMC. Thereafter, the MAC CPU returns from the interrupt and resumes its tasks according to MAC layer protocol.

FIG. 2I illustrates the interrupt routine performed by the BMC when passing transmission channel control to the MAC CPU. As illustrated, when MAC_Request_TX=1, then the BMC is interrupted. In servicing this interrupt, the BMC issues instructions through BMC address/control bus 58 to BMC Address Decoder 129, which generates the signal GIVE_TX_TO_MAC=1 to the Transmit Arbitor Control Unit, which in turn sets flag MAC_OWN_TX=1, thus passing control over the transmission channel to the BMC. Thereafter, the BMC returns from the interrupt and resumes its tasks.

In FIG. 2J, the subcomponents of Transmit FIFO 51 are shown. As shown, the Transmit FIFO comprises Transmit FIFO cells 134, Input Pointer 136, Output Pointer Decoder 137, Output Read Pointer 138, and Transmit FIFO Control Unit 139. As shown, the 16 data lines from the output port of multiplexer 49 are connected to the 16 bit locations at the insert location of transmit FIFO Cells 134. In order to utilize bit-0 of this bus for writing Transmit Abort bit sequences (i.e. 111) as described above, an OR gate 140 is inserted in the bit-0 data line, as shown, so that the output of the OR gate is connected to the bit _0 in the insert location of the transmit FIFO, while the WR_TX_ABORT line from the Transmit Arbitor Control Unit is one input to the OR gate while the bit-0 line from input multiplexer 49 is the other input thereto. The two TX_FIFO_TAG lines are connected to the two tag bit locations in the insert location of the Transmit FIFO.

Figure 2K:
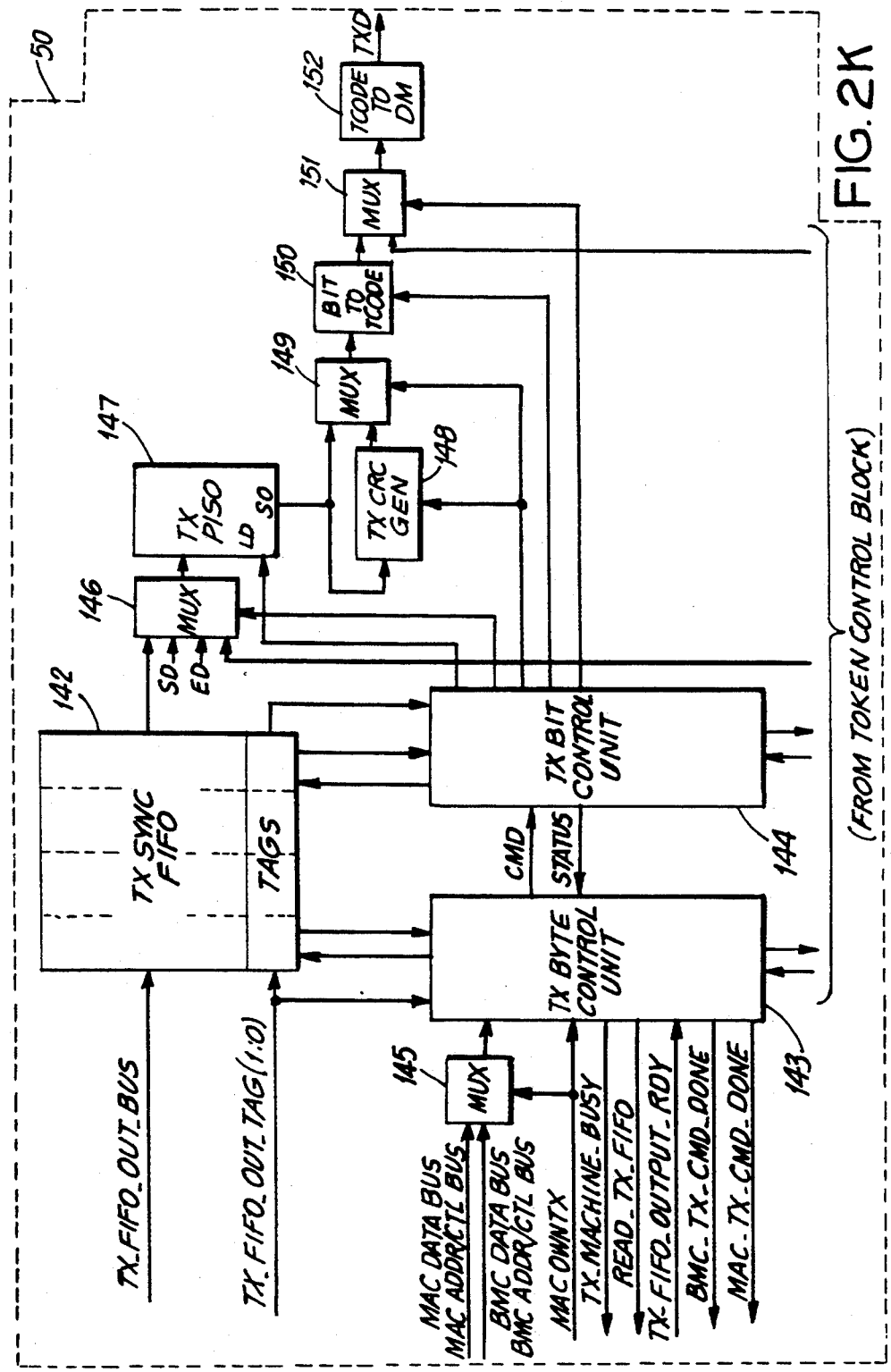
FIG. 2K is a block functional diagram of the Packet Transmission Machine.

As illustrated in FIGS. 2J and 2K, the 16 bit TX_FIFO_OUT_BUS lines from the removal location of the Transmit FIFO are connected to the 16 bits of the insert location of Transmit synchronizing FIFO 142 of the Packet Transmission Machine. The two TX_FIFO_OUT_TAG lines from the removal location of the Transmit FIFO are connected to the two tag bits of the insert location of the Transmit Synchronization FIFO. The WR_TX_FIFO lines from the Transmit Arbitor Control Unit is connected to the Transmit FIFO Control Unit to control writing of bits and tags into the Transmit FIFO, whereas the TX_FIFO_INPUT_RDY line is sent back to the Transmit Arbitor Control Unit to advise that the Transmit FIFO is ready to be written into. The WR_TX_FIFO line is connected to Input Write Pointer 136 in order to control the insert pointer to the Transmit FIFO cells As illustrated in FIGS. 2J and 2K, the READ_TX_FIFO line is connected from Transmit Byte Control Unit 143 to the Transmit FIFO Control Unit to advise that the Packet Transmission Machine is ready to read a word and tag bits from the Transmit FIFO. The read-TX-FIFO line is also connected to Output Read Pointer 138 to control the removal location pointer in the transmit FIFO. The TX-FIFO-OUTPUT-RDY line from the transmit FIFO is connected to Transmit Byte Control Unit 143 to advise that the Transmit FIFO is ready to output word and tag bits to the Transmit Synchronization FIFO.

As illustrated in FIG. 2K, the Packet Transmission Machine comprises a number of major subcomponents, namely: Transmit Byte Control Unit 143, Transmit Bit Control Unit 144, MAC/BMC Bus Multiplexer 145, First Multiplexer 146, Transmit Parallel-In-Serial-Out (PISO) Converter 147, Transmit CRC Generator 148, Second Multiplexer 149, Bit-Code-To-T-Code Converter 150, Third Multiplexer 151, and T-Code To Differential Manchester Code Converter 152. In the illustrative embodiment, the depth of transmit synchronization FIFO is four (4), with each word location having a width of 16 bits and each attached tag location having a width of 2 bits.

As the primary function of the packet transmission machine is to perform packet and token generation procedures, the machine must know which central processing unit (CPU) controls the transmission channel at each instant in time. This is achieved by providing the MAC-OWN-TX line from the Transmit Arbitor Control Unit to the Transmit Byte Control Unit. Whichever central processing unit controls the transmission channel, it is capable of issuing "transmit packet commands" over its system bus, to the Transmit Byte Control Unit. To facilitate this transmit command delivery process, the MAC, the BMC and data and address/control buses are selectively connected to the Transmit Byte Control Unit through Bus Multiplexer 145, using the MAC-OWN-TX line to provide a bus selection control signal.

In order to advise the Transmit Arbitor Control Unit that the packet transmission machine is busy, a TX-Machine-Busy line is connected from the Transmit Byte Control Unit to the Transmit Arbitor Control Unit. In order to advise the BMC that its transmit packet command has been executed, a MMC-TX-CND-Done line is connected from the Transmit Byte Control Unit to the BMC Interrupt. Register Block. Similarly, to advise the MAC CPU that its transmit packet command has been executed, a MAC-TX-CMD-Done line is connected from the Transmit Byte Control Unit to the CPU Interrupt Register Block.

Once the Transmit Byte Control Unit receives a transmit packet command from either the MAC CPU or BMC, it then begins to read data from the Transmit FIFO into the Transmit Synchronization FIFO, and then uses the tags to determine packet boundaries and then performs the IEEE 802.5 Standard. To achieve the packet assembly and transmission process, the insert location of the Transmit Synchronization FIFO is specified by an insert location pointer generated by the Transmit Byte Control Unit. The removal location of the Transmit Synchronization FIFO is specified by the Transmit Bit Control Unit. The Transmit Byte Control Unit is adapted to read the tag bits from the Transmit Synchronization FIFO so that it can determine where data bytes reside in the buffered words for purposes of packet assembly. On the basis of detected tag bits, packet assembly commands are issued from the Transmit Byte Control Unit to the Transmit Bit Control Unit for execution. The execution of these packet assembly commands involves the Bit Control Unit selectively reading bytes from the removal location of the Synchronization FIFO, passing these bytes are passed through Multiplexer 146, to the Transmit PISO Unit, along with SD, ED and other bits from Token-Ring Control Block 55. This packet assembly process occurs under the control of Transfer Bit Control Unit.

In the illustrative embodiment, the Transmit Byte Control Unit is implemented as a Programmable Logic Array (PLA) with subroutine and interrupt capabilities. The Transmit Bit Control Unit is implemented by a Finite-State Machine performing the IEEE 802.5 Standard. In accordance with the token-ring packet format set forth in the IEEE 802.5 Standard, the 32 bit cyclic redundancy check (CRC) sequence is generated by Transmit CRC Generator 148, and is then inserted behind the information field using Multiplexer 149 under the control of the Transmit Bit Control Unit. Bit Code to T-Code Conversion is then performed by Bit To T-Code Converter 150 upon the serial output from Multiplexer 149. Then using Multiplexer 151, FS bits are added behind the ED field, and thereafter the resulting serial bit sequence is provided to T-Code-To Differential Manchester Code Converter 152 to produce a self-clocking DM encoded serial data stream over the TXD line.

Having described in great detail, the structure and function of the various components comprising the data communication controller chip of the illustrative embodiment, it is appropriate at this juncture to now describe the memory organization of the shared buffer memory and the memory structures utilized therein during initialization, configuration and packet transmission and reception processes.

Figure 3:
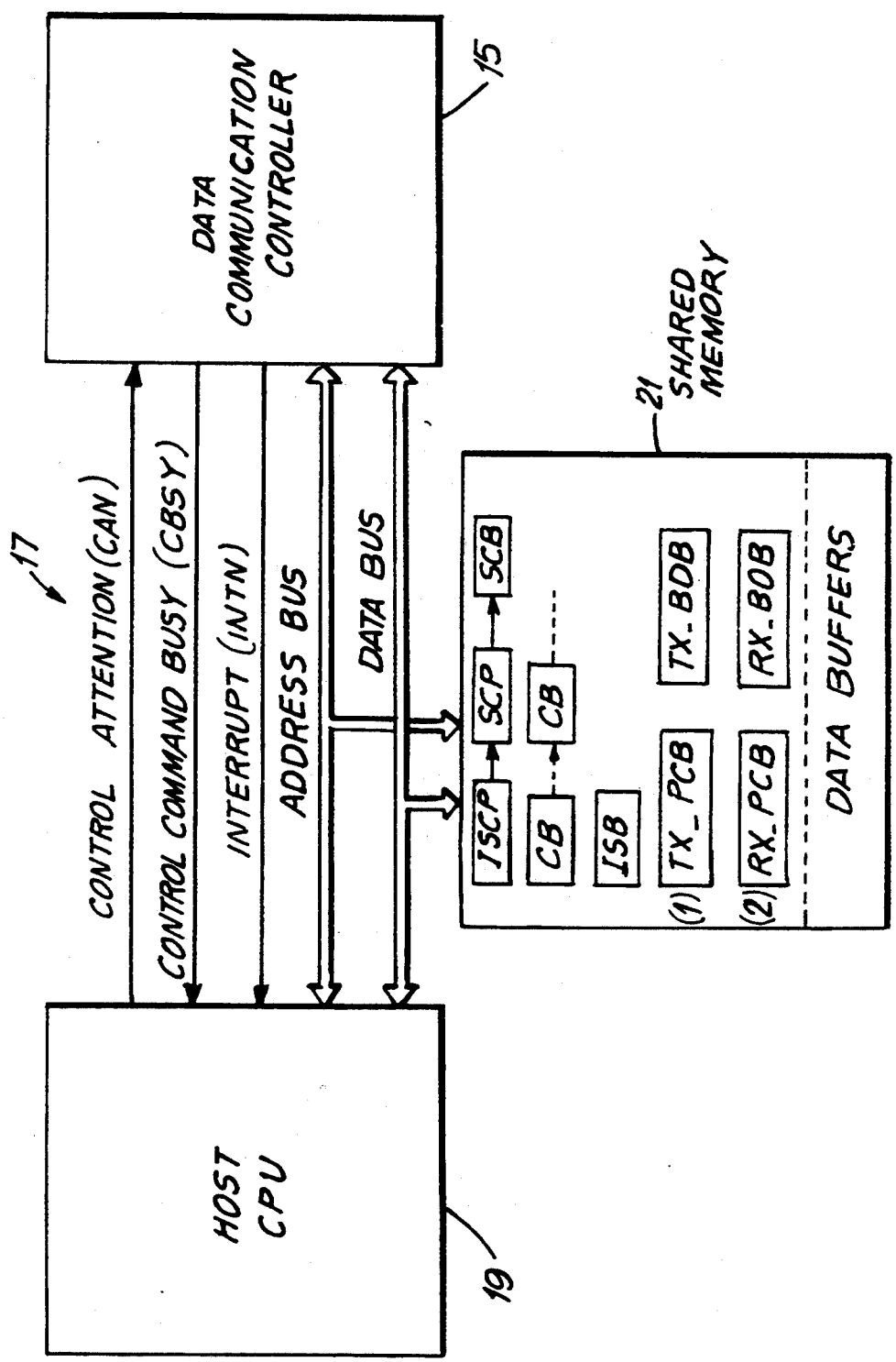
FIG. 3 is a schematic representation of the various address, data and control lines of the system bus interfacing the host CPU, the Shared Buffer Memory, and the data communication controller of the present invention.

In FIG. 3, the shared memory structures utilized by the host system and the data communication controller of the illustrative embodiment are schematically represented. These shared memory structures are identified as follows: Initial System Configuration Pointers (ISCP); System Configuration Pointer (SCP); System Control Block (SCB); Host Interrupt Status Block (HISB); Action Command Queues comprising an extendable linked-list chain of Action Command Blocks (CB); eight Access-Class Transmit Packet Queues comprising extendable linked-list chains of Transmit Packet Control Blocks (TPCB) and linked Transmit Buffer Descriptor Blocks (BDB); and a MAC-Receive-Packet and a Non-MAC-Receive-Packet Queue, each comprising an extendable linked-list chains of Receive Packet Control Blocks (PCB) and linked Receive Buffer Descriptor Blocks (RBDB). These memory structures will be described in greater detail below.

Figure 3A:
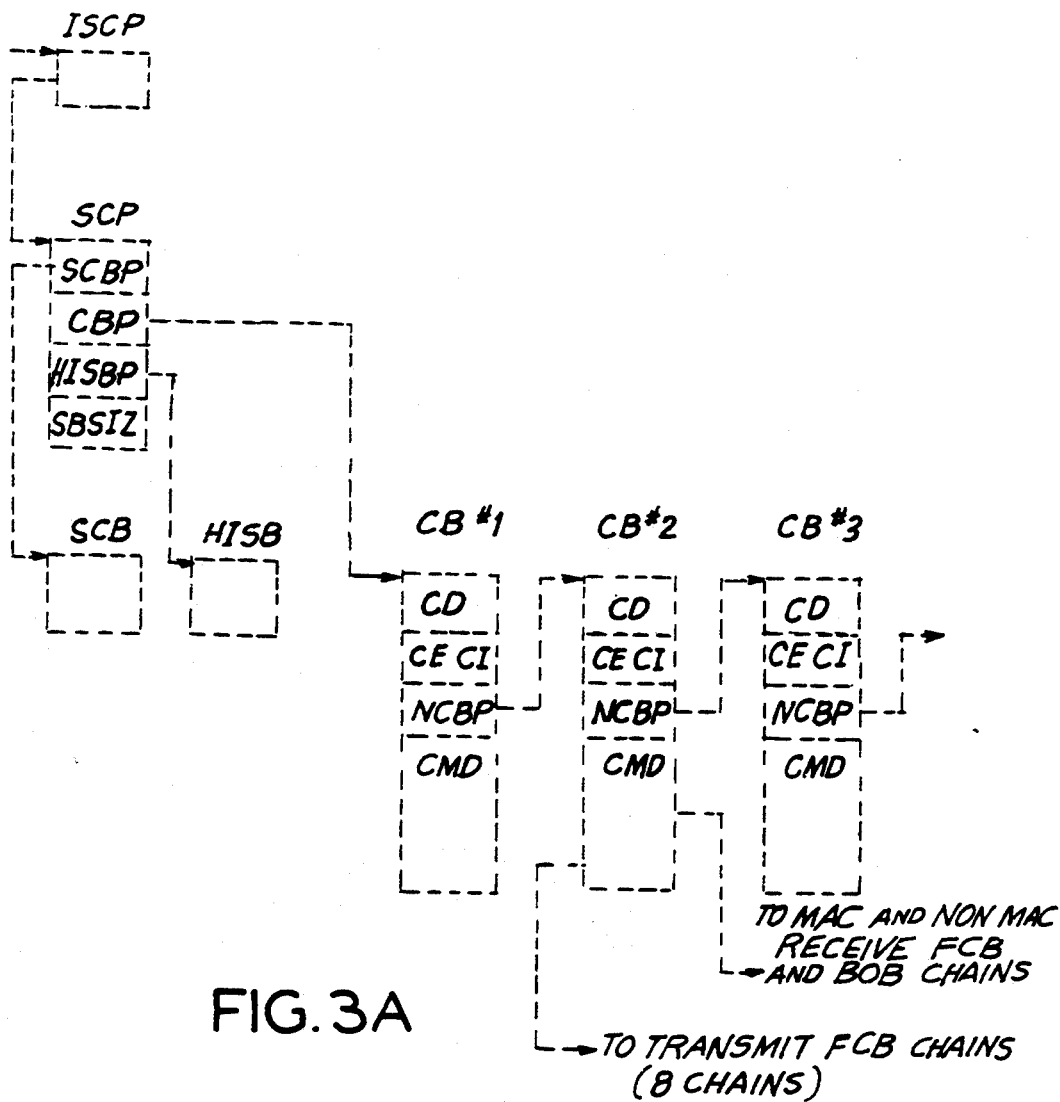
FIG. 3A is a schematic representation of various shared memory structures set up by the Shared Buffer Memory by the host CPU so that the data communication controller of the present invention can access, read and store address pointers identifying the initial memory locations of the System Control Block, the Host Interrupt Status Block and the extendable linked-list Transmit Packet Queues, Receive Packet Queues and Action Command Queues of the present invention.
Figure 3B:
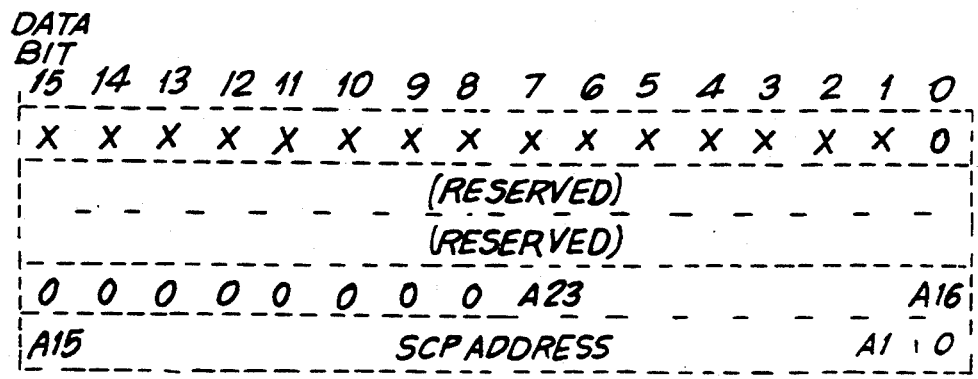
FIG. 3B is a schematic representation of illustrating the format of the Initial System Configuration Pointer Block.

In FIG. 3A, the organization of the ISCP, SCB, SCBP, SCB, HISB and CB chain is schematically illustrated. In FIG. 3B, the format of the ISCP block is shown. As indicated, the SCP address can be found within bits A1 through A15 of the fifth word in the ISCP block. Using the SCP address pointer the SCP block of FIG. 3C can be found, and within the SCP block the address pointers SCBP, CBP and SBP can be found. The SCP block is written by the host in shared memory and is read by the data communication controller only once during initialization. Notably, the SCP block of the illustrative embodiment comprises eight words of 16 bits each. The initial Action Command Block Pointer (CBP) defining the beginning of the Action Command Block chain, can be found at the fourth and fifth word locations in the SCP block. The Host Interrupt Status Block Pointer (HISBP) defining the beginning of the HISB in shared memory, can be found at the sixth and seventh word locations of the SCP block. The host interrupt status block size plus two (HISBSIZ) can be found at bits 0–7 of the eight word location of the SCP block.

In FIG. 3B, the SCB is used by the host system to (i) deliver system control commands to the data communication controller (DCC), (ii) acknowledge interrupts from the data communication controller, (iii) set or clear interrupt masks, or (iv) start or resume Action Command Block chains (i.e. queues) and transmit/receive chains. The host must set up the various fields in the SCB before asserting the CA signal to the data communication controller. Once the CA is issued, the host must wait until the CBSY signal becomes low or the first word of the SCB is cleared before writing into the SCB, or issuing another CA. As illustrated, fields SV contains a bit set by the host to indicate that System Control Block is valid. This bit is cleared by the data communication controller after the SCB has been processed. The RV field contains a bit set by the host to indicate that the Resume Control Word is valid. The IV field contains a bit set by the host to indicate that the IACK-code is valid and the CMD field contains four bits set by the host to indicate a SCB control command, e.g. No Operation, Remove from Network, Suspend-CB-chain, Set Interrupt Marks and Clear Interrupt Mask. The host interrupt-acknowledge-code (IACK-Code) is set by the host to indicate to the data communication controller that a particular interrupt status word in the HISB is being acknowledged by the host. This code will be recognized by the data communication controller only if the SV and IV bits are set in the system control command word.

The Resume Control Field contains a resume control word written by the host to set an action Command Block, Transmit Packet Control BLock, or Receive Packet Control Block Chains or to resume those chains that have been suspended when the data communication controller had detected the end-of-chain bit in one of these blocks. Multiple chains may be started or resumed by setting multiple bits at a time. Using a 15 bit resume command word, it is possible to resume the action command block (CB) chain, the receive-MAC-PCB chain, the receive MAC-BDB chain, the receive NON-MAC-PCB chain, the receive-NON-MAC BDB chain, and each of the eight transmit-access-class-PCB chains.

As illustrated in FIG. 3A, the action command chain may comprise one or more action Command Blocks (CB), each having a format illustrated in FIG. 3E. As shown, each CB has a number of fields, each of which performs a particular function. The CD field contains a single bit set by the data communication controller to indicate that the action command is done. The CMDST field contains 8 bits written by the data communication controller after the command has been executed. The CE field contains a single bit set by the host to indicate the end of the action command block chain. The CE bit is read by the data communication controller after the current CB execution is completed (i.e. CD bit is set). The NCBP field contains two words of 16 bits written by the host and read by the data communication controller to indicate the location of the next command block (CB) in the shared memory. This pointer is valid and recognized by the data communication controller only if the CE bit is cleared, or if this CB had been suspended and a resume control command is detected by the data communication controller to resume the action command block chain.

In the illustrative embodiment, there are a number of action commands that the data communication controller may execute using a combination of DMA channels 0 and 1. Examples of possible action commands include: No-OPERATION command which results in no action by the data communication controller; TEST commands for testing the configuration and performance of the data communication controller, INSERT command which causes the data communication controller to be inserted into the Token-Ring Network (this command is issued only after INITIALIZE-MAC and INITIALIZE-TX-RX commands); REMOVE command which causes the data communication controller to be removed from the token-ring network; ABORT-TRANSMIT command which can be issued to the data communication controller to abort any of the eight Transmit PCB queues; WRITE VALUE command which allows the host to write various parameters into the data communication controller from the external shared buffer memory; READ VALUE command which allows the host to read various parameters from within the data communication controller (e.g. in Dual-ported Memory 32, Communication Registers Block 33, etc.); INITIALIZE MAC command which permits the initialization of MAC layer parameters within the data communication controller by the host first preparing a parameter list in shared memory and then issuing an INITIALIZE MAC command to the data communication controller; INITIALIZE TRANSMIT AND RECEIVE command which initializes the transmit and receive parameters (e.g. initial transmit and receive PCB pointers) in the data communication controller in a manner similar to the initialize MAC command; and MODIFY INDIVIDUAL GROUP ADDRESS (IGA) command which permits the host to change the IGA parameter after the data communication controller has been inserted within the token-ring network.

Figure 3F:
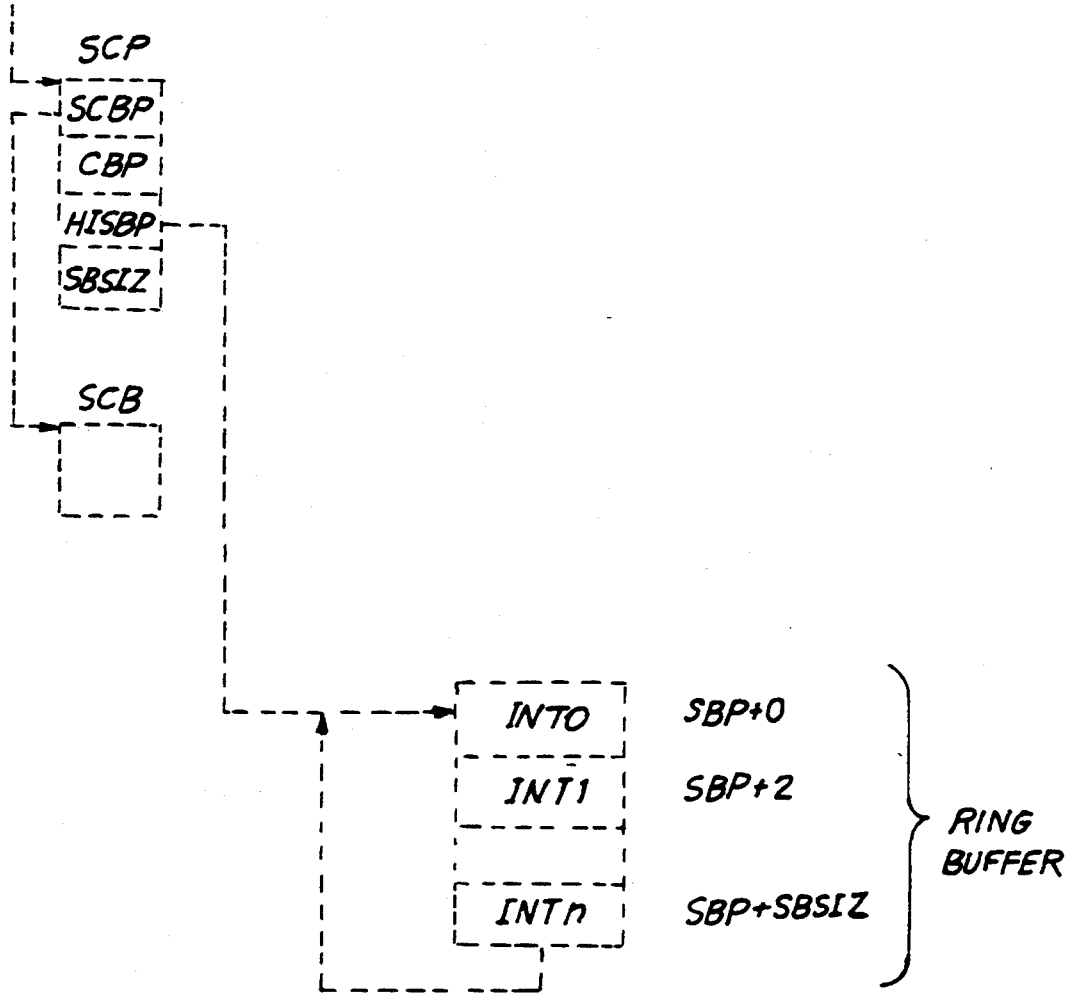
FIG. 3F is a schematic representation illustrating the format of the Host Interrupt Status Block.
Figure 3G:
FIG. 3G is a schematic representation illustrating the format of the Host Interrupt Status Block.

In FIG. 3F, the host interrupt status block (HISB) is illustrated, with each HIS word having a format shown in FIG. 3G. As illustrated, a ring-buffer is used to implement the HISB of the present invention. In this way, host interrupt status words can be passed from the data communication controller to the host system without the imposition of real-time demands on the host processor. The advantage of the ring-buffer is two-fold: (1) the host system has a greater degree of flexibility in its system planning because the ring buffer HISB allows the host system a longer latency in responding to interrupt statuses from data communication controller; and (2) since the data communication controller does not need to wait for the host system to acknowledge previous interrupt statuses before new ones are posted, it can use its own bandwidth more efficiently. Thus, when the data communication controller is not tied up with other tasks, it can take advantage of the free time and post an interrupt status to the host system.

After initialization of the data communication controller, a copy of the Status Buffer Pointer (SBP) and the value of the size of the Interrupt Status Block (SBSIZ) are stored in a register file in the data communication device where they can be retrieved. Two internal registers for Status Buffer Offset (SBOFF) and Status Buffer Acknowledgment (SBACK) are initialized to the same value of SBSIZ. The values of SBP and SBSIZ remain unchanged until the data communication controller is re-initialized. The sum of SBOFF and SBP indicates the next position in the ring buffer where a new interrupt status can be posted by the BMC. Thus, the value of SBOFF is changed every time an interrupt status is posted. The value of SBACK indicates the offset position in the ring buffer where the next interrupt status acknowledgment begins. By comparing the values of SBOFF with SBACK, the BMC can determine the capacity remaining in the ring buffer. When the ring buffer is full, no more interrupt status words can be posted.

When the data communication controller posts an interrupt status it will first increment SBOFF by 2 and then this new value will be compared with SBSIZ. If the new SBOFF value is greater than SBSIZ, the ring buffer has wrapped around and it has to start over again from its initial position. SBOFF will be programmed with a value of zero when this happens. Then, the location in the ring-buffer where the interrupt status is posted, is determined and this value is loaded into either the DMA Channel 1 or 2. When the data communication controller is allowed to access the host system bus, a word of interrupt status is written into the ring buffer (HISB). Then, values of SBOFF and SBACK are then compared with each other and a flag which indicates a full ring-buffer is asserted if these 2 values are equal. If this occurs, the data communication controller will wait for the host to release non interrupt status words before posting additional interrupt status words to the host. The BIC then generates an Interrupt Signal (INT).

At this time, the host system may acknowledge any of the interrupt status words in the ring buffer (HISB) by writing (in the IACK field of the SCB) an IACK code which corresponds to the acknowledged interrupt status word offset (in bytes) from the base address SBP. If this occurs, a new SBACK value will be reported back to the data communication controller. Using this technique, the host system has an option to service only one interrupt status or a multiple of them.

Figure 3H:
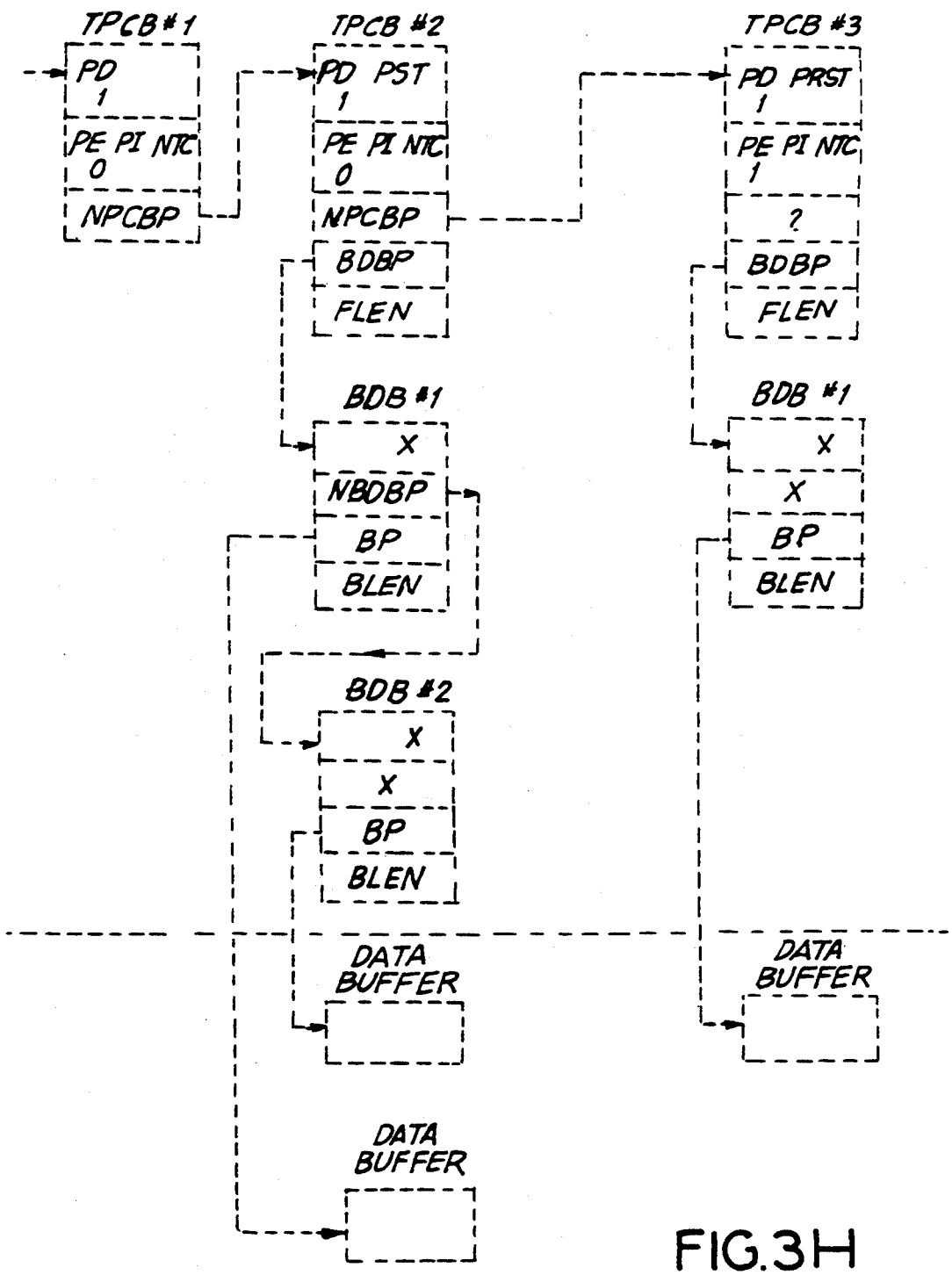
FIG. 3H is a schematic representation illustrating the extendable linked-list memory structure of an Access-Class Transmit Queue according to the present invention.
Figure 3I:
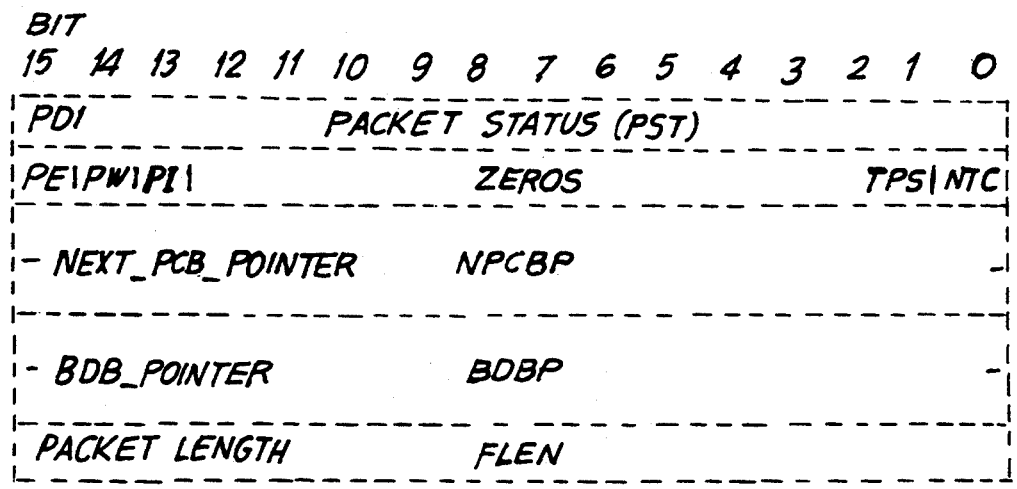
FIG. 3I is a schematic representation of the transmit Packet Control Block illustrating the format of an Access-Class Transmit Queue.
Figure 3J:
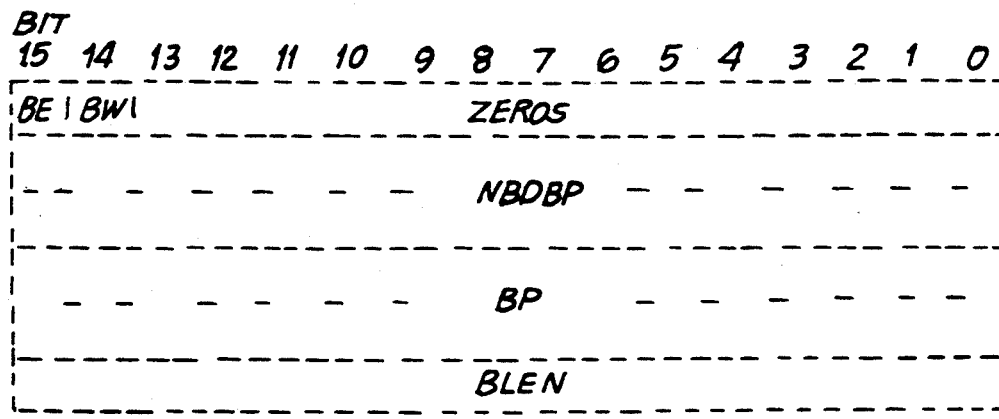
FIG. 3J is a schematic representation illustrating the memory format of the Transmit Packet Buffer Description Block associated with a Transmit Packet Control Block.

Referring now to FIG. 3H, the memory structure of an exemplary transmit packet queue is illustrated, with each Transmit Packet Control Block (TPCB) and Transmit Packet Buffer Description Block (BDB) being schematically illustrated in FIGS. 3I and 3J, respectively. In accordance with the IEEE 802.5 Standard, the data communication controller supports (i.e. manages) up to eight Access-Class Transmit Queues for packet transmission.

One or more Access-Class Transmit Queues may be used for packet transmission. The transmit queue access-class determines the order that the data communication controller will transmit packets, whereas the priority level of the Access Control field (AC) of an enqueued frame determines the priority that the data communication controller will use for Token access of the ring. The transmit queue access-class may not necessarily be the same as the AC priority of a frame, as long as the high AC priority packets are mapped to a higher access-class queue.

When packets are enqueued by the host, the data communication controller automatically fetches a packet from the highest access-class queue. It then requests priority Token according to the priority of the AC field of the packet. When a usable Token is received, it transmits the packet using the data from the Data Buffers associated with the BBD linked to the TPCB.

Each packet to be transmitted is prepared by the host in the shared memory and consists of a Transmit Packet Control Block (TPCB) pointing to a Transmit Buffer Descriptor Block (BDB) which may be linked to more BDB's depending on the length of the packet to be transmitted. Each BDB contains a Next Transmit Buffer Descriptor Block Pointer (NBDBP) field pointing to the next BDB in the TPCB chain. The Buffer Pointer (BP) in each BDB points to the Data Buffer in the shared memory, which contains the transmit data.

As illustrated in FIG. 3I, each TPCB has the same memory structure, format and number of fields. The PD field contains a bit written by the data communication controller indicating that the packet transmission is completed (i.e. done). Typically, this bit is set when the PCB status bits (PST) has been posted by the data communication controller. The packet status fields contain 16 bits written by the data communication controller after the packets have been transmitted. The PE field contains one bit written by the host to indicate the end of the TPCB chain, and is read by the data communication controller during the transmission process. The PI field contains a single bit written by the host to inform the data communication controller to generate a host interrupt after the packet has been transmitted. The TPS field contains a single bit written by the host to enable the data communication controller to post the returned PS field of the current packet after it has gone around the ring. The NTC field contains a single bit written by the host for the TPCB so as to disable the data communication controller from calculating and appending the CRC to the current transmit packet. The NTPCBP field contains two 16 bit words written by the host and read by the data communication controller to locate the next TPCB pointer. The BDBP field contains two 16 bit words written by the host and read by the data communication controller. And finally, the PLEN field contains one 16 bit word written by the host to indicate the actual transmit packet length measured in bytes.

For each packet to be transmitted, the host may set the NTC bit in the TPCB to disable the data communication controller from the appending CRC to the transmit data. After a packet is transmitted, the PD bit is set and the transmission status PST is posted by the data communication controller in the TPCB. Using the NPCBP field in the TPCB, packets can be linked to form a chain of TPCBs for transmission by the data communication controller for each transmit queue. As each packet is transmitted by the data communication controller, the host may add more transmit packets to the end of a queue by using the same procedure as that of extending the CB chain.

Figure 3K:
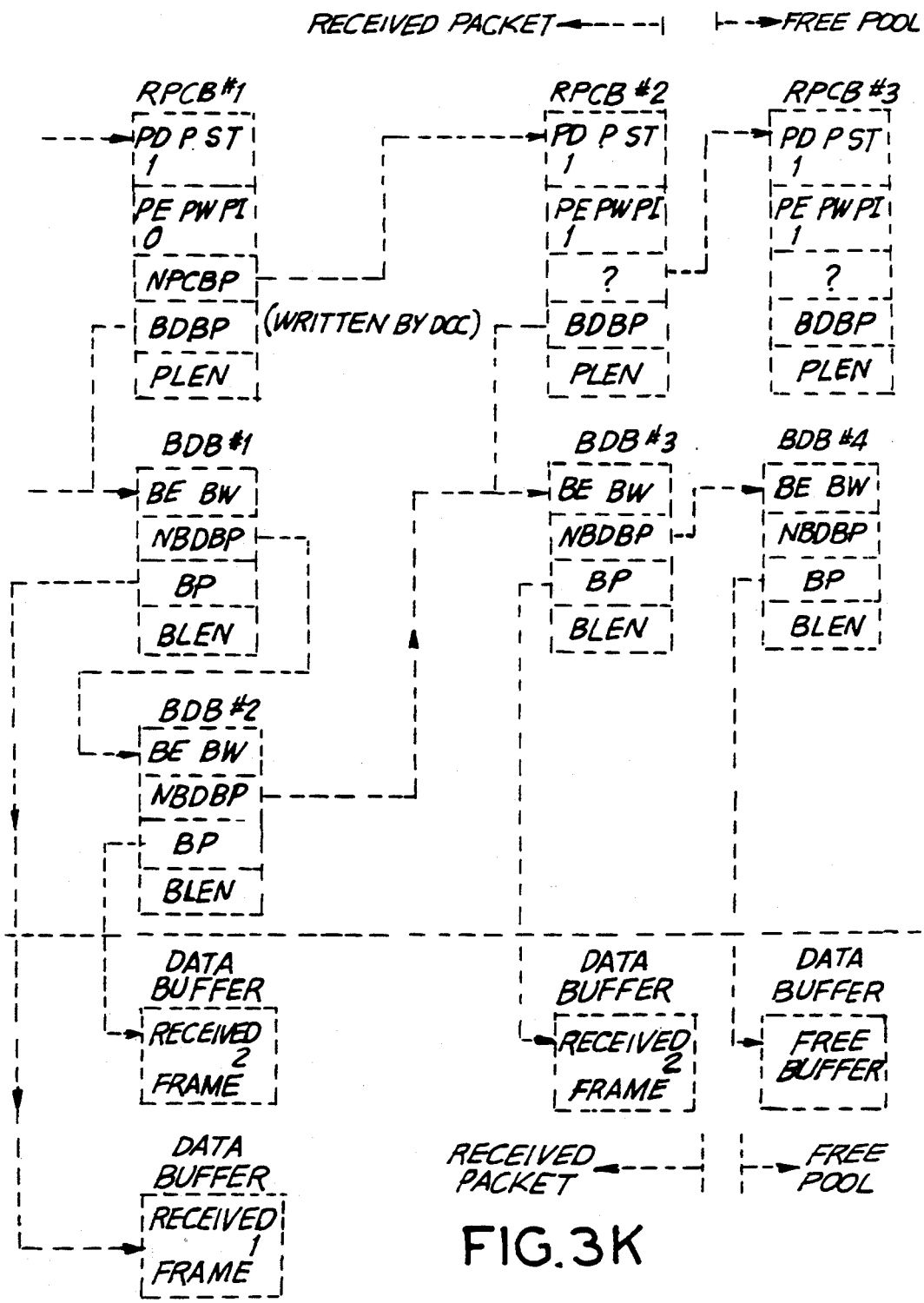
FIG. 3K is a schematic representation illustrating the extendable linked and list memory structure of a received Packet Queue according to the present invention.
Figure 3L:
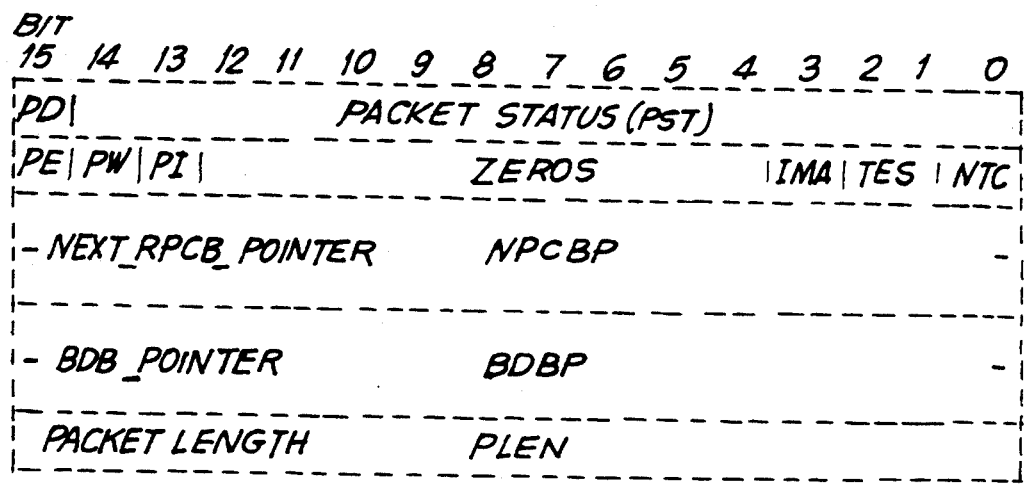
FIG. 3L is a schematic representation illustrating the format of the Receive Packet Control Block of a Receive Packet Queue of the present invention.
Figure 3M:
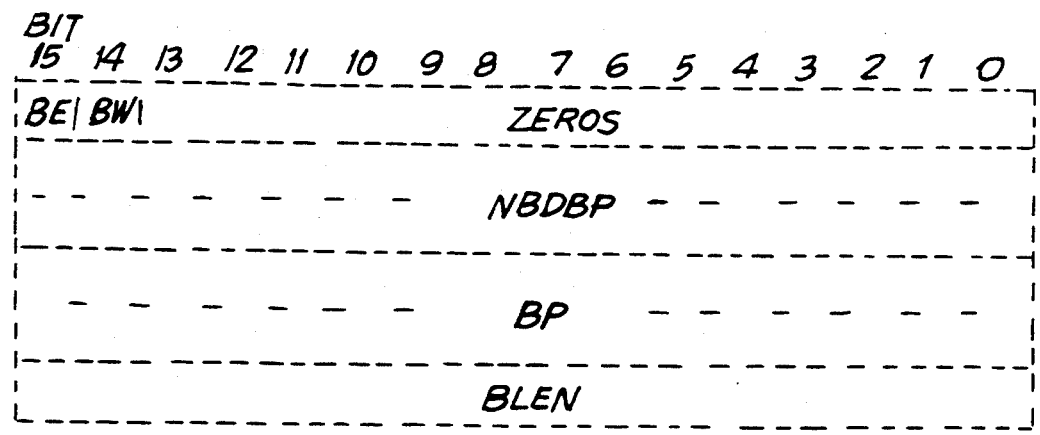
FIG. 3M is a schematic representation illustrating the format of the Receive Packet Buffer Description Block associated with a Receive Packet Control Block.

Referring now to FIG. 3K, the memory structure of an exemplary receive packet queue is illustrated, with each Receive Packet Control Block (RPCB) and Receive Packet Buffer Descriptor Block (BDB) being schematically illustrated in FIGS. 3L and 3M, respectively. In accordance with the IEEE 802.5 Standard, data communication supports two receive packet queues for MAC packets and NON-MAC packets. Each receive queue comprises a memory structure consisting of a RPCB chain and a BDB chain linked together, as shown in FIG. 3K.

As illustrated in FIG. 3L, each RPCB has the same memory structure, format and number of fields. The PD field contains a bit written by the data communication controller indicating that the packet transmission is completed (i.e. done). Typically, this bit is set when the PCB status bits (PST) has been posted by the data communication controller. The packet status fields (PST) contain 16 bits written by the data communication controller after the packet has been received. The PE field contains one bit written by the host to indicate the end of the TPCB chain, and is read by the data communication controller during the reception process. The PI field contains a single bit written by the host to inform the data communication controller to generate a host interrupt after the packet has been received. The NRPCBP field contains two 16 bit words written by the host and read by the data communication controller to locate the next RPCB pointer. The BDBP field contains two 16 bit words written by the data communication controller after the packet has been received and buffered in shared memory. And finally, the PLEN field contains one 16 bit word written by the data communication controller to indicate the actual received packet length measured in bytes.

For each receive queue, the host allocates a free RPCB chain and a free PBDB chain for packet reception. After the host has enabled the packet reception by resuming the receive RPCB chain, the data communication controller automatically performs destination filtering on each passing packet.

If a packet is destined for this station, the data communication controller stores the packet in the Data Buffer pointed to by the first available BDB in the free BDB chain. As one data buffer is filled, the data communication controller stores the incoming data into the data buffer pointed to by the NBDB pointer until the entire packet including 4 bytes of CRC and 1 byte of PS field is received in the data buffer.

During the receiving process, when the data communication controller encounters an BE bit set in BDB, it will write a value of X'FFFF' to the BE word, the current receive operation is then aborted, and the RPCB and BDBs for the current packet are reclaimed. A BE interrupt is then generated to the host. The data communication controller also interrupts the host if the BW bit is set before the last BDB is reached. The BW bit may be set to forewarn the host to add more BDBs to the free BDB chain.

While receiving, if any error is encountered, the data communication controller will reclaim the RPCB and the BDBs of the aborted received packet, unless a Save-Bad-Packet mode is set to save the aborted packet. If the received packet contains no error or the Save-Bad-Packet mode is set, the data communication controller updates the following information into the current RPCB: (1) the pointer to the first BDB for this packet is stored in the BDBP field; (2) the actual received packet byte count is stored in the PLEN field; and (3) the receive packet is posted in the PST field and the PD bit is set.

The data communication controller fetches the PE word from the current RPCB. If the FE bit is cleared, the data communication controller fetches the NPCBP field and gets ready to receive the next packet. If the PE bit is set, the data communication controller will post a PE interrupt status in the SB and interrupts the host. The PW bit in the RFCB may be set before the last RPCB in the chain to enable the data communication controller to interrupt and inform the host of the need to add more RPCBs to the free RPCB pool. The PI bit in the RPCB may be set by the host to enable the data communication controller to generate an interrupt after the packet has been received.

To extend the receive RPCB chain, the host uses the same procedure as extending the Action Command Block (CB) chain as hereinabove described. To extend the BDB chain, the host can use the following procedures: (1) If the data communication controller has already suspended the BDB chain, as indicated by the receive BE interrupt status already posted, the host updates the NBDBP field in the last BDB to point to the newly prepared BDB or BDBs and issues a Resume Control command (through the SCB) to the data communication controller; and (2) If the BDB chain has not been suspended (no receive BE interrupt has been posted), the host updates the NBDBP field and clears the BE bit of the last BDB. It is possible when the host clears the BE bit, that the data communication controller has already accessed the BE word and has detected the BE bit being set. In this case, the host has not successfully extended the BDB chain. The host can handle this situation in the receive BE interrupt service routine by issuing a Resume Control Command to the data communication controller whenever the BE word in the last BDB of the most recently updated RPDB chain does not equal to X'FFFF'. Note that the data communication controller always writes a value of X'FFFF' to the receive BE word of the last BDB of the chain as perceived by the data communication controller.

Having described the memory and data structures utilized by data communication controller and host system, the operation of DMA Channels 0 and 1 will now be described in detail. Notably, as these DMA channels provide basic data pathways between the shared memory and interior storage elements within the data communication controller, they are utilized extensively when executing initialization and action command processes, as well as during packet transmission and reception processes. In the later case, however, dedicated DMA Channels 2 and 3, respectively, are also utilized.

Figure 4:
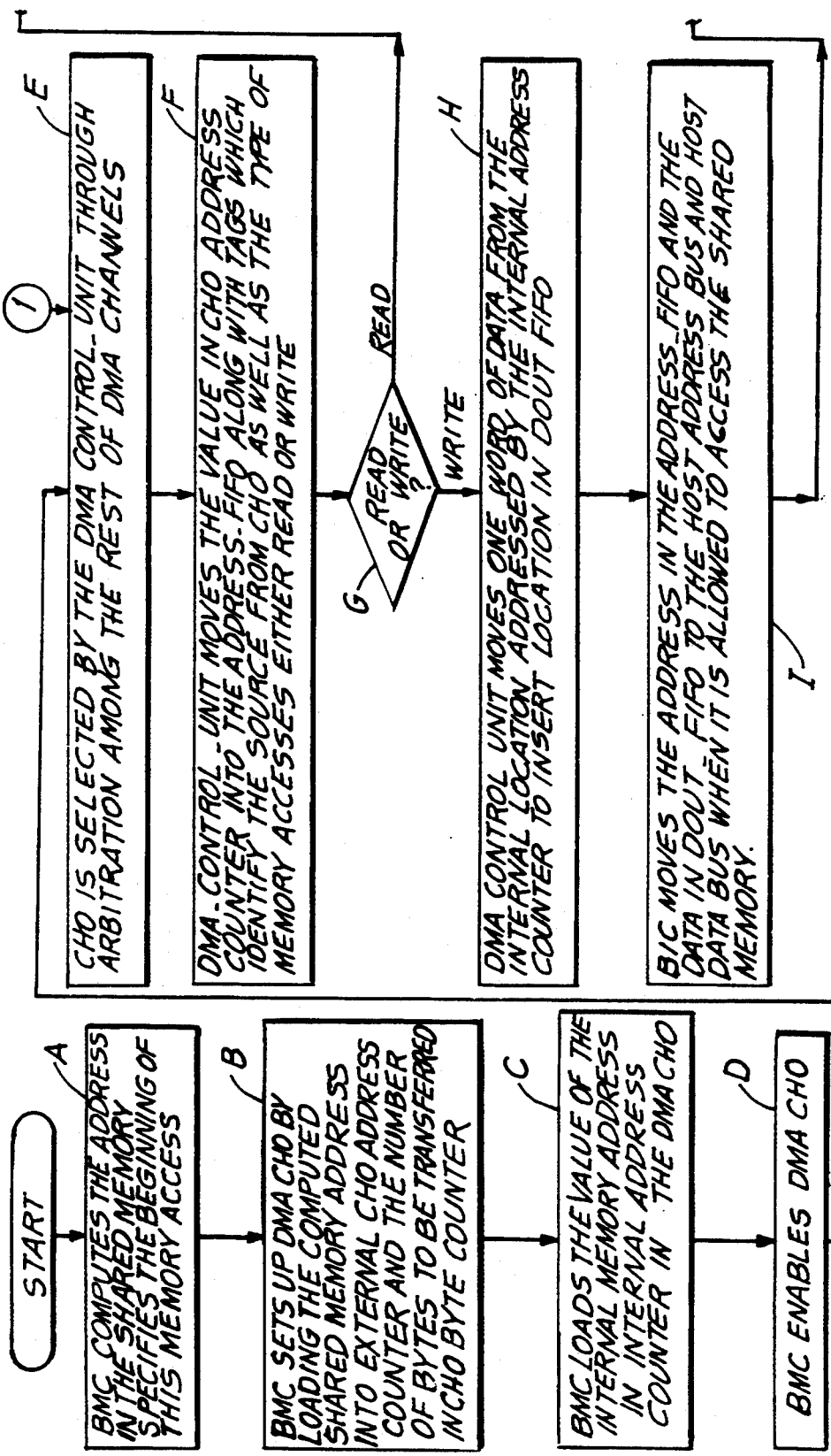
FIG. 4 is a flow chart illustrating the use of DMA Channel-0 in the data communication controller in order to transfer data between the host system and the data communication controller.
Figure 4A:
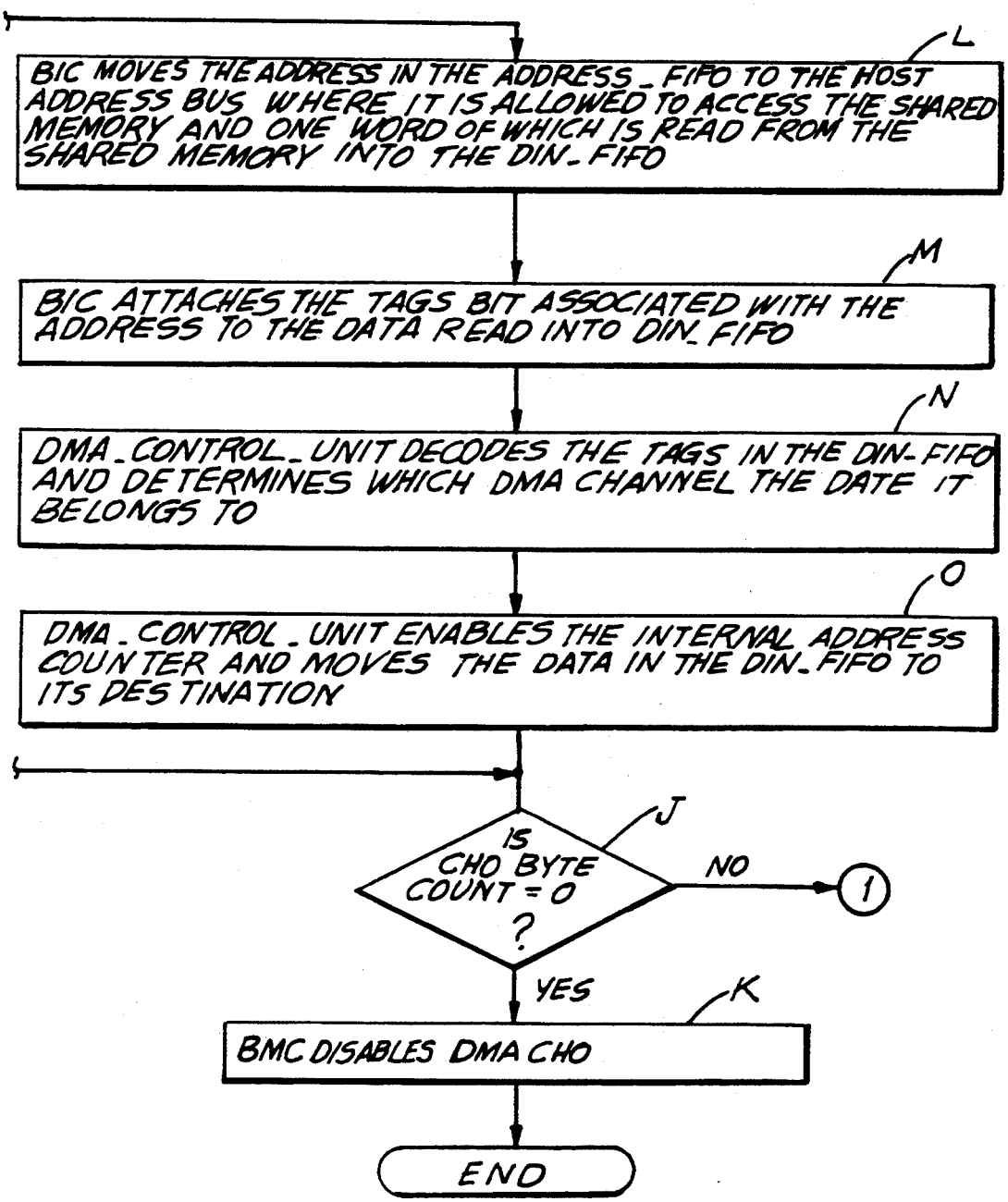

As indicated at Block A in FIG. 4, use of DMA Channel 0 first involves the BMC computing the address pointer which specifies the beginning of the memory block to be accessed in shared memory. At Block B, the BMC sets up DMA Channel 0 by (i) loading the computed address (i.e. pointer) into the external address counter of DMA Channel 0, and (ii) the number of bytes to be transferred into byte counter thereof. At Block C, the BMC then loads into the internal address counter of DMA Channel 0, the internal memory address pointer which specifies where in the data communication controller, externally accessed data is to be transferred over DMA Channel 0. At Block D, the BMC enables DMA Channel 0 by way of control signals sent over the BMC address/control bus. At Block E, DMA Channel 0 is selected among the other DMA channels using a standard arbitration process performed by the DMA Control and Arbitor Unit. At Block F, the DMA Control and Arbitor Unit transfers to the Address FIFO, the address value in the external address counter of DMA Channel 0, along with address FIFO tag bits which identify the DMA Channel being used and the type of memory access being performed (e.g. read or write operation).

As illustrated at Block G, if DMA Channel 0 is being used for a write type memory access, then the controller proceeds to Block H. At this Block, the DMA Control and Address Unit transfers one word of data from the internal address location (addressed by the internal address counter of DMA Channel 0) to the insert location of the DOUT FIFO. At Block I, when BIC is permitted access to the shared memory, it transfers the address in the removal location of the Address FIFO onto the system address bus and the word in the removal location of the DOUT FIFO onto the system data bus. At Block J, if the byte counter in enabled DMA Channel 0 is not equal to 0, then the data communication controller performs the operations specified in Blocks E through I, until the entire block of data is written into the shared memory (i.e., until byte counter equals 0). When it has completed this "Posted-Write" process, the BMC disables DMA Channel 0 at Block K.

If the BMC is to read data from the shared memory and into the data communication controller, as required during the initialization process, then data communication controller proceeds from Block G to Block L. At this Block, when the BIC is permitted to access the shared memory, it transfers the external address in the removal location of the Address FIFO onto the system address bus, and then transfers one word of data from the addressed location in shared memory, to the insert location in the DIN FIFO. At Block M, The BIC attaches the address FIFO tag bits associated with the transferred external address, to the data word just read into the insert location of the DIN FIFO. At Block N, the DMA Control and Arbitor Unit decodes the tag bits in the removal location of the DIN FIFO and determines along which DMA Channel the associated data word is to be transferred (i.e. DMA channel 0). At Block 0, the DMA Control and Arbitor Unit enables the internal address counter of DMA Channel 0 and transfers the data word in the removal location of the DIN FIFO through Bus switch 46, and to its destination addressed by BMC address/control bus 58.

At Block J, if the byte counter in enabled DMA Channel 0 is not equal to 0, then the data communication controller performs the operations specified in Block E, F, L, M, N and O, until the entire block of data is read from the shared memory into the data communication controller. To determine whether the posted read or write instructions have been executed, the BMC can perform a suitable test.

Figure 5:
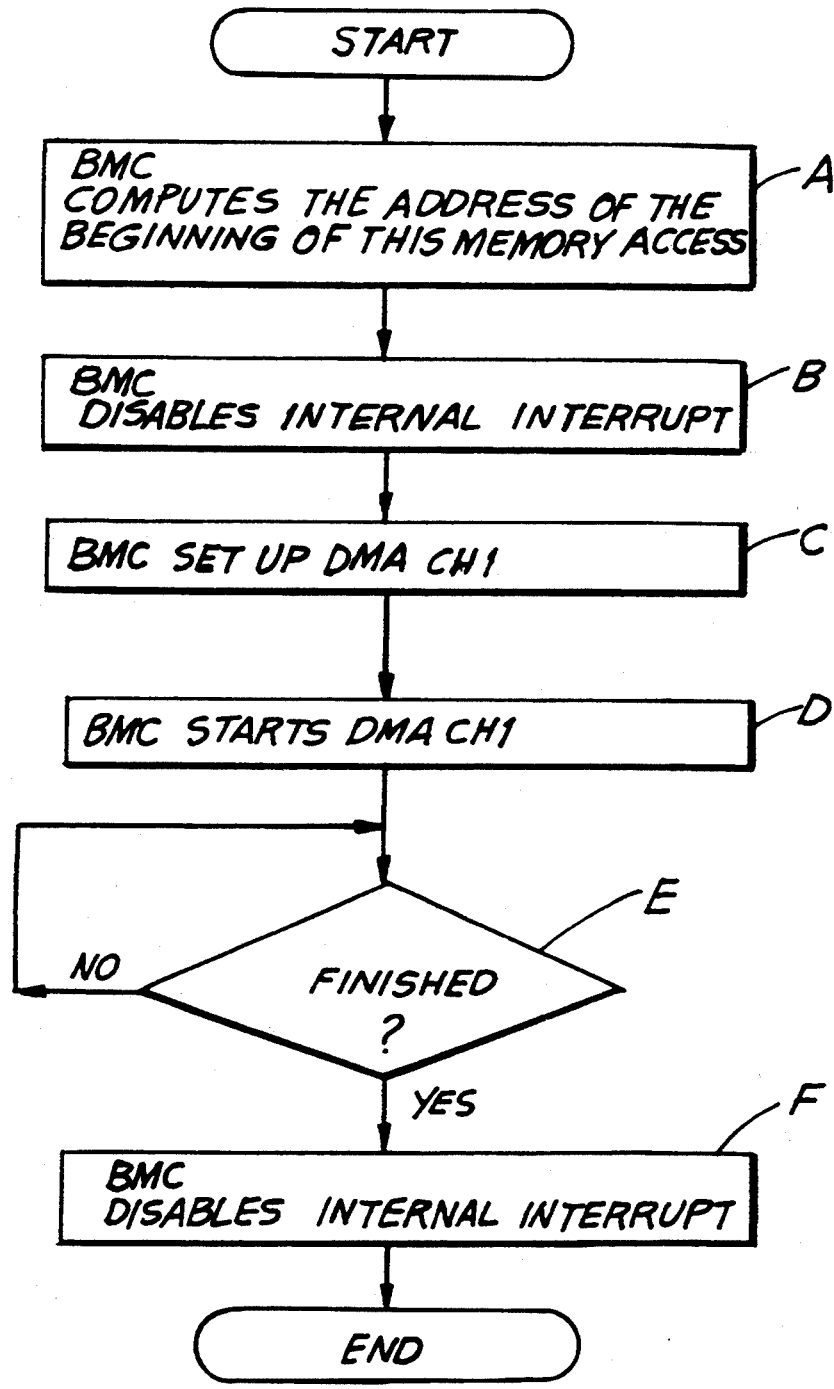
FIG. 5 is a flow chart illustrating the use of DMA Channel-1 in the data communication controller in order to transfer data between the host system and the data communication controller.

In FIG. 5, the operation of DMA Channel 1 is illustrated. As with DMA Channel 0, DMA Channel 1 can be used to write data into the shared memory or read data from the shared memory. However, unlike DMA Channel 0, the BMC must monitor the operation of DMA Channel 1 and is not free to perform other tasks during its operation.

As indicated at Block A in FIG. 5, the BMC computes the address pointing to the beginning of the memory block to be accessed in shared memory. At Block B, the DMC disables its internal interrupt function. At Block C, the BMC sets up the internal address counter, the external address counter and the byte counter of DMA Channel 1. At Block D, the BMC enables DMA Channel 1 and remains at Block E until the data transfer process is completed. When the data transfer process is completed, then at Block F the BMC disables DMA channel 1, and enables its internal interrupt functions, permitting it to attend to other tasks.

Figure 6:
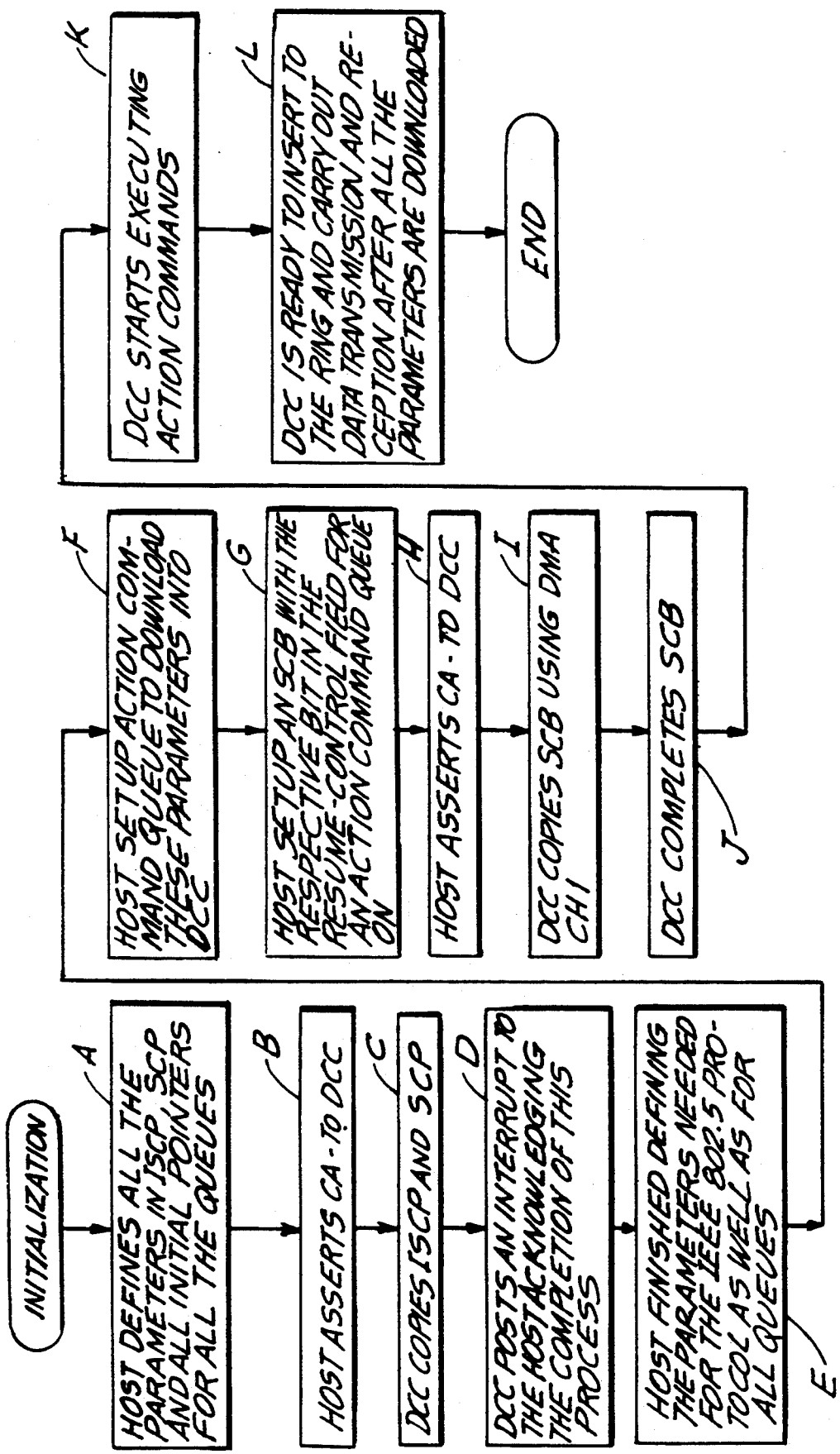
FIG. 6 is a flow chart illustrating the initialization process carried out by the host system and the data communication controller of the present invention in order to set up necessary parameters within the data communication controller to perform a described communication protocol within the communication networks.

Before the delta communication controller can operate and be inserted into the Token-Ring Network, the initialization process illustrated in FIG. 6 must be performed. At Block A of FIG. 6, the host first defines all of the parameters in the ISCP, SCPB and all initial pointers for all of the extendable linked-list queues which it will set up in the shared memory. At Block B, the host then asserts the CA signal over a system control line, to the BIC of the data communication controller. At Block C, the data communication controller copies ISCP and SCPB from the shared memory using DMA Channels 0 and/or 1. At Block D, the data communication controller posts a host interrupt status word in the HISB, acknowledging the completion of this process.

At Block E, the host finishes defining the parameters needed for the IEEE 802.5 standard, as well as for all queues.

At Block F, the host sets up an action command queue in order to download into the data communication controller, the parameters defined at Block E. At Block G, the host then sets up a SCB with the respective bit sets in the Resume-Control Field to indicate that the Action Command Queue is activated. At Block H, the host asserts a CA signal to the data communication controller, and at Block I, the data communication controller copies the SCB from shared memory using DMA Channel 1. At Block I, the data communication controller completes the SCB. At Block K, the data communication controller begins to execute the Action Commands posted in the Action Command Queue. At Block L, after all the parameters are downloaded into the data communication controller, it is then ready to be inserted into the Token-Ring Network and carry out data transmission and reception processes.

Figure 7A:
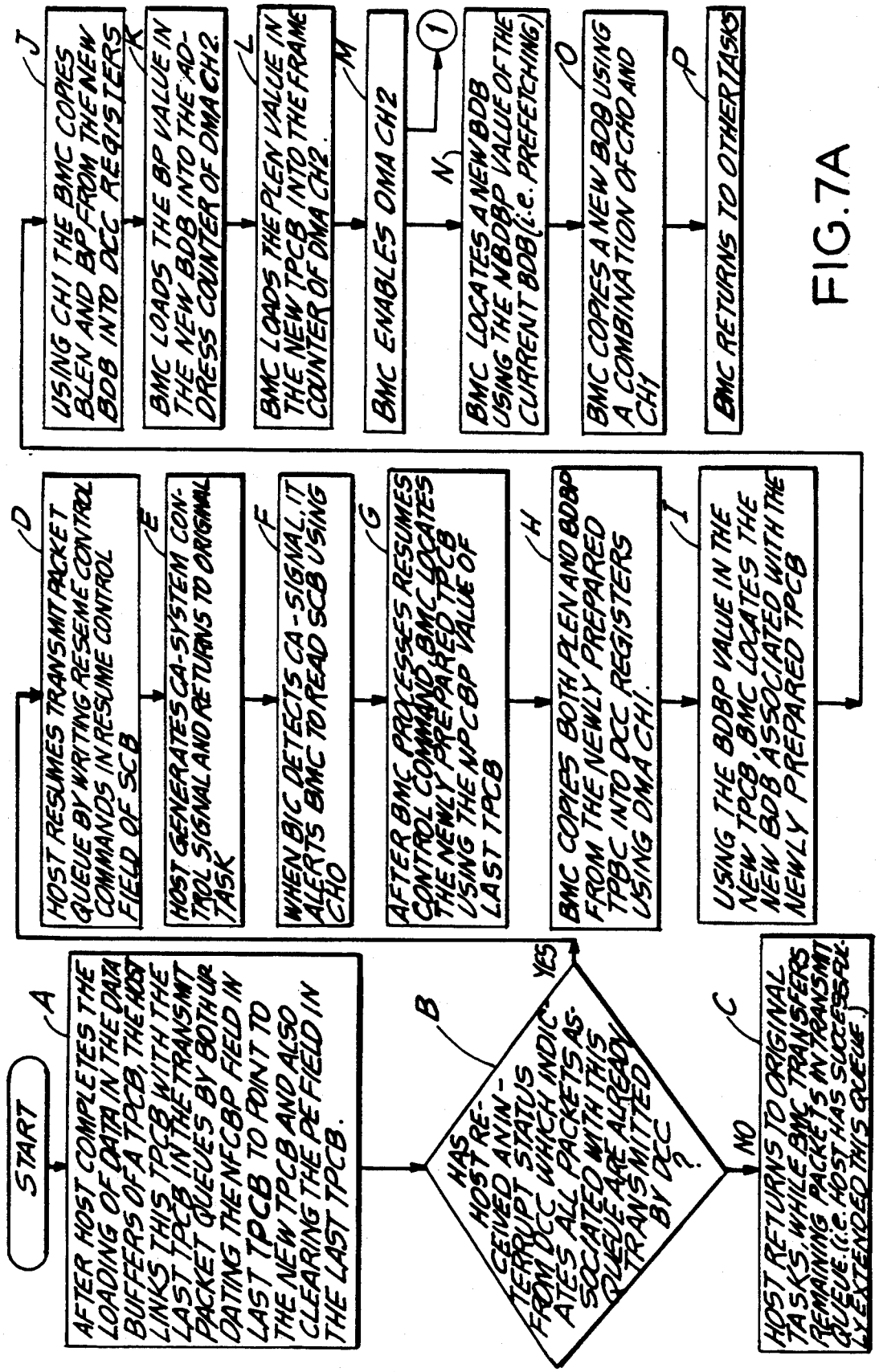
Figure 7B:
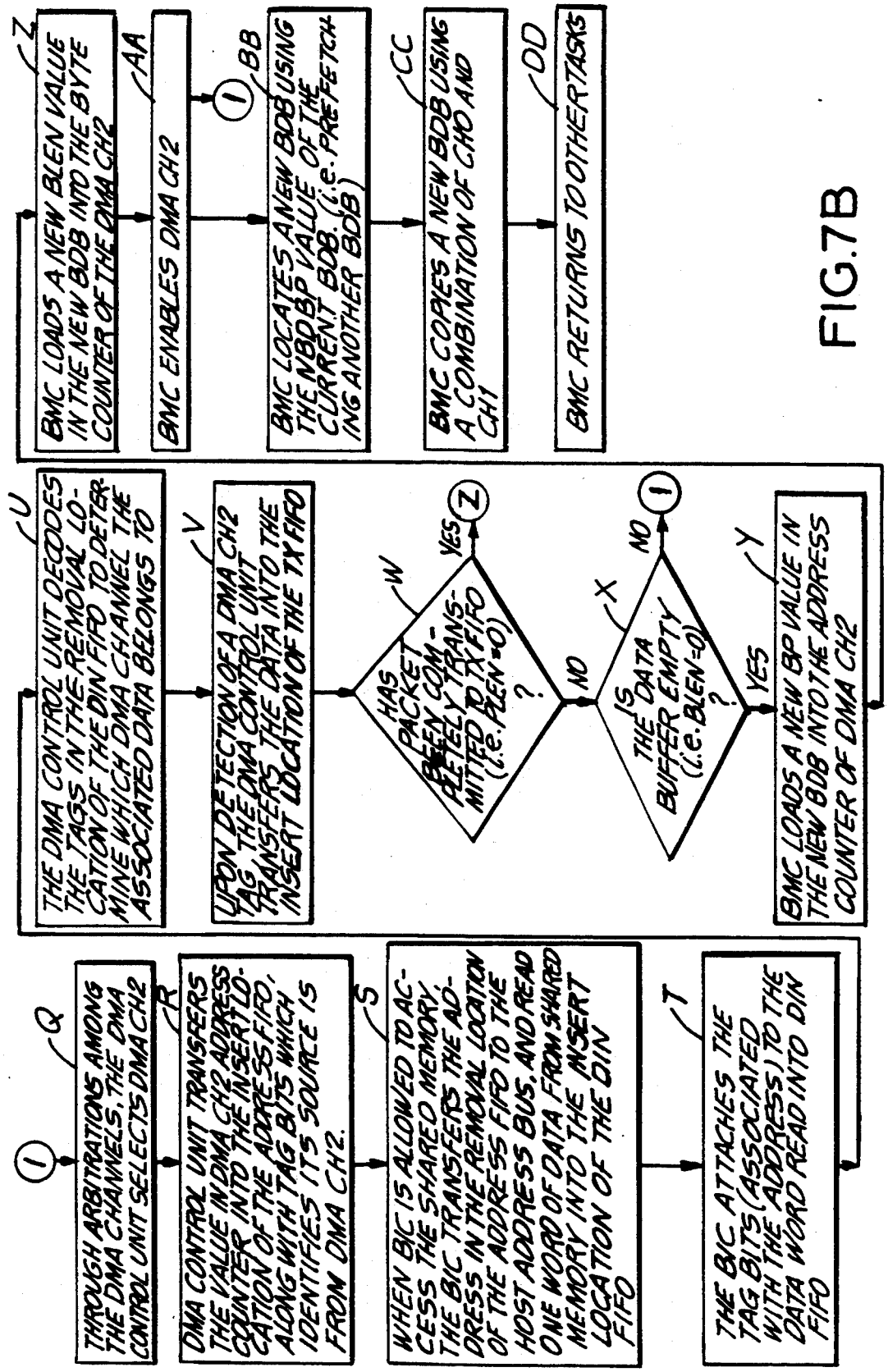

In FIGS. 7A, 7B and 7C, the data packet transmission process of the present invention is illustrated with reference to FIGS. 2A, 3H, 3I and 3J.

As indicated at Block A of FIG. 7A, after the host has completed loading data into the data buffers of a TPCB, it links this TPCB with the last TPCB in the transmit packet queue by (1) updating the NPCBP field in the last TPCB so as to point to the new TPCB, and (2) clearing the PE field in the last TPCB. At Block B, the host reads the HISB to determine whether it has received an interrupt status from the data communication controller, i.e. ascertaining whether all packets associated with this queue have been already transmitted. If the host does not receive such interrupt status, it returns to original tasks while the BMC transfers remaining packets in the transmit queue.

If, however, the host receives such an interrupt status, then as indicated at Block D, it resumes the transmit packet queue by writing the resume control command in the resume control field of the SCB. At Block E, the host generates the CA and other system control signals and then returns to its original task. At Block F, when the BIC detects the CA signal, it alerts the BMC to read the SCB using DMA Channel 0. At Block G, after the BMC processes the resume control command, it locates the newly prepared TPCB using the NPCBP value in the last TPCB. At Block H, the BMC uses DMA channel 1 to copy both the PLEN and BDBP from the newly prepared TPCB, into registers within the data communication controller.

At Block I, the BMC uses the BDBP value in the TPCB in order to locate the new TBDB associated with the newly prepared TPCB. At Block J, the BMC uses DMA Channel 1 to copy the PLEN and BP from the new BDB into the byte counter and register within the data communication controller. At Block K, the BMC loads the BP value (in the new PDB) into the external address counter of DMA channel 2. At Block L, the BMC loads the PLEN value (in the new TPCB) into the packet length counter of DMA Channel 2. At Block M, the BMC enables DMA channel 2.

At this stage of the process, the BMC performs several tasks at once (i.e. multitasking or multiprocessing). At Blocks N through P, the BMC prefetches new data buffer. At Block Q, the DMA control and arbitor unit selects DMA Channel 2 among the other DMA Channels, using a known arbitration process.

At Block W, the DMA controller determines whether the packet has been completely transmitted to the transmit FIFO through the DMA Channel 2 pathway (i.e. Is PLEN=0). If not, then at Block X, the DMA controller determined whether the present data buffer is empty (i.e. IS BLEN=0). If it is not empty, then the data communication controller returns to Block Q through W, and when the present data buffer is empty, advances to Block Y. At this Block, the BMC loads a new BP value (in the new BDB) into the external address counter of DMA Channel 2. At Block Z, the BMC loads a new Blen value (in the new BDB) into the byte counter of DMA Channel 2. Then at Block AA, the BMC enables DMA Channel 2. Here the BMC prefetches the new TBDB at Blocks BB, CC and DD. Then, data communication controller performs Blocks Q through V, and when the packet has been completely transmitted to the transmit FIFO (i.e. PLEN=0), the BMC determines at Block EE, whether packet transmission has been successful. If it is not successful, then at Block FF the BMC restores the external address value stored in the internal registers to the value of the address pointer that points to the last TPCB. This way, the data communication controller can retransmit the same packet if not packet data associated with higher priority transmit queues is waiting to be transmitted.

At Block EE, if packet transmission has been successful, then at Block GG, the BMC uses DMA Channel 1 to write a status word in the PST field of the TPCB of the transmitted packet. At Block HH, the BMC then determines whether another TPCB is available or not for packet transmission (i.e. PE=0?). If not, then the BMC writes a flag in an internal register indicating the end of this TPCB has been reached. At an appropriate time, the data communication controller writes a host interrupt status word to the Ring Buffer HISB in shared memory to inform the host of the occurrence of such a condition. If, however, the BMC determines at Block HH that another TPCB is available, then BMC proceeds to BLock JJ. At this block, if no other higher prior transmit queues are ready to transmit, BMC will transmit another transmit data packet from this queue using the process described above.

At Block R, the DMA control unit transfers the value in the external address counter of DMA channel 2 into the insert location of the address FIFO, along with two address FIFO tag bits which identify the DMA Channel being utilized. At Block S, when the BIC is permitted to access the shared memory, the BIC transfers the external address in the removal location of the Address FIFO onto the system address bus, and read the addressed word of data from the shared memory into the insert location of the DIN FIFO. At Block T, the BIC attaches the tag bits (associated with the address) to the data word just read into the insert location of the DIN FIFO. At Block U, the DMA Control and Arbitor Unit decodes the tag bits residing in the removal location of the DIN FIFO in order to determine the DMA Channel along which the attached data word is to be transferred (i.e. DMA Channel 2). Upon the detection of a DMA channel 2 tag at Block V, the DMA Control and Arbitor Unit transfers the data into the insert location of the Transmit FIFO.

Referring to FIGS. 2A, 3K, 3L, 3M and 8A through 8D, the data packet reception process of the present invention will now be described in great detail.

Figure 8A:
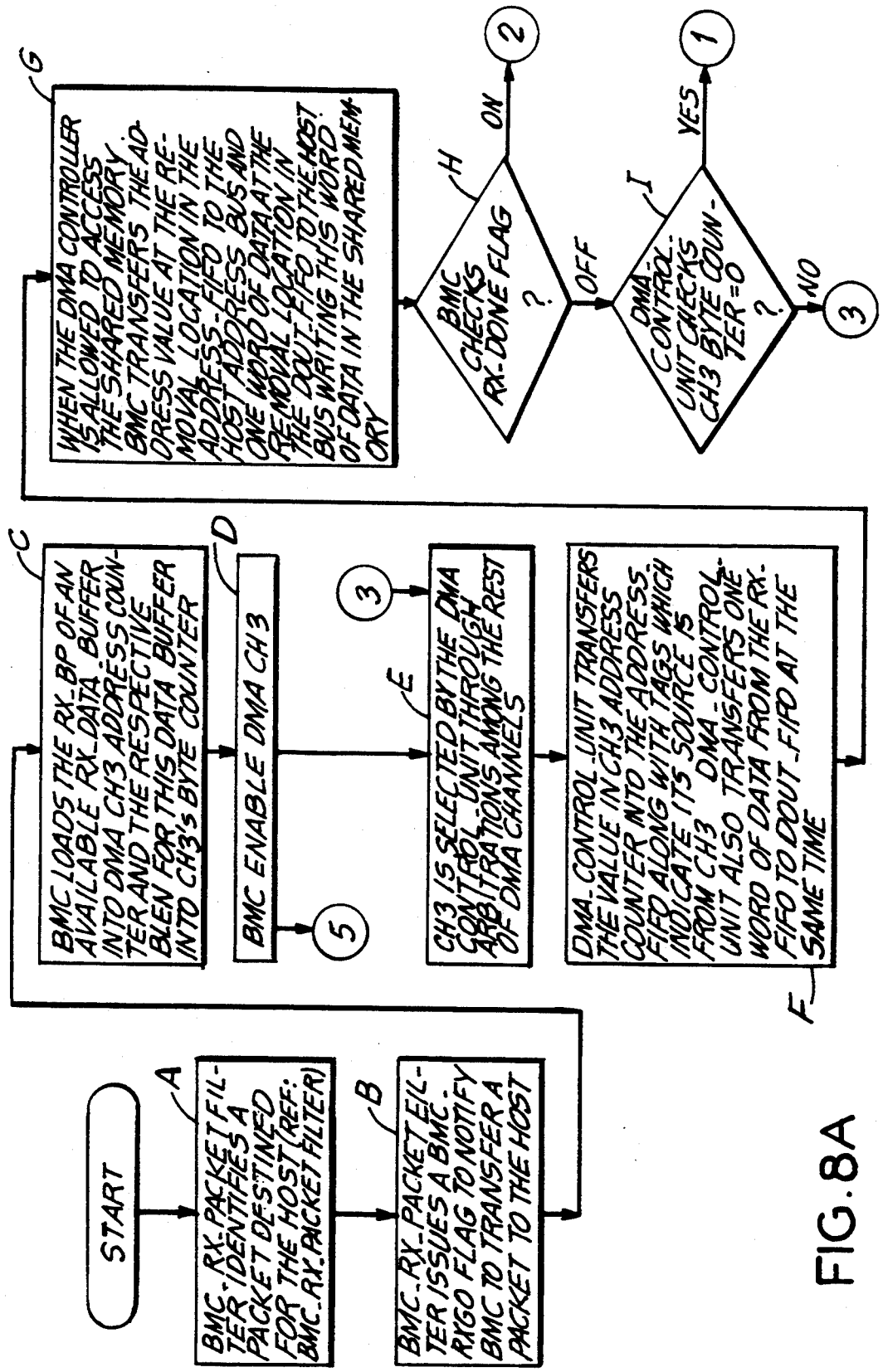
Figure 8B:
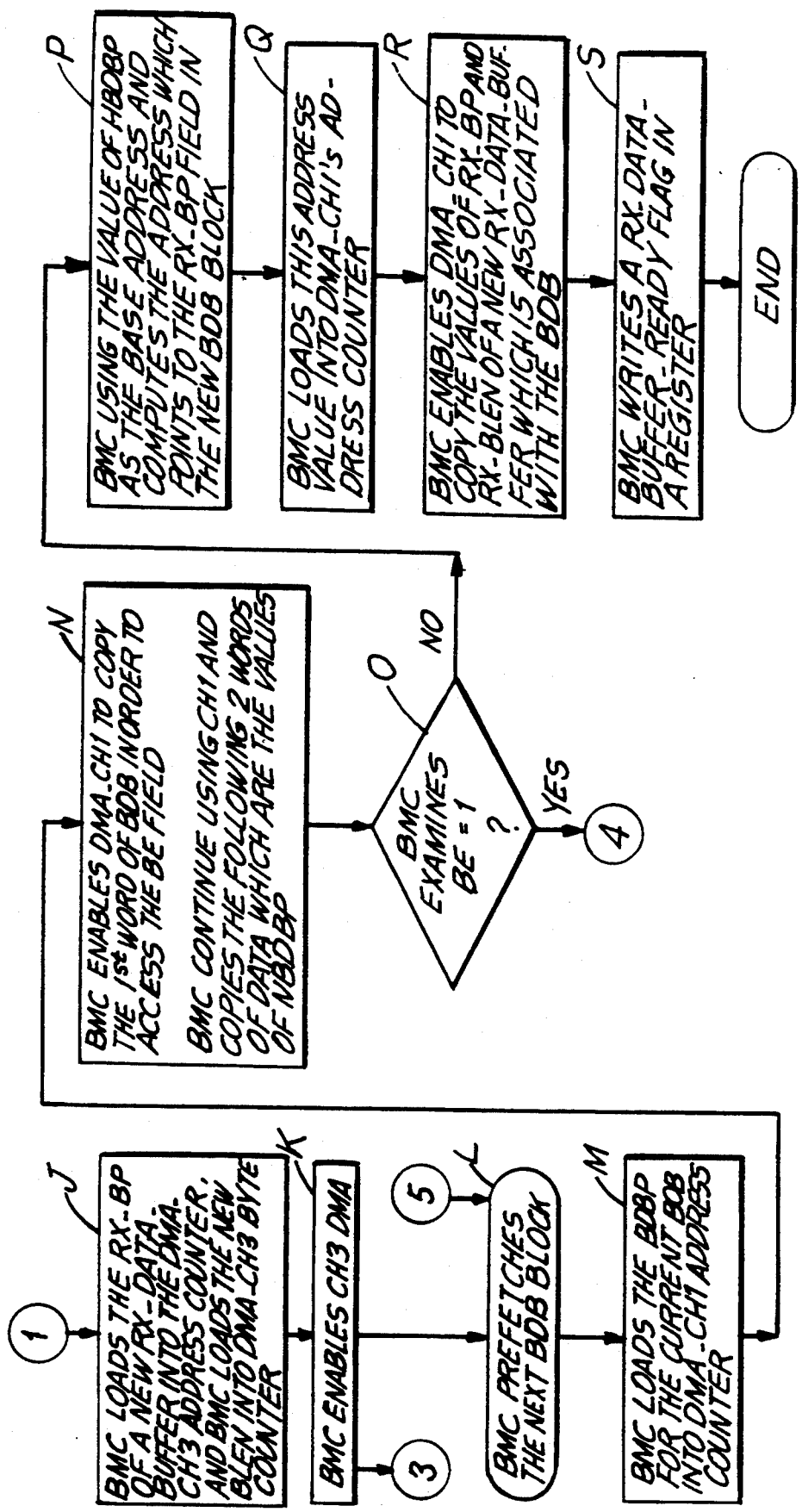

At Block A in FIG. 8A, the BMC receive packet filter identifies a packet destined for the host system. At Block B, the BMC receive packet filter issues a BMC-RX-GO flag to notify the BMC to transfer a packet to the host. At Block C, the BMC loads the receive BP (of an available receive data buffer) into the address counter of DMA channel 3, and the byte length BLEN (for this data buffer) into the byte counter of DMA Channel 3. At Block D, the BMC enables DMA Channel 3, setting the DMA Control and Arbitor Unit into operation along Blocks E, F, G, H and I, while the BMC proceeds along Block L through S, or Blocks L, M, N, I and GG.

At Block BB, the BMC prefetches the next BDB, and at Block M, loads the BDBP (for the current BDB) into the external address counter of DMA Channel. At Block N, the BMC enables DMA Channel 1 to copy the first word of the BDB in order to access the BE field. The BMC continues using DMA Channel 1 to copy the following two words of data which are the values of the NBDBP. At Block 0, if BE equals 1 then the BMC writes a RX-DATA-BUFFER-NOT-RDY-flag into an internal register, and at an appropriate time uses DMA Channel 1 to write an interrupt status word into the HISB in shared memory, indicating to the host that no receive data buffer is available to the data communication controller for buffering received data packet(s). The BIC will then assert the interrupt (INT) signal to indicate to the host the presence of a host interrupt status word in the HISB.

If, however, at Block 0, BE is not set to 1, then at Block P the BMC uses the value of the NBDBP as the base address and computes the addresses which points to the BP field in the new BDB. At Block Q, the BMC loads this computed address value into the external address counter of DMA Channel 1. At Block R, the BMC enables DMA Channel 1 to copy the values of BP and BLEN of a new receive data buffer which is associated (i.e. linked) with the BDB. At Block S, the BMC then writes a RX-DATA-BUFFER-READY flag in an internal register.

Returning to Block E, DMA Channel 3 is selected among the other channels by the DMA Control and Arbitor Unit performing a conventional channel arbitration process. At Block F, the DMA Control and Arbitor Unit transfers the value in the external address counter of DMA channel 3, into the insert location of the Address FIFO. At the same time, the DMA control and arbitor unit also transfers one word of data from the Receive FIFO, through the Bus Switch, into the insert location of the Dout FIFO. At Block G, when the DMA Controller is allowed to access the shared memory the BIC transfers the address value in the removed location of the Address FIFO to the system address bus, and one data word from the removal location of the DOUT FIFO to the host data bus, thereby writing this word into the addressed buffer in the shared memory.

At Block H, the BMC checks to determine whether RX-DONE flag has been set. If not, the DMA Control and Arbitor Unit checks to determine whether the byte counter of DMA Channel 3 equals 0. If not, the DMA Control and Arbitor Unit reperforms the operations specified in Blocks E through H, and when all memory storage locations in the receive data buffer are filled as indicated by byte counter=0, then the BMC proceeds to Block J, where it loads the BP (of new receive data buffer) into the address counter of DMA Channel 3 and the new BLEN into the byte counter thereof. Then at Block K, the BMC enables DMA Channel once again, setting the DMA Control and Arbitor Unit to perform again the operations specified in Blocks E through I, while the BMC simultaneously performs the operations specified along Blocks L through S, or Blocks L, M, N, O and GG.

When the BMC determines at Block H that the RX-DONE flag is set, the BMC advances to Block T. At this block, when the entire receive packet has been transferred to the shared memory, the BMC is notified by a RX-DONE flag. At Block U, the BMC checks whether the packet reception process was successful. If not, then at Block W, the BMC writes into an internal register, the BP and BLEN of the first receive data buffer, so that it may later reclaim this unreliable data packet. If the reception is successful, then at Block W the BMC uses the base address of the current RPCB to compute the address which points to the BDBP field. At Block X, the BMC loads this computed address into the external address counter of DMA Channel 1, and using DMA Channel 1 writes into the BDBP field of the current RPCB, the address values that point to the first BDB of the received packet. At Block Y, the BMC continues using DMA Channel 1 to write the receive packet status into the PST field of the RPCB and the packet length to the PLEN field thereof. At Block Z, the BMC uses DMA Channel 1 to read the PE field of the RFCB. At Block AA, the BMC writes a RX-PACKET flag to an internal register, and at an appropriate time, uses DMA Channel 1 to write an interrupt status word into the HISB in the shared memory. Also, the BIC will assert the INT signal to indicate to the host the presence of this interrupt status word in the HISB.

At Block BB, the BMC checks to determine if another RPCB is available (i.e. PE=0?). If no other RPCBs are available and this is the end of the receive queue, at Block CC the BMC writes a RX-RPCB-NOT-READY flag in an internal register. At an appropriate time, the BMC will use DMA Channel 1 to write an interrupt status word into the HISB in the shared memory, indicating to the host that no new RPCBs are available to the data communication controller. The BIC will then assert the INT signal to indicate to the host that this interrupt status word is present in the HISB for servicing.

If at Block BB, PE=0, then the BMC writes a RPCB-READY flag in an internal register. At Block DD, the BMC then checks the RX-DATA-BUFFER-READY flag to determine if there are data buffers available for linking to a free RPCB. If yes, the BMC returns to its original tasks nevertheless, as there are no free RPCB presently available. If there are no available data buffers, then at Block FF, the BMC uses DMA Channel 1 to write a hexadecimal value FFFF to the first word in the last BDB in the receive queue. The BMC then proceeds to Block GG to set a RX-DATA-BUFFER-NOT-READY flag in an internal register. At an appropriate time later, the BMC will use DMA Channel 1 to write an interrupt status word into the HISB and then the BIC will assert the INT signal as hereinbefore described.

Figure 8D:
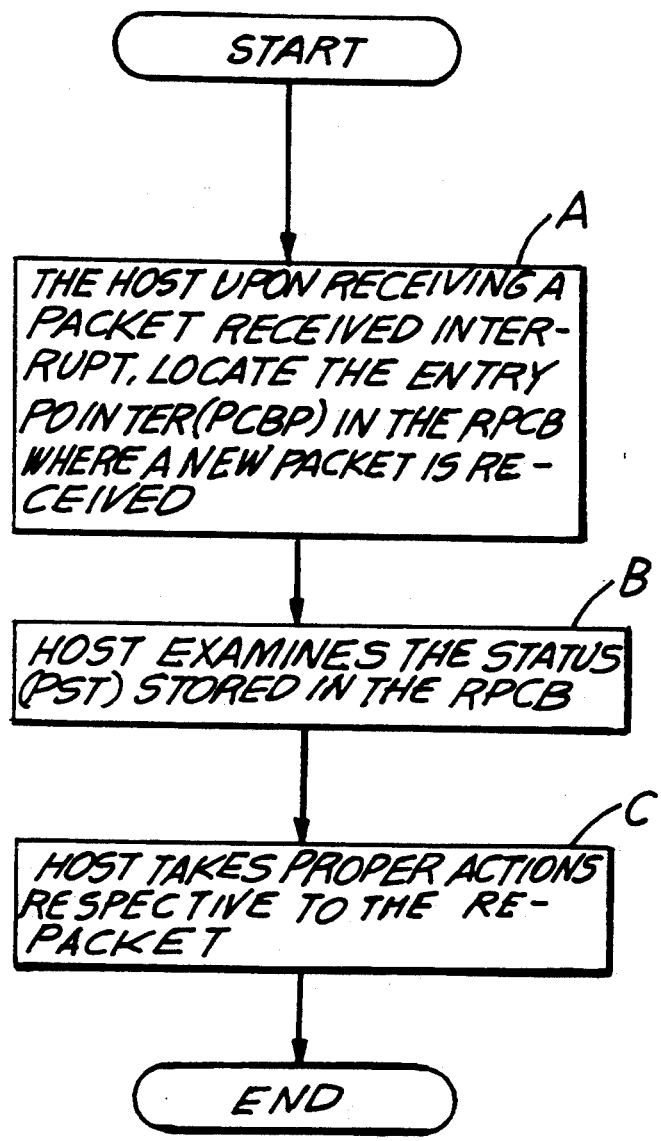

When the host desires to unload a received packet from a receive queue in shared memory, it simply performs the steps detailed in FIG. 8D.

While the particular embodiments shown and described above will be useful in many applications in the data communication art, further modifications of the present invention herein disclosed will occur to persons skilled in the art to which the present invention pertains. All such modifications are deemed to be within the scope and spirit of the present invention defined by the appended claims.

What is claimed is:

1. A data communication controller formed on a single integrated circuit chip, for use in a local area network having a communication medium and a network communication protocol and being interfaceable with an external system bus including an external system data bus and an external system address bus, said external system data bus and said external system address bus being operably associated with a host processor and external buffer memory including a plurality of memory storage elements for buffering data packets including transmit packets and receive packets, and each said transmit packet and said receive packet being composed of one or more data words, said data communication controller comprising:

data communication means, operably interfaceable with said communication medium, for transmitting transmit packets over said communication medium and receiving receive packets from over said communication medium, said data communication means further including a transmit data word queue for buffering the data words associated with one or more said transmit packets to be transmitted over said communication medium, and a receive data word queue for buffering the data words of one or more said receive packets received from over said communication medium;

system bus interface means for interfacing said data communication controller with said external system bus, and further including an input data word queue for buffering the data words transferred from said host processor over said external system bus to said data communication controller, and an output data word queue for buffering data words to be transferred from said data communication controller over said external system bus to said external buffer memory;

first data transfer means for transferring data words along a second data channel defined from said input data word queue to said transmit data word queue;

second data transfer means for transferring data words along a second data channel defined from said receive data word queue to said output data word queue;

internal data storage memory for storing external address data specifying the location of predefined memory structures maintained in said external buffer memory;

third data transfer means for transferring data words along a third data channel defined from said input data word queue to said internal data storage memory;

fourth data transfer means for transferring data words along a fourth data channel defined from said internal data storage memory to said output data word queue;

memory access control means for directly controlling access to memory storage elements in said external buffer memory, and further including first means for controlling the transfer of data words from said external data buffer memory to said input data word queue and thence to said transmit data word queue, second means for controlling the transfer of data words from said receive data word queue to said output data word queue and thence to said external data buffer memory, third means for controlling the transfer of data words from said external data buffer memory to said input data word queue and thence to said internal data storage memory, fourth means for controlling the transfer of data words from said internal data storage means to said output data word queue and thence to said external buffer memory, a first external address counter for incrementally generating from a preselected external address, a sequence of external addresses specifying the location of a sequence of data storage elements in said external buffer memory from which data words are to be read and transferred to said input data word queue, a second external address counter for incrementally generating from a preselected external address, a sequence of external addresses specifying the location of a sequence of data storage elements in said output data word queue, a third external address counter for incrementally generating from a preselected external address a sequence of external addresses specifying the location of a sequence of data storage elements in said external buffer memory which data words are to be read and transferred to said input data word queue, a fourth external address counter for incrementally generating from a preselected external address, a sequence of external addresses specifying the location of a sequence of data storage elements in said external buffer memory into which data words are to be written from said output data word queue, and an external address queue for buffering a plurality of said external addresses;

a first processing means operably associated with said data communication means, and having means for independently accessing said internal data storage memory, and means for selectively processing said receive packets so as to perform said network communication protocol at said data communication controller; and a second processing means independent of said first processing means, operably connected to said memory access control means, and having means for independently accessing said internal data storage memory, means for managing the transfer of receive packets from said data communication means to said system bus interface means, and from said system bus interface means to said external buffer memory for storage therein, and means for managing the transfer of transmit packets from said external buffer memory to said system bus interface means and from said system bus interface means to said data communication means, for transfer to said communication medium.

2. The data communication controller of claim 1, wherein said external address queue comprises:

a plurality of address storage locations for buffering said plurality of said external addresses;

an address insertion location operably associated with said first, second, third and fourth external address counters, for insertion of each said external address into said external address queue;

an address removal location operably associated with said external address system bus, for removal of each said external address from said external address queue and placement on said external system address bus; and a first tag bit sequence queue having a first plurality of tag bit sequence storage locations for storage of a first plurality tag bit sequences, each said first tag bit sequence storage location being associated with one said address storage location, and said first tag bit sequence queue further having a first tag bit sequence insertion location for insertion of each tag bit sequence into said first tag bit sequence queue and a first tag bit sequence removal location for removal of each said tag bit sequence from said first tag bit sequence queue.

3. The data communication controller of claim 2, wherein said memory access control means further comprises:

tag bit sequence generating means for generating one said tag bit sequence at a time and inserting said tag bit sequence into said first tag bit sequence insert location of said first tag bit sequence queue, wherein each said tag bit sequence is associated with one said external address and indicative of one of said first, second, third and fourth data channels within said data communication controller, over which a corresponding data word is to be transferred under the direct control of said memory access control means.

4. The data communication controller of claim 3, wherein said input data word queue comprises
- a plurality of input data word storage locations for buffering a plurality of data words providable from said external buffer memory,
- an input data word insertion location operably associated with said external system data bus, for insertion of each said data word into said input data word queue, and
- an input delta word removal location operably associated with said first data transfer means and third data transfer means, for removal of each said input data word from said input data word queue; and wherein said output data word queue comprises
- a plurality of output data word storage locations for buffering a plurality of data words provided from one of said receive data word queue and said internal data storage memory,
- an output data word insertion location operably associated with said second data transfer means and said fourth data transfer means, for insertion of each said data word into said output data word queue, and
- an output data word removal location operably associated with said external system data bus for removal of each said data word from said output data word queue.

5. The data communication controller of claim 4, wherein said input data word queue further comprises:
- a second tag bit sequence queue having a second plurality of tag bit sequence storage locations for storage of a second plurality of tag bit sequences, each said tag bit storage location being associated with one said input data word storage location, and said second tag bit sequence queue further having a second tag bit sequence insertion location for insertion of each said tag bit sequence into said second tag bit sequence queue, and a second tag bit sequence removal location for removal of each said tag bit sequence from said second stage bit sequence queue; and
- means for transferring each said tag bit sequence from said first tag bit sequence queue to said second tag bit sequence insertion location.

6. The data communication controller of claim 5, wherein said memory access control means further comprises:
- pointer generating means for generating and sequentially incrementing address pointers which define
  (i) the address insertion and removal locations of said external address queue,
  (ii) the first tag bit sequence insertion and removal locations of said first tag bit sequence queue,
  (iii) the input data word insertion and removal locations of said input data word queue,
  (iv) the second tag bit sequence insertion and removal locations of said second tag bit sequence queue, and
  (v) the output data word insertion and removal locations of said output data word queue.

7. The data communication controller of claim 1, wherein said memory access control means further comprises:
- a first internal address counter for incrementally generating from a preselected internal address, a sequence of internal addresses specifying the location of a sequence of data storage elements in said internal data storage memory into which data words are to be sequentially read from said output data word queue; and
- a second internal address counter for incrementally generating from a preselected internal address, a sequence of internal addresses specifying the location of a sequence of data storage elements in said internal data storage memory from which data words are to read and sequentially written into said input data word insertion location of said input data word queue.

8. The data communication controller of claim 6, wherein said preselected external addresses are provided to said first, second, third and fourth external address counters by said second processing means.

9. Apparatus for use in a local area network having a communication medium and a network communication protocol, said apparatus comprising:
(A) an external buffer memory having a plurality of memory storage elements, for buffering data packets including transmit packets and receive packets, said external buffer memory being interfaceable with an external system bus including an external system data bus and an external system address bus, each being operably associated with a host processor; and
(B) a data communication controller interfaceable with said external system bus, said data communication controller including:
- data communication means, being operably interfaceable with said communication medium, for transmitting transmit packets over said communication medium and receiving receive packets from over said communication medium, and each said transmit packet and each said receive packet being composed of one or more data words;
- system bus interface means for interfacing said data communication controller with said external system bus, said system bus interface means further including
  - an input data word queue for buffering the data words transferred from said host processor over said external system bus to said data communication controller, and
  - an output data word queue for buffering data words transferred from said data communication controller over said external system bus to said external buffer memory;
- a transmit data word queue for buffering the data words associated with one or more said transmit packets to be transmitted over said communication medium;
- a receive data word queue for buffering the data words of one or more said receive packets received from over said communication medium;
- first data transfer means for transferring data words along a first data pathway defined from said input data word queue to said transmit data word queue;
- second data transfer means for transferring data words along a second data pathway defined from said receive data word queue to said output data word queue;
- a third data transfer means for transferring data words along a third data pathway defined from said input data word queue to said internal data storage memory, and a fourth data transfer means for transferring data words along a fourth data pathway defined from said data storage memory to said output data word queue;

memory access control means for directly controlling access to said memory storage elements in said external buffer memory, said memory access control means being operably connected to said second processing means and including first means for controlling the transfer of data words from said external data buffer memory to said input data word queue and thence to said transmit data word queue, second means for controlling the transfer of data words from said receive data word queue to said output data word queue and thence to said external data buffer memory, third means for controlling the transfer of data words from said external data buffer memory to said input data word queue and thence to said internal data storage memory, fourth means for controlling the transfer of data words from said internal data storage means to said output data word queue and thence to said external buffer memory, a first external address counter for incrementally generating from a preselected external address, a sequence of external addresses specifying the location of a sequence of data storage elements in said external buffer memory from which data words are to be read and transferred to said input data word queue, a second external address counter for incrementally generating from a preselected external address, a sequence of external addresses specifying the location of a sequence of data storage elements in said external buffer memory into which data words are to be written from said output data word queue, a third external address counter for incrementally generating from a preselected external address, a sequence of external addresses specifying the location of a sequence of data storage elements in said external buffer memory which data words are to be read and transferred to said input data word queue, a fourth external address counter for incrementally generating from a preselected external address, a sequence of external addresses specifying the location of a sequence of data storage elements in said external buffer memory into which data words are to be written from said output data word queue, and an external address queue for buffering a plurality of said external addresses;

a first processing means operably associated with said data communication means, for selectively processing said receive packets so as to perform said network communication protocol at said data communication controller; and a second processing means independent of said first processing means, and having means for managing the transfer of receive packets from said data communication means to said system bus interface means, and from said system bus interface means to said external buffer memory for storage therein, and means for managing the transfer of transmit packets from said external buffer memory to said system bus interface means and from said system bus interface means to said data communication means, for transfer to said communication medium.

10. The apparatus of claim 9, wherein said external address queue comprises:

a plurality of address storage locations for buffering said plurality of said external addresses;

an address insertion location operably associated with said first, second, third and fourth external address counters, for insertion of each said external address into said external address queue;

an address removal location operably associated with said external address system bus, for removal of each said external address from said external address queue and placement on said external system address bus; and a first tag bit sequence queue having a first plurality of tag bit sequence storage locations for storage of a first plurality tag bit sequences, each said first tag bit sequence storage location being associated with one said address storage location, and said first tag bit sequence queue further having a first tag bit sequence insertion location for insertion of each tag bit sequence into said first tag bit sequence queue and a first tag bit sequence removal location for removal of each said tag bit sequence from said first tag bit sequence queue.

11. The apparatus of claim 9, wherein said memory access control means further comprises:

tag bit sequence generating means for generating one said tag bit sequence at a time and inserting said tag bit sequence into said first tag bit sequence insert location of said first tag bit sequence queue, wherein each said tag bit sequence is associated with one said external address and indicative of one of said first, second, third and fourth data channels within said data communication controller over which a corresponding data word is to be transferred under the direct control of said memory access control means.

12. The apparatus of claim 11, wherein said input data word queue comprises:

a plurality of input data word storage locations for buffering a plurality of data words providable from said external buffer memory, an input data word insertion location operably associated with said external system data bus, for insertion of each said data word into said input data word queue, and an input data word removal location operably associated with said first data transfer means and third data transfer means, for removal of each said input data word from said input data word queue; and wherein said output data word queue comprises:

an plurality of output data word storage locations for buffering a plurality of data words provided from one of said receive data word queue and said internal data storage memory;

an output data word insertion location operably associated with said second data transfer means and said fourth data transfer means, for insertion of each said data word into said output data word queue, and an output data word removal location operably associated with said external system data bus for removal of each said data word from said output data word queue.

13. The apparatus of claim 11, wherein said input data word queue further comprises:
   a second tag bit sequence queue having a second plurality of tag bit sequence storage locations for storage of a second plurality of tag bit sequences, each said tag bit storage location being associated with one said input data word storage location, and said second tag bit sequence queue further having a second tag bit sequence insertion location for insertion of each said tag bit sequence into said second tag bit sequence queue, and a second tag bit sequence removal location for removal of each said tag bit sequence from said second stage bit sequence queue; and
   means for transferring each said tag bit sequence from said first tag bit sequence queue to said second tag bit sequence insertion location.

14. The apparatus of claim 13, wherein said memory access control means further comprises:
   pointer generating means for generating and sequentially incrementing address pointers which define
   (i) the address insertion and removal locations of said external address queue,
   (ii) the first tag bit sequence insertion and removal locations of said first tag bit sequence queue,
   (iii) the input data word insertion and removal locations of said input data word queue,
   (iv) the second tag bit sequence insertion and removal locations of said second tag bit sequence queue, and
   (v) the output data word insertion and removal locations of said output data word queue.

15. The apparatus of claim 9, wherein said memory access control means further comprises:
   a first internal address counter for incrementally generating from a preselected internal address, a sequence of internal addresses specifying the location of a sequence of data storage elements in said internal data storage memory into which data words are to be sequentially read from said output data word queue; and
   a second internal address counter for incrementally generating from a preselected internal address, a sequence of internal addresses specifying the location of a sequence of data storage elements in said internal data storage memory from which data words are to read and sequentially written into said input data word insertion location of said input data word queue.

16. The apparatus of claim 6, wherein said preselected external addresses are provided to said first, second, third and fourth external address counters by said second processing means.

17. A data communication controller formed on a single integrated circuit chip, for use in a local area network having a communication medium and a network communication protocol and being interfaceable with an external system bus including an external system data bus and an external system address bus, said external system data bus and said external system address bus being operably associated with a host processor and external buffer memory including a plurality of memory storage elements for buffering data packets including transmit packets and receive packets, each said transmit packet and said receive packet being composed of one or more data words, said data communication controller comprising:
   data communication means, operably interfaceable with said communication medium, for transmitting transmit packets over said communication medium, said data communication means further including
      a transmit data word queue for buffering the data words associated with one or more said transmit packets to be transmitted over said communication medium, and
      a receive data word queue for buffering the data words of one or more said receive packets received from over said communication medium;
   system bus interface means for interfacing said data communication controller with said external system bus, said system bus interface means further including
      and input data word queue for buffering the data words transferred from said host processor over said external system bus to said data communication controller, and
      an output data word queue for buffering data words to be transferred from said data communication controller over said external system bus to said external buffer memory;
   first data transfer means for transferring data words along a second data channel defined from said input data word queue to said transmit data word queue;
   second data transfer means for transferring data words along a second data channel defined from said receive data word queue to said output data word queue;
   a third data transfer means for transferring data words along a third data channel defined from said input data word queue to said internal data storage memory;
   a fourth data transfer means for transferring data words along a fourth data channel defined from said internal data storage memory to said output data word queue;
   internal data storage memory for storing external address data specifying the location of predefined memory structures maintained in said external buffer memory;
   memory access control means for directly controlling access to memory storage elements in said external buffer memory, said memory access control means further including
      first means for controlling the transfer of data words form said external data buffer memory to said input data word queue and thence to said transmit data word queue,
      second means for controlling the transfer of data words from said receive data word queue to said output data word queue and thence to said external data buffer memory,
      third means for controlling the transfer of data words for said receive data word queue to said output data word queue and thence to said external data buffer memory,
      third means for controlling the transfer of data words from said external data buffer memory to said input data word queue and thence to said internal data storage memory, and
      fourth means for controlling the transfer of data words from said internal data storage means to said output data word queue and thence to said external buffer memory
an external address queue for buffering a plurality of said external addresses;
a first processing means operably associated with said data communication means, and having
means for independently accessing said internal data storage memory, and
means for selectively processing said receive packets so as to perform said network communication protocol at said data communication controller; and
a second processing means independent of said first processing means and operably connected to said memory access control means, and having
means for independently accessing said internal data storage memory,
means for managing the transfer of receive packets from said data communication means to said system bus interface means, and from said system bus interface means to said external buffer memory for storage therein, and means for managing the transfer of transmit packets from said external buffer memory to said system bus interface means and from said system bus interface means to said data communication means for transfer to said communication medium.

18. The data communication controller of claim 17, wherein said external address queue comprises:
a plurality of address storage locations for buffering said plurality of said external addresses;
an address insertion location operably associated with said first, second, third and fourth external address counters, for insertion of each said external address into said external address queue;
an address removal location operably associated with said external address system bus, for removal of each said external address from said external address queue and placement on said external system address bus; and
a first tag bit sequence queue having a first plurality of tag bit sequence storage locations for storage of a first plurality tag bit sequences, each said first tag bit sequence storage location being associated with one said address storage location, and said first tag bit sequence queue further having a first tag bit sequence insertion location for insertion of each tag bit sequence into said first tag bit sequence queue and a first tag bit sequence removal location for removal of each said tag bit sequence from said first tag bit sequence queue.

19. The data communication controller of claim 18, wherein said memory access control means further comprises:
tag bit sequence generating means for generating one said tag bit sequence at a time and inserting said tag bit sequence into said first tag bit sequence insert location of said first tag bit sequence queue, wherein each said tag bit sequence is associated with one said external address and indicative of one of said first, second, third and fourth data channels within said data communication controller over which a corresponding data word is to be transferred under the direct control of said memory access control means.

20. The data communication controller of claim 18, wherein said input data word queue comprises:

a plurality of input data word storage locations for buffering a plurality of data words providable from said external buffer memory;
an input data word insertion location operably associated with said external system data bus, for insertion of each said data word into said input data word queue; and
an input data word removal location operably associated with said first data transfer means and third data transfer means, for removal of each said input data word from said input data word queue, and wherein said output data word queue comprises:
an plurality of output data word storage locations for buffering a plurality of data words provided from one of said receive data word queue and said internal data storage memory;
an output data word insertion location operably associated with said second data transfer means and said fourth data transfer means, for insertion of each said data word into said output data word queue, and
an output data word removal location operably associated with said external system data bus for removal of each said data word from said output data word queue.

21. The data communication controller of claim 20, wherein said input data word queue further comprises:
a second tag bit sequence queue having a second plurality of tag bit sequence storage locations for storage of a second plurality of tag bit sequences, each said tag bit storage location being associated with one said input data word storage location, and said second tag bit sequence queue further having
a second tag bit sequence insertion location for insertion of each said tag bit sequence into said second tag bit sequence queue,
a second tag bit sequence removal location for removal of each said tag bit sequence from said second stage bit sequence queue, and
means for transferring each said tag bit sequence from said first tag bit sequence queue to said second tag bit sequence insertion location.

22. The data communication controller of claim 21, wherein said memory access control means further comprises:
pointer generating means for generating and sequentially incrementing address pointers which define
(i) the address insertion and removal locations of said external address queue,
(ii) the first tag bit sequence insertion and removal locations of said first tag bit sequence queue,
(iii) the input data word insertion and removal locations of said input data word queue,
(iv) the second tag bit sequence insertion and removal locations of said second tag bit sequence queue, and
(v) the output data word insertion and removal locations of said output data word queue.

23. The data communication controller of claim 17, wherein said memory access control means further comprises:
a first internal address counter for incrementally generating from a preselected internal address, a sequence of internal addresses specifying the location of a sequence of data storage elements in said internal data storage memory into which data words are to be sequentially read from said output data word queue; and a second internal address counter for incrementally generating from a preselected internal address, a sequence of internal addresses specifying the location of a sequence of data storage elements in said internal data storage memory from which data words are to read and sequentially written into said input data word insertion location of said input data word queue.

24. A data communication controller formed on a single integrated circuit chip, for use in a local area network having a communication medium and a network communication protocol and being interfaceable with an external system bus including an external system data bus and an external system address bus, said external system data bus and said external system address bus being operably associated with a host processor and external buffer memory including a plurality of memory storage elements for buffering data packets including transmit packets and receive packets, and each said transmit packet and said receive packet being composed of one or more data words, said data communication controller comprising:

data communication means, operably interfaceable with said communication medium, for transmitting transmit packets over said communication medium and receiving receive packets from over said communication medium, said data communication means further including a transmit data word queue for buffering the data words associated with one or more said transmit packets to be transmitted over said communication medium, and a receive data word queue for buffering the data words of one or more said receive packets received from over said communication medium;

system bus interface means for interfacing said data communication controller with said external system bus, said system bus interface means further including an input data word queue for buffering the data words transferred from said host processor over said external system bus to said data communication controller, and an output data word queue for buffering data words to be transferred from said data communication controller over said external system bus to said external buffer memory;

first data transfer means for transferring data words along a second data channel defined from said input data word queue to said transmit data word queue;

second data transfer means for transferring data words along a second data channel defined from said receive data word queue to said output data word queue;

third data transfer means for transferring data words along a third data channel defined from said input data word queue to said internal data storage memory;

fourth data transfer means for transferring data words along a fourth data channel defined from said internal data storage memory to said output data word queue;

memory access control means for directly controlling access to memory storage elements in said external buffer memory, said memory access control means further including first means for controlling the transfer of data words from said external data buffer memory to said input data word queue and thence to said transmit data word queue, second means for controlling the transfer of data words from said receive data word queue to said output data word queue and thence to said external data buffer memory, third means for controlling the transfer of data words from said external data buffer memory to said input data word queue and thence to said internal data storage memory, fourth means for controlling the transfer of data words from said internal data storage means to said output data word queue and thence to said external buffer memory, and an external address queue for buffering a plurality of said external addresses, said external address queue including a plurality of address storage locations for buffering said plurality of said external addresses, an address insertion location for insertion of each said external address into said external address queue, an address removal location operably associated with said external address system bus, for removal of each said external address from said external address queue and placement on said external system address bus, and a first tag bit sequence queue having a first plurality of tag bit sequence storage locations for storage of a first plurality tag bit sequences, each said first tag bit sequence storage location being associated with one said address storage location, and said first tag bit sequence queue further having a first tag bit sequence insertion location for insertion of each tag bit sequence into said first tag bit sequence queue, and a first tag bit sequence removal location for removal of each said tag bit sequence from said first tag bit sequence queue;

a first processing means operably associated with said data communication means, for selectively processing said receive packets so as to perform said network communication protocol at said data communication controller; and a second processing means independent of said first processing means, operably connected to said memory access control means, and including means for managing the transfer of receive packets from said data communication means to said system bus interface means, and from said system bus interface means to said external buffer memory for storage therein, and means for managing the transfer of transmit packets from said external buffer memory to said system bus interface means and from said system bus interface means to said data communication means, for transfer to said communication medium.

25. The data communication controller of claim 24, wherein said memory access control means further comprises:

tag bit sequence generating means for generating one said tag bit sequence at a time and inserting said tag bit sequence into said first tag bit sequence insert location of said first tag bit sequence queue, wherein each said tag bit sequence is associated with one said external address and indicative of one of said first, second, third and fourth data channels within said data communication controller over which a corresponding data word is to be transferred under the direct control of said memory access control means.

26. The data communication controller of claim 24, wherein said input data word queue comprises:
   a plurality of input data word storage locations for buffering a plurality of data words providable from said external buffer memory;
   an input data word insertion location operably associated with said external system data bus, for insertion of each said data word into said input data word queue; and
   an input data word removal location operably associated with said first data transfer means and third data transfer means, for removal of each said input data word from said input data word queue, and wherein said output data word queue comprises:
   an plurality of output data word storage locations for buffering a plurality of data words provided from one of said receive data word queue and said internal data storage memory,
   an output data word insertion location operably associated with said second data transfer means and said fourth data transfer means, for insertion of each said data word into said output data word queue, and
   an output data word removal location operably associated with said external system data bus for removal of each said data word from said output data word queue.

27. The data communication controller of claim 26, wherein said input data word queue further comprises:
   a second tag bit sequence queue having a second plurality of tag bit sequence storage locations for storage of a second plurality of tag bit sequences, each said tag bit storage location being associated with one said input data word storage location, and said second tag bit sequence queue further having
   a second tag bit sequence insertion location for insertion of each said tag bit sequence into said second tag bit sequence queue, and
   a second tag bit sequence removal location for removal of each said tag bit sequence from said second stage bit sequence queue; and
   means for transferring each said tag bit sequence from said first tag bit sequence queue to said second tag bit sequence insertion location.

28. The data communication controller of claim 27, wherein said memory access control means further comprises:
   pointer generating means for generating and sequentially incrementing address pointers which define
   (i) the address insertion and removal locations of said external address queue,
   (ii) the first tag bit sequence insertion and removal locations of said first tag bit sequence queue,
   (iii) the input data word insertion and removal locations of said input data word queue,
   (iv) the second tag bit sequence insertion and removal locations of said second tag bit sequence queue, and
   (v) the output data word insertion and removal locations of said output data word queue.

29. The data communication controller of claim 28, wherein said memory access control means further comprises:
   a first internal address counter for incrementally generating from a preselected internal address, a sequence of internal addresses specifying the location of a sequence of data storage elements in said internal data storage memory into which data words are to be sequentially read from said output data word queue; and
   a second internal address counter for incrementally generating from a preselected internal address, a sequence of internal addresses specifying the location of a sequence of data storage elements in said internal data storage memory from which data words are to read and sequentially written into said input data word insertion location of said input data word queue.

30. A data communication controller formed on a single integrated circuit chip, for use in a local area network having a communication medium and a network communication protocol, and being interfaceable with an external system bus including an external system data bus and an external system address bus each being operably associated with a host processor and external buffer memory having a plurality of memory storage elements for buffering data packets including transmit packets and receive packets, and each said transmit packet and said receive packet being composed of one or more data words, said data communication controller comprising:
   data communication means, operably interfaceable with said communication medium, for transmitting transmit packets over said communication medium and receiving receive packets from over said communication medium, said data communication means further including
   transmit packet assembling and transmitting means for assembling and transmitting the data words associated with each said transmit packet,
   a transmit data word queue for buffering the data words associated with one or more said transmit packets to be transmitted over said communication medium,
   receive packet receiving means for receiving the data words associated with each said receive packet, and
   a receive data word queue for buffering the data words of one or more said receive packets received from over said communication medium;
   system bus interface means for interfacing said data communication controller with said external system bus, said system bus interface means further including
   an input data word queue for buffering the data words to be transferred from said host processor over said external system bus to said data communication controller, and
   an output data word queue for buffering data words to be transferred from said data communication controller over said external system bus to said external buffer memory;
   first data transfer means for transferring data words along a first data channel defined from said input data word queue to said transmit data word queue;
   second data transfer means for transferring data words along a second data channel defined from said receive data word queue to said output data word queue;

a third data transfer means for transferring data words along a third data channel defined from said input data word queue to said internal data storage memory;

a fourth data transfer means for transferring data words along a fourth data channel defined from said internal data storage memory to said output data word queue;

a first asynchronous RISC-type processing means operably associated with said data communication means, and having means for independently accessing said external buffer memory, and means for selectively processing said receive packets so as to perform said network communication protocol at said data communication controller; and a second asynchronous RISC-type processing means independent of said first synchronous RISC-type processing means, and including means for independently accessing said external buffer memory, means for managing the transfer of receive packets from said data communication means to said system bus interface means, and from said system bus interface means to said external buffer memory for storage therein, and means for managing the transfer of transmit packets from said external buffer memory to said system bus interface means and from said system bus interface means to said data communication means, for transfer to said communication medium.

31. The data communication controller of claim 30, wherein said transmit data word queue comprises:

a plurality of transmit data word storage locations for buffering a plurality of data words provided from said input data word queue;

a transmit data word insertion location operably associated with said first data transfer means;

a transmit data word removal location operably associated with said transmit packet assembling and transmission means;

a tag bit sequence queue having a plurality of tag bit sequence storage locations for storage of a plurality of tag bit sequences, each said tag bit sequence storage location being associated with one said transmit data word storage location, and said tag bit sequence queue further having a tag bit sequence insertion location for insertion of each said tag bit sequence into said tag bit sequence queue, and a tag bit sequence removal location for removal of each said tag bit sequence from said tag bit sequence queue; and tag bit sequence generating means for generating one said tag bit sequence at a time and inserting said tag bit sequence into said tag bit sequence insertion location of said tag bit sequence queue, wherein each said tag bit sequence is associated with one said data word in said transmit data word queue and is indicative of a transmit data word condition selected from the group consisting of (i) identifying the end of one said transmit packet, (ii) identifying the location of data bits in said associated data word, and (iii) identifying that no data is present said associated data word.

32. The data communication controller of claim 30, which further comprises:

transmit request arbitration means for arbitrating requests from said first RISC-type processing means and said second RISC-type processing means, to control said transmit data word queue and said transmit packet assembling and transmitting means so as to transmit one or more transmit packets from said transmit packet assembling and transmitting means.

33. The data communication controller of claim 32, wherein said transmit request arbitration means comprises first logic circuitry in which said first RISC-type processing means can acquire unconditional access to said transmit data word queue and said transmit packet assembling and transmitting means, and second logic circuitry in which said second RISC-type processing means can acquire conditional access to said transmit data word queue and said transmit packet assembling and transmitting means, and third logic circuitry in which said first RISC-type processing means acquires conditional access to said transmit data word queue and said transmit packet assembling and transmitting means.

34. The data communication controller of claim 31, wherein said transmit packet assembling and transmitting means comprises means for reading tag bit sequences from said tag bit sequence and using said tag bit sequences to determine the location of each transmit packet in said transmit data word queue, and means for transferring transmit data words from said transmit data word queue into a sequence of data bits in transmit data bit queue, for subsequent transmission over said communication medium.

35. The data communication controller of claim 34, wherein said transmit packet assembling and transmitting means comprises transmit control means for receiving a transmit packet command from either said first RISC-type processing means or said second processing means, and means, responsive to said received transmit command, for transmitting the data bits of each said determined transmit packet, over said communication medium.

36. The data communication controller of claim 35, wherein said transmit data word queue further comprises pointer management means for generating and sequentially incrementing address pointers which define said transmit data word insertion and removal locations in said transmit data word queue, and said tag bit sequence insertion and removal locations of said tag bit sequence queue.

37. The data communication controller of claim 36, wherein said transmit data word queue comprises a first FIFO buffer, said receive data word queue comprises a second FIFO buffer, an input data word queue comprises a third FIFO buffer, and said output data word queue comprises a fourth FIFO buffer.

38. The data communication controller of claim 30, wherein said receive data word queue further comprises:

a plurality of receive data word storage locations for buffering receive data words provided from said receive packet receiving means, a receive data word insertion location operably associated with said receive packet receiving means, a first receive data word removal location operably associated with said first RISC-type processing means by a first internal system bus, a second receive data word removal location operably associated with said second data processing means by a second internal system bus, and with said output data word queue by said second data transfer means, and a tag bit sequence queue having a plurality of tag bit sequence storage locations for storage of a plurality of tag bit sequences, each said tag bit sequence storage locations being associated with one said receive data word storage location, and said tag bit sequence queue further having a tag bit sequence insertion location for insertion of each said tag bit sequence queue, and a tag bit sequence removal location for removal of each said tag bit sequence from said tag bit sequence queue.

39. The data communication controller of claim 38, wherein said receive packet receiving means further comprises:

means for analyzing the bits of receive packet; and tag bit sequence generating means for generating one said tag bit sequence at a time and inserting said tag bit sequence into said tag bit sequence insertion location of said tag bit sequence queue, and wherein each said tag bit is associated with one said data word in said receive data word queue and indicates the receive packet to which said data word is associated.

40. The data communication controller 39, which further comprises:

a first receive packet filtering means, operably associated with said first receive data word removal location, for determining the beginning and end of each receive packet being transferred though said receive data word queue and for determining whether each said receive packet is to be made accessible to said first RISC-type processing means by way of said first internal system bus.

41. The data communication controller of claim 40, which further comprises a second receive packet filtering means, operably associated with said second receive data word removal location, for determining the beginning and end of each receive packet being transferred through said receive data word queue, and for determining whether each said receive packet is to be made accessible to said second RISC-type processing means by way of said second internal system bus.

42. The data communication controller of claim 40, wherein said first receive packet filtering means comprises means for analyzing tag bit sequence in said tag bit sequence queue so as to determine the beginning and end of each said receive packet being transferred through said receive data word queue and whether each said receive packet is to be made accessible to said first RISC-type processing means.

43. The data communication controller of claim 42, wherein said second receive packet filtering means comprises means for analyzing tag bit sequences in said tag bit sequence so as to determine the beginning and the end of each said receive packet being transferred through said receive data word queue and whether each said receive packet is to be made accessible to said second RISC-type processing means.

44. The data communication controller of claim 43, wherein said receive packet receiving means further comprises first pointer generating means for generating and sequentially incrementing address pointers which define said receive data word insertion location in said receive data word queue, and wherein said first receive packet filtering means further comprises a second pointer generating means for generating and sequentially incrementing address pointers which define said first receive data, word removal location in said receive data word queue.

* * * * *